(12) United States Patent
Srihari et al.

(10) Patent No.: US 7,580,551 B1
(45) Date of Patent: Aug. 25, 2009

(54) METHOD AND APPARATUS FOR ANALYZING AND/OR COMPARING HANDWRITTEN AND/OR BIOMETRIC SAMPLES

(75) Inventors: Sargur Srihari, Williamsville, NY (US); Yong-Chul Shin, Williamsville, NY (US); Sangjik Lee, Buffalo, NY (US); Venugoal Govindaraju, Williamsville, NY (US); Sung-Hyuk Cha, Pleasantville, NY (US); Catalin I. Tomai, Tonawanda, NY (US); Bin Zhang, Tonawanda, NY (US); Ajay Shekhawat, Buffalo, NY (US); Dave Bartnik, Elma, NY (US); Wen-Jann Yang, Amherst, NY (US); Srirangaraj Setlur, Getzville, NY (US); Phil Kilinskas, East Amherst, NY (US); Fred Kunderman, Niagara Falls, NY (US); Xia Liu, Williamsville, NY (US); Zhixin Shi, Williamsville, NY (US); Vemulapati Ramanaprasad, Amherst, NY (US)

(73) Assignee: The Research Foundation of State University of NY, Amherst, NY (US)

( * ) Notice: Subject to any disclaimer, the term of this patent is extended or adjusted under 35 U.S.C. 154(b) by 991 days.

(21) Appl. No.: 10/611,329

(22) Filed: Jun. 30, 2003

(51) Int. Cl.
*G06K 9/00* (2006.01)
(52) U.S. Cl. .................... 382/115; 340/5.52; 340/5.82; 382/186; 382/187; 382/218; 382/225
(58) Field of Classification Search ............... 382/115, 382/116, 119, 218, 118, 124, 125, 181, 186, 382/187, 209, 225; 235/380, 454, 493; 340/5.4, 340/5.82, 5.83, 5.52; 713/200, 202
See application file for complete search history.

(56) References Cited

U.S. PATENT DOCUMENTS

| | | | |
|---|---|---|---|
| 4,654,875 A | | 3/1987 | Srihari et al. |
| 5,058,182 A | | 10/1991 | Kuan et al. |
| 5,257,220 A | | 10/1993 | Shin et al. |
| 5,321,768 A | | 6/1994 | Fenrich et al. |
| 5,515,455 A | | 5/1996 | Govindaraju et al. |
| 5,524,070 A | | 6/1996 | Shin et al. |
| 5,633,947 A | * | 5/1997 | Sibbald ................ 382/124 |
| 5,710,916 A | * | 1/1998 | Barbara et al. ............ 707/9 |
| 5,787,185 A | * | 7/1998 | Clayden ................ 382/115 |
| 5,892,838 A | * | 4/1999 | Brady ................ 382/115 |
| 6,052,481 A | * | 4/2000 | Grajski et al. ............ 382/187 |
| 6,052,482 A | * | 4/2000 | Arai et al. ................ 382/187 |
| 6,580,814 B1 | * | 6/2003 | Ittycheriah et al. .......... 382/115 |
| 6,671,403 B1 | * | 12/2003 | Takasu et al. ............ 382/187 |
| 6,778,685 B1 | * | 8/2004 | Jiang et al. ............ 382/124 |
| 6,778,865 B1 | * | 8/2004 | Ostromuhov et al. ........ 700/53 |
| 6,873,715 B2 | * | 3/2005 | Kuo et al. ................ 382/119 |

(Continued)

*Primary Examiner*—Gregory M Desire
(74) *Attorney, Agent, or Firm*—Simpson & Simpson, PLLC

(57) ABSTRACT

A computer based method of biometric analysis which compares a first vector from a first biometric sample with a second vector from a second biometric sample. The vectors have at least one biometric feature. A method which compares two biometric samples. The samples form at least one cluster of at least one vector based on feature similarities between the samples. An apparatus incorporating a means for performing the method taught herein. A computer-readable medium and a propagated computer data signal transmitted via a propagation medium, with instructions which when executed by a processor, carry out the method of the present invention. A method of handwriting analysis which calculates a first metric from a first vector having at least one feature from a sample, calculates a second metric from a second vector having at least one feature from a second sample, and calculates the distance in two-dimensional feature space between metrics.

8 Claims, 50 Drawing Sheets

U.S. PATENT DOCUMENTS

| | | | | |
|---|---|---|---|---|
| 6,920,231 B1* | 7/2005 | Griffin | | 382/115 |
| 6,980,670 B1* | 12/2005 | Hoffman et al. | | 382/115 |
| 6,993,440 B2* | 1/2006 | Anderson et al. | | 702/66 |
| 7,047,418 B1* | 5/2006 | Ferren et al. | | 713/186 |
| 7,050,609 B2* | 5/2006 | Huang | | 382/124 |
| 7,336,827 B2* | 2/2008 | Geiger et al. | | 382/186 |
| 7,349,576 B2* | 3/2008 | Holtsberg | | 382/187 |
| 2001/0019622 A1* | 9/2001 | Huang | | 382/124 |
| 2002/0023229 A1* | 2/2002 | Hangai | | 713/202 |
| 2002/0035542 A1* | 3/2002 | Tumey et al. | | 705/44 |
| 2002/0152034 A1* | 10/2002 | Kondo et al. | | 702/19 |
| 2003/0142855 A1* | 7/2003 | Kuo et al. | | 382/119 |
| 2004/0047495 A1* | 3/2004 | Suchard et al. | | 382/119 |
| 2004/0062423 A1* | 4/2004 | Doi | | 382/118 |
| 2004/0213455 A1* | 10/2004 | Lossev et al. | | 382/159 |
| 2007/0206859 A1* | 9/2007 | Sternby | | 382/186 |

* cited by examiner

Nov 10, 1999

From
Jim Elder
829 Loop Street, Apt 300
Allentown, New York 14707

To
Dr. Bob Grant
602 Queensberry Parkway
Omar, West Virginia 25638

We were referred to you by Xena Cohen at the University Medical Center. This is regarding my friend, Kate Zack.

It all started around six months ago while attending the "Rubeq" Jazz Concert. Organizing such an event is no picnic, and as President of the Alumni Association, a co-sponsor of the event, Kate was overworked. But she enjoyed her job, and did what was required of her with great zeal and enthusiasm.

However, the extra hours affected her health; halfway through the show she passed out. We rushed her to the hospital, and several questions, x-rays and blood tests later, were told it was just exhaustion.

Kate's been in very bad health since. Could you kindly take a look at the results and give us your opinion?

Thank you!
Jim

Measures of
Pen Pressure
1. Entropy of grey values
2. Grey-level threshold
3. Number of black pixels Measures of
Writing Movement
4. Number of interior contours
5. Number of exterior curves Measures of
Stroke Formation
6. Number of vertical slope components
7. Number of horizontal slope components
8. Number of negative slope components
9. Number of positive slope components Slant
10. Slant Word Proportion
11. Height

Fig. 5

To Dr. Bob Grant
602 Queensberry Parkway
Draper, West Virginia 25638

Fig. 9A

To:
Dr. Bob Grant
602 Queensberry Parkway
Draper, West Virginia 25638

METHOD AND APPARATUS FOR ANALYZING AND/OR COMPARING HANDWRITTEN AND/OR BIOMETRIC SAMPLES

STATEMENT REGARDING FEDERALLY SPONSORED RESEARCH OR DEVELOPMENT

This invention was made with government support under a grant from the National Institute of Justice, grant number 1999-IJ-CX-K010.

FIELD OF THE INVENTION

The present invention relates generally to handwritten document and/or biometric sample examination and comparison systems and, more particularly, to a computer based method of biometric analysis, comprising comparing a first vector from a first biometric sample with a second vector from a second biometric sample, wherein said first and second vectors have at least one biometric feature.

BACKGROUND OF THE INVENTION

Analysis of handwritten documents to identify the writer is of extreme importance in the criminal justice system. Numerous cases over the years have dealt with evidence provided by handwritten documents such as wills and ransom notes. Handwriting has long been considered individualistic, as evidenced by the importance of signatures in documents. However, the individuality of writing in handwritten notes and documents has not been established with scientific rigor, and therefore its admissibility as forensic evidence can be questioned.

Writer individuality rests on the hypothesis that each individual has consistent handwriting that is distinct from the handwriting of other individuals. However, this hypothesis has not been subjected to rigorous scrutiny with accompanying experimentation, testing, and peer review. One of our objectives with this invention is to make a contribution towards this scientific validation.

The problem to be solved by the invention relates to setting up a methodology for validating the hypothesis that everybody writes differently. The invention is built upon recent advances in developing machine learning algorithms for recognizing handwriting from scanned paper documents; software for recognizing handwritten documents has many applications, such as sorting mail with handwritten addresses. The task of handwriting recognition focuses on interpreting the message conveyed—such as determining the town in a postal address—which is done by averaging out the variation in the handwriting of different individuals. On the other hand, the task of establishing individuality focuses on determining those very differences. What the two tasks have in common is that they both involve processing images of handwriting and extracting features.

Pertinent references useful in understanding the present invention include the following:

1) Huber R A, Headrick A M. Handwriting identification: facts and fundamentals. Boca Raton: CRC Press, 1999.
2) Osborn A S. Questioned document. $2^{nd}$ ed. Albany, NY: Boyd Printing, 1929.
3) Lohr, S L. Sampling: design and analysis. Pacific Grove, CA: Duxbury Press, 1999.
4) Srihari S N, Cha S-H, Arora H, Lee S. Handwriting identification: research to study validity of individuality of handwriting & develop computer-assisted procedures for comparing handwriting. Buffalo (NY): University at Buffalo, State University of New York; 2001 TR No.: CEDAR-TR-01-1.
5) Gilbert A N, Wysocki C J. Hand preference and age in the United States. Neuropsychologia. 1992; 30:601-608.
6) Duda R O, Hart P E. Pattern classification and scene analysis. NY: Wiley, 1973.
7) Srihari S N. Feature extraction for locating address blocks on mail pieces. In: Simon J C, ed. From pixels to features. Amsterdam: North Holland, 1989; 261-273.
8) Srihari S N. Recognition of handwritten and machine-printed text for postal address interpretation. Pattern Recognition Letters 1993; 14:291-303.
9) Govindaraju V, Shekhawat A, Srihari S N. Interpretation of handwritten addresses in US mail stream. In: Proceedings of the $2^{nd}$ Int Conf on Document Analysis and Recognition; 1993 Oct. 20-22; Tsukuba Science City, Japan: International Association for Pattern Recognition, 1993.
10) Srikantan G, Lam S W, Srihari S N. Gradient-based contour encoding for character recognition. Pattern Recognition 1996; 29:1147-1160.
11) Srikantan G, Lee D S, Favata J T. Comparison of normalization methods for character recognition. In: Proceedings of the $3^{rd}$ Int Conf on Document Analysis and Recognition; 1995 August 14-16; Montreal: International Association for Pattern Recognition, 1995.
12) Otsu N. A threshold selection method from gray-scale histograms. IEEE Trans System, Man, and Cybernetics 1979; 9:62-66.
13) Freeman H. On the encoding of arbitrary geometric configurations. IRE Trans Electronic Computers 1961; 18:312-324.
14) Kim G, Govindaraju V. A lexicon-driven approach to handwritten word recognition for real-time applications. Trans on Pattern Analysis and Machine Intelligence 1997; 19:366-379.
15) Favata J T, Srikantan G, Srihari S N. Handprinted character/digit recognition using a multiple feature/resolution philosophy. In: Proceedings of the Fourth Int Workshop on the Frontiers of Handwriting Recognition; 1994 December 7-9; Taipei: NA, 1994.
16) Gonzalez R C, Woods R E. Digital image processing. 3 ed. Reading, MA: Addison-Wesley, 1992.
17) Mirkin B. Mathematical classification and clustering. Dordrecht: Kluwer Academic Pub, 1996.
18) Mitchell T M. Machine learning. Boston: McGraw-Hill, 1997.
19) Lee D S, Srihari S N, Gaborski R. Bayesian and neural network pattern recognition: a theoretical connection and empirical results with handwritten characters. In: Sethi I K, Jain A K, ed. Artificial neural networks and statistical pattern recognition. Amsterdam: North Holland, 1991:89-108.
20) Srihari et al., U.S. Pat. No. 4,654,875, System to Achieve Automatic Recognition of Linguistic Strings.
21) Kuan et al., U.S. Pat. No. 5,058,182, Method and Apparatus for Handwritten Character Recognition.
22) Shin et al., U.S. Pat. No. 5,524,070, Local Adaptive Contrast Enhancement.
23) Shin et al., U.S. Pat. No. 5,257,220, Digital Data Memory Unit and Memory Unit Array.
24) Fenrich et al., U.S. Pat. No. 5,321,768, System for Recognizing Handwritten Character Strings Containing Overlapping And/Or Broken Characters.

25) Govindaraju et al., U.S. Pat. No. 5,515,455, System for Recognizing Handwritten Words of Cursive Script.

Legal Motivation

Our invention was motivated by several rulings in the United States courts that pertain to the presentation and admissibility of scientific testimony in general and handwritten document examination testimony in particular. Six such rulings and their summarized holdings are as follows:

Frye v. United States, 293 F. 1013 (D.C. Cir. 1923) (Expert opinion based on a scientific technique is inadmissible unless the technique is generally accepted as reliable in the relevant scientific community. Now superceded by Federal Rule of Evidence 702 and the holding of Daubert below.)

Daubert v. Merrell Dow Pharm., Inc., 509 U.S. 579 (1993) (To admit expert opinion based on scientific technique in court, the technique needs to be established based on testing, peer review, error rates and acceptability. Daubert is considered to be a landmark ruling in that it requires the judge to perform a gate-keeping function before scientific testimony is admitted.)

U.S. v. Starzecpysel, 880 F.Supp. 1027 (S.D.N.Y. 1995) ((i) Forensic document examination expertise is outside the scope of Daubert, which established reliability standards for scientific expert testimony; (ii) forensic document examination testimony is admissible as nonscientific or skilled testimony; (iii) possible prejudice deriving from possible perception by jurors that forensic testimony met scientific standards of reliability did not require exclusion of testimony.)

Gen. Elec. Co. v. Joiner, 522 U.S. 136 (1997) (Expert testimony that is both relevant and reliable must be admitted, and testimony that is irrelevant or unreliable must be excluded. Further, a weight-of-evidence methodology, where evidence other than expert testimony is admitted, is acceptable.)

Kumho Tire Co. v. Carmichael, 526 U.S. 137 (1999) (The reliability standard (does the application of the principle produce consistent results?) applies equally well to scientific, technical and other specialized knowledge.)

U.S. v. Paul, 175 F.3d 906 (11th Cir. 1999) cert. denied 528 U.S. 1023 (U.S. Nov. 29, 1999) (Handwriting analysis qualifies as expert testimony and is therefore admissible under the Daubert guidelines. It further states that if the witness qualifies as an expert on handwriting analysis, such testimony could assist the jury. Furthermore, the ability of the jury to perform the same visual comparisons as the expert, "cuts against the danger of undue prejudice from the mystique attached to expert.")

These court rulings point to the need for an invention and scientific study: (i) to validate the hypothesis that handwriting is individualistic, and (ii) to validate procedures used in establishing writer identity by experimentation and statistical analysis to establish error rates. Our study and this invention establish the individuality of handwriting, and provide a means and method for examining, analyzing and comparing the same. The approach taken in the present invention utilizes automated techniques derived from those used by experts.

SUMMARY OF THE INVENTION

The present invention comprises a computer based method of biometric analysis, comprising comparing a first biometric sample with a second biometric sample, wherein the first and second biometric samples form at least one cluster based on feature similarities between the first and second biometric samples.

A general object of the invention is to provide scientific support for the admission of handwriting and other biometric evidence in court.

Another object of the invention is to provide a method and apparatus for the examination, analysis and comparison of handwritten documents and other biometric samples for the purposes of authentication and identification.

In one embodiment, the present invention comprises a computer based method of biometric analysis, comprising comparing a first vector from a first biometric sample with a second vector from a second biometric sample, wherein the first and second vectors have at least one biometric feature.

In one aspect of the invention, the first vector and the second vector represent points in multidimensional space.

In another aspect, clustering of the first vector with the second vector indicates that the first biometric sample and the second biometric sample are from the same source. In yet another aspect, differences in clustering distance between the first vector and the second vector indicate that the first biometric sample and the second biometric sample are from different sources.

In another embodiment, the present invention comprises a computer based method of biometric analysis, comprising comparing a first biometric sample with a second biometric sample, wherein the first and second biometric samples form at least one cluster of at least one vector based on feature similarities between the first and second biometric samples.

In another aspect, the first and second biometric samples are selected from the group consisting of handwriting samples, voice samples, face geometry samples, fingerprint samples, hand geometry samples, iris samples, retinal samples, vein samples, and voice samples. In still another aspect, the first biometric sample and the second biometric sample are handwriting samples.

In yet another aspect, the least one cluster is a composite based on a model for measuring the distance between a first binary feature vector and a second binary feature vector.

The present invention may also incorporate a model for establishing individuality which is selected from the group consisting of an identification model and a verification model.

In another aspect, the at least one cluster is a composite based on a model for measuring the distance between a first binary feature vector and a second binary feature vector and wherein the accuracy of the model is measured by calculations involving features selected from the group consisting of micro-features, macro-features and a combination of micro- and macro-features.

In another aspect of the present invention, the first binary feature and the second binary feature are selected from the group consisting of a conventional feature and a computational feature.

Furthermore, the first binary feature and the second binary feature may be a conventional feature selected from the group consisting of arrangement, class of allograph, connection, design of allographs (alphabets) and their construction, vertical dimension, horizontal dimension, slant, slope, intraword spacing, interword spacing, abbreviation, baseline alignment, initial stroke, terminal stroke, presence of punctuation, style of punctuation, location of punctuation, embellishment, legibility, writing quality, line continuity, line quality, pen control, arched writing movement, angular writing movement, interminable writing movement, natural variation, natural consistency, persistency, lateral expansion, and word proportions.

In yet another aspect, the first binary feature and the second binary feature are a computational feature selected from the group consisting of a micro-feature and a macro-feature.

Optionally, the computational feature may be a micro-feature selected from the group consisting of gradient, structural and concavity attributes.

The computational feature may optionally incorporate a micro-feature of a character level parameter.

The computational feature may also optionally incorporate a macro-feature selected from the group consisting of entropy of gray values, gray level binarization threshold, black pixels, interior contours, exterior contours, vertical slope, horizontal slope, negative slope, positive slope, stroke width, height and slant.

The computational feature may be a macro-feature selected from the group consisting of a document parameter, a paragraph parameter, and a word level parameter.

In another embodiment, the present invention comprises an apparatus for biometric analysis, the apparatus comprising: means for comparing a first vector from a first biometric sample with a second vector from a second biometric sample, wherein said first and second vectors have at least one biometric feature.

In yet another embodiment, the present invention comprises a computer-readable medium having stored thereon a plurality of instructions for biometric analysis, wherein the plurality of instructions, when executed by a processor, cause the processor to compare a first vector from a first biometric sample with a second vector from a second biometric sample, wherein said first and second vectors have at least one biometric feature. The computer-readable medium may be a CD-ROM, DVD, laser disk, computer hard drive or any other medium known to those of skill in the art.

In another embodiment, the present invention comprises a propagated computer data signal transmitted via a propagation medium, the computer data system comprising a plurality of instructions for biometric analysis, wherein the plurality of instructions, when executed by a processor, cause the processor to compare a first vector from a first biometric sample with a second vector from a second biometric sample, wherein said first and second vectors have at least one biometric feature.

The propagation medium may be a computer, a workstation, a server, the Web or internet or any medium known to those of skill in the art.

Finally, the present invention comprises a computer based method of handwriting analysis, comprising:
calculating a first metric from a first vector having at least one feature from a first handwriting sample,
calculating a second metric from a second vector having at least one feature from a second handwriting sample, and
calculating the distance in two-dimensional feature space between the first and second metrics.

These and other objects, features and advantages of the invention will become readily apparent to one having ordinary skill in the art upon study of the following detailed description in view of the drawings and appended claims.

BRIEF DESCRIPTION OF THE DRAWINGS

The nature and mode of operation of the present invention will now be more fully described in the following detailed description of the invention taken with the accompanying drawing figures, in which:

FIG. 2 depicts the handwriting exemplar recommended for analysis where 2A is the source document to be copied by writers, and 2B is a digitally scanned handwritten sample provided by writer;

FIG. 5 shows some of the computational Macro-features, numbered 1 to 11 and their relationship to some of the conventional features (on the left);

FIG. 9 provides an input example of two writing samples for which a Macro-feature specifically, contour slope, operation was performed;

FIG. 24A is a screen capture of a File menu in the initial bar menu of FIG. 23, while

FIG. 25 is a screen capture of Batch Processing wherein

FIG. 28A is a screen capture of a Save and Save As menu under the File menu of FIG. 27, while

FIG. 31 is a screen capture of Macro features when a user chooses to display Macro Features for Known or Questioned documents;

FIG. 33 is a screen capture of a result of the comparison between a series of Micro features between a Known and a Questioned character which appears when the user has chosen a Micro feature for display as in FIG. 32;

FIG. 35 is a screen capture of a Palmer Metrics Comparison wherein the user has chosen to Show Palmer Metrics as in FIG. 34B;

FIG. 36 is a screen capture of a side by side comparison of auto identified characters when a user chooses to Display Auto Identified Characters under the View menu of the detailed menu bar of FIG. 29;

FIG. 37 is a screen capture of the results of automatically identified characters which appears when a user chooses to Display Character Distances under the View menu of the detailed menu bar of FIG. 29;

FIG. 38 is a screen capture of the results of document features which appears when a user chooses to Show Combined Document Features under the View menu of the detailed menu bar of FIG. 29;

DETAILED DESCRIPTION OF THE PREFERRED EMBODIMENT

At the outset, it should be appreciated that like drawing numbers on different drawing views identify identical structural elements of the invention. While the present invention is described with respect to what is presently considered to be the preferred embodiments, it is understood that the invention is not limited to the disclosed embodiments.

Overview of Problem and Scientific Basis for Invention

This invention is premised on a scientific study and analysis. We describe herein the problem to be solved, the pertinent issues, and the scientific study underlying the present invention. We also provide a description of the invention to enable one having ordinary skill in the art to make and use the invention.

Figure 1:
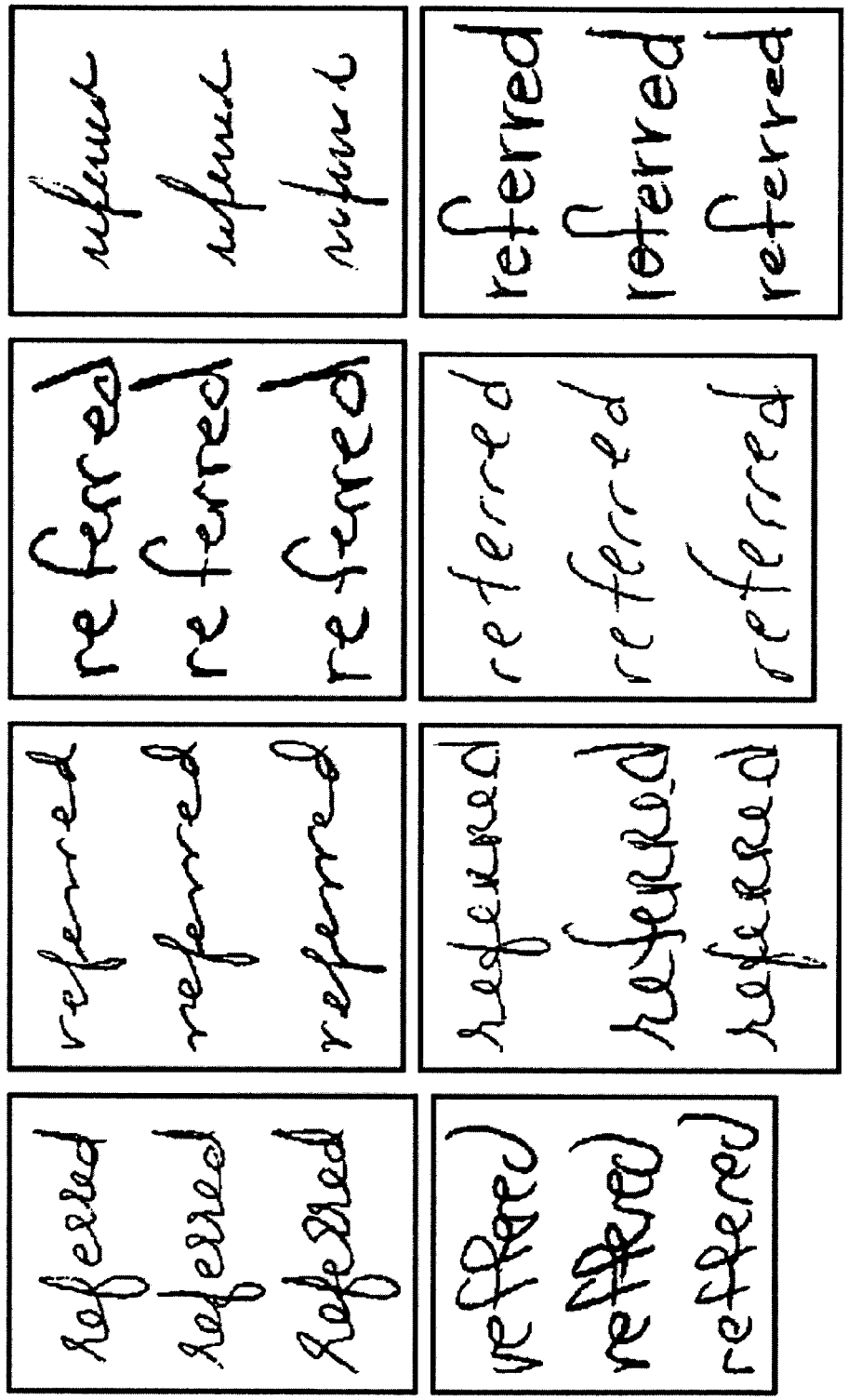
FIG. 1 is a composite indicating the level of variability in handwriting wherein samples were provided by eight writers (boxed), each of whom wrote the same word thrice.
Figure 3B:
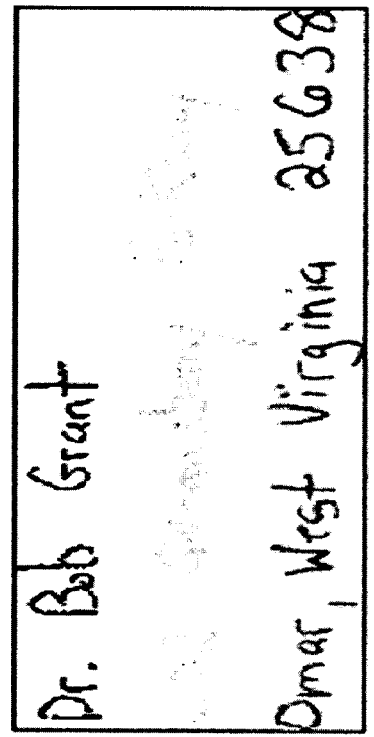
FIG. 3 provides examples of four levels/parameters of document segmentation such as A) paragraph (address block), (B) line level, (C) word, and (D) character.
Figure 3D:
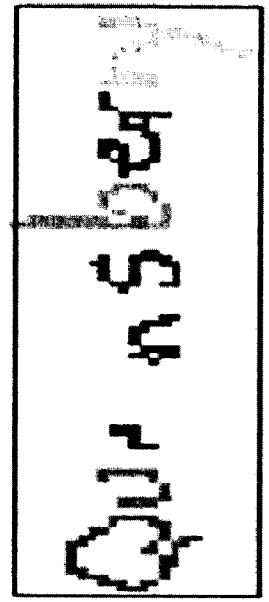
Figure 3A:
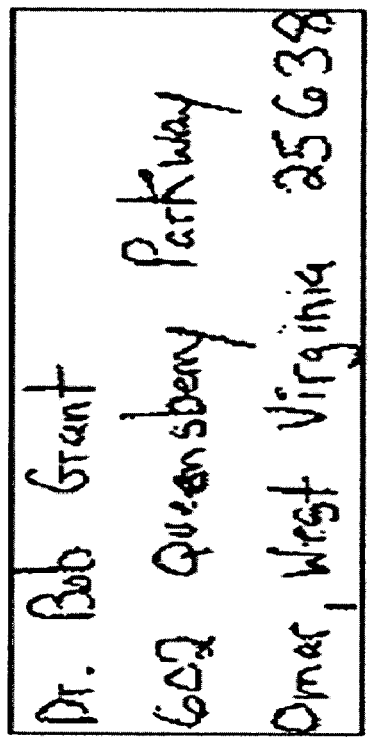
Figure 3C:
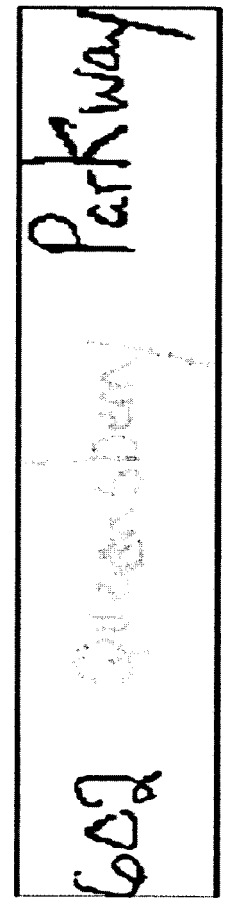

There are two variabilities of concern in comparing handwriting: within the handwriting of the same individual and between the handwritings of two individuals. These two variabilities are seen when several individuals are asked to write the same word many times, as seen in FIG. 1. Intuitively, the within-writer variation (the variation within a single person's handwriting samples) is less than the between-writer variation (the variation between the handwriting samples of two different people). The goal of this invention and scientific study was to establish this intuitive observation in an objective manner. The study consisted of three phases: data collection, feature extraction, and statistical analysis to establish the discriminative power of handwriting. In the data collection phase, representative samples of handwriting were collected. The feature extraction phase was to obtain handwriting attributes that would enable the writing style of one writer to be discriminated from the writing style of another writer. The validation phase was to associate a statistical confidence level with a measure of individuality.

The study pertained to natural handwriting and not to forgery or disguised handwriting. Examination of handwritten documents for forensic analysis is different from recognition of content, e.g., reading a postal address, or in attempting to assess personality (also known as graphology).

Handwriting Samples

Our objective was to obtain a set of handwriting samples that would capture variations in handwriting between and within writers. This meant that we would need handwriting samples from multiple writers, as well as multiple samples from each writer. The handwriting samples of the sample population should have the following properties (loosely based on properties set forth in Huber R A, Headrick AM. Handwriting Identification: Facts and Fundamentals. Boca Raton: CRS Press 1999): (i) they are sufficient in number to exhibit normal writing habits and to portray the consistency with which particular habits are executed, and (ii) for comparison purposes, they should have similarity in texts, in writing circumstances and in writing purposes.

Several factors may influence handwriting style, e.g., gender, age, ethnicity, handedness, the system of handwriting learned, subject matter (content), writing protocol (written from memory, dictated, or copied out), writing instrument (pen and paper), changes in the handwriting of an individual over time, etc. For instance, we decided that document content would be such that it would capture as many features as possible. Only some of these factors were considered in the experimental design. The other factors will have to be part of a different study. However, the same experimental methodology can be used to determine the influence factors not considered.

There were two design aspects to the collection of handwriting samples: content of the handwriting sample and determining the writer population.

Source Document

A source document in English, which was to be copied by each writer, was designed for the purpose of this study. This source document is shown in FIG. 2A. It is concise (156 words) and complete in that it captures all characters (alphabets and numerals) and certain character combinations of interest. In the source document, each alphabet occurs in the beginning of a word as a capital and a small letter and as a small letter in the middle and end of a word (a total of 104 combinations). The number of occurrences in each position of interest in the source text is shown in Table 1 below. In addition, the source document also contains punctuation, all ten numerals, distinctive letter and numeral combinations (ff, tt, oo, 00), and a general document structure that allows extracting macro-document attributes such as word and line spacing, line skew, etc. Forensic literature refers to many such documents, including the *London Letter* and the *Dear Sam Letter*. Osborn A S, Questioned Document. 2d ed. Albany, NY: Boyd Printing, 1929. We set out to capture each letter of the alphabet as capital letters and as small letters in the initial, middle, and terminal positions of a word. This creates a total of 104 possibilities (cells) for each of the 26 letters in the alphabet. A measure of "completeness" of the source text is given by the expression: (104—Number of empty cells)/104. While our source text scores 99% on this measure, the London Letter scores only 76%.

Each participant (writer) was required to copy-out the source document three times in his/her most natural handwriting, using plain, unruled sheets, and a medium black ballpoint pen provided by us. The repetition was to determine, for each writer, the variation of handwriting from one writing occasion to the next.

Writer Population

We decided to make the writer population as representative of the U.S. population as possible. Statistical issues in determining the writer population are: the number of samples needed to make statistically valid conclusions and the population distribution needed to make conclusions that apply to the US population, which are issues in the design of experiments. Lohr, S L. Sampling: Design and Analysis. Pacific Grove, CA: Duxbury Press, 1999.

Randomness

If the samples are random, then every individual in the US should have an equal chance of participating in the study. We attempted to make our sample population as random as possible. Sample handwriting was obtained by contacting participants in person, by mail, by advertising the study with the use of flyers and internet newsgroups, and by manning a university booth. For geographic diversity, we obtained samples by contacting schools in three states (Alaska, Arizona, and New York) and communities in three states (Florida, New York, and Texas) through churches and other organizations.

Sample Size

The sample population should be large enough to enable drawing inferences about the entire population through the observed sample population. The issue of large enough is related to sampling error, the error that results from taking one sample instead of examining the whole population, i.e., how close is an estimate of a quantity based on the sample population to the true value for the entire population?

Public opinion polls that use simple random sampling specify using a sample size of about 1100, which allows for a 95% confidence interval, with a margin of error of 0.03 (10). Higher precision levels would entail a larger number of samples. Our database has a sample size of about 1500, and our results are therefore subject to such a margin of error.

Representativeness

The sample population should be representative of the US population. For instance, since the US population consists of an (approximately) equal number of males and females, it

TABLE 1

Positional frequency of occurrence of letters in text.

| | A | B | C | D | E | F | G | H | I | J | K | L | M | N | O | P | Q | R | S | T | U | V | W | X | Y | Z |
|---|---|---|---|---|---|---|---|---|---|---|---|---|---|---|---|---|---|---|---|---|---|---|---|---|---|---|
| Init | 4 | 2 | 4 | 1 | 1 | 1 | 1 | 1 | 1 | 2 | 3 | 1 | 1 | 1 | 2 | 2 | 1 | 1 | 1 | 2 | 1 | 1 | 3 | 1 | 1 | 1 |

| | a | b | c | d | e | f | g | h | i | j | k | l | M | n | o | p | q | r | s | t | u | v | w | x | y | z |
|---|---|---|---|---|---|---|---|---|---|---|---|---|---|---|---|---|---|---|---|---|---|---|---|---|---|---|
| Init | 17 | 4 | 1 | 1 | 6 | 1 | 2 | 9 | 4 | 2 | 1 | 2 | 2 | 1 | 6 | 2 | 1 | 5 | 8 | 14 | 1 | 1 | 8 | 1 | 3 | 1 |
| Mid | 33 | 2 | 8 | 6 | 59 | 4 | 5 | 20 | 32 | 1 | 3 | 14 | 3 | 35 | 36 | 4 | 1 | 30 | 19 | 25 | 18 | 7 | 5 | 2 | 2 | 2 |
| Term | 5 | 2 | 1 | 21 | 20 | 3 | 3 | 5 | 1 | 0 | 3 | 5 | 2 | 7 | 5 | 1 | 1 | 12 | 15 | 17 | 2 | 1 | 2 | 1 | 8 | 1 | would be unwise to perform the study on a sample population and expect the conclusions of the study to apply to the entire US population consisting of males and females (especially in the absence of any scientific evidence that proves or disproves the association between handwriting and gender). The sample was made representative by means of a stratified sample with proportional allocation). Lohr, supra.

We divided the population into a pre-determined number of sub-populations, or strata. The strata do not overlap, and they constitute the whole population so that each sampling unit belongs to exactly one stratum. We drew independent probability samples from each stratum, and we then pooled the information to obtain overall population estimates. The stratification was based on US census information (1996 projections). Proportional allocation was used when taking a stratified sample to ensure that the sample reflects the population with respect to the stratification variable and is a miniature version of the population. In proportional allocation, so called because the number of sampled units in each stratum is proportional to the size of the stratum, the probability of selection is the same for all strata. Thus, the probability that an individual will be selected to be in the sample is the same as in a simple random sample without stratification, but many of the bad samples that could occur otherwise cannot be selected in a stratified sample with proportional allocation. The sample size again turns out to be about 1000 for a 95% confidence interval, with a margin of error of 0.03.

A survey designed as above would allow drawing conclusions only about the general US population and not any subgroup in particular. In order to draw any conclusions about the subgroups, we would need to use allocation for specified precision within data. This would entail having 1000 in each cell of the cross-classification.

From the census data, we obtained population distributions pertaining to gender, age, ethnicity, level of education, and country of origin; we also obtained a distribution for handedness from Gilbert A N, Wysocki C J. Hand Preference and Age in the United States. Neuropsychologia 1992: 30:601-8. Based on this information, a proportional allocation was performed for a sample population of 1000 across these strata. Among these variables, only gender, age, and ethnicity can be considered as strata (by definition). Due to the limited amount of census data on other combinations, we were unable to stratify across handedness and level of education.

Each writer was asked to provide the following writer data, enabling us to study the various relationships: gender (male, female), age (under 15 years, 15 through 24 years, 25 through 44 years, 45 through 64 years, 65 through 84 years, 85 years and older), handedness (left, right), highest level of education (high school graduate, bachelors degree and higher), country of primary education (if US, which state), ethnicity (Hispanic, white, black, Asian/Pacific Islander, American Indian/Eskimo/Aleut), and country of birth (US, foreign).

The details (actual/target) of the distribution for a sample size of 1568 writers are given in Table 2. The strata are sometimes under-represented (actual<target) or over-represented (actual>target). Parameters considered in addition to strata shown in Table 2 are handedness and country of origin—Male: handedness (right, left): 382/429, 61/61, and country of origin (US, foreign): 373/451, 71/39; Female: handedness (right, left): 1028/461, 95/49, and country of origin (US, foreign): 1026/469, 98/41.

TABLE 2

Writer population distribution in handwriting database (actual and target): male population size: 444/490, female population size: 1124/510. The population was stratified over gender, age, ethnicity, education, and handedness. (The numbers may not add to 1568 because a few subjects did not provide the relevant information.)

| Ethnicity/Gender | White Female | White Male | Black Female | Black Male | API Female | API Male | AIEA Female | AIEA Male | Hispan Female | Hispan Male |
|---|---|---|---|---|---|---|---|---|---|---|
| Age/Total | 872/371 | 333/359 | 103/64 | 36/56 | 38/16 | 31/14 | 19/5 | 4/5 | 91/54 | 40/56 |
| 12-14 | 49/17 | 25/16 | 2/4 | 2/4 | 1/1 | 2/1 | 0/0 | 0/0 | 22/4 | 16/4 |
| 15-24 | 158/66 | 111/64 | 25/15 | 13/13 | 16/4 | 18/2 | 4/1 | 1/2 | 22/13 | 10/14 |
| 25-44 | 252/140 | 76/136 | 31/25 | 8/22 | 12/6 | 7/6 | 11/3 | 2/1 | 34/24 | 11/24 |
| 45-64 | 267/87 | 69/85 | 24/13 | 10/11 | 6/4 | 2/3 | 3/1 | 1/1 | 7/10 | 1/10 |
| 65-84 | 139/56 | 50/55 | 20/6 | 3/5 | 3/1 | 2/1 | 1/0 | 0/0 | 6/3 | 2/4 |
| 85~ | 7/5 | 2/5 | 1/1 | 0/1 | 0/0 | 0/1 | 0/0 | 0/1 | 0/0 | 0/0 |

There may be other relevant strata that could have been considered, such as the system of writing learned (e.g., the Palmer method), country in which writing was learned, etc. We were constrained by the limited information we have on these distributions. Moreover, a perfect sample (a scaled-down version of the population that mirrors every characteristic of the whole population) cannot exist for complicated populations. Even if it did exist, we would not know it was a perfect sample without measuring the whole population.

Handwriting Attributes (Features)

Our approach to studying the handwriting of different individuals was to scan the samples into a computer and then automatically obtain handwriting attributes for further study.

Scanning and Image Segmentation

Each handwritten document was scanned and converted into a digitized image using a desk-top black-and-white scanner. The resolution of scanning was 300 dots per inch, and the resulting images were stored as gray-scale images of discrete pixels (each pixel value can vary from 0 to 255, where 0 is pure black, and 255 is pure white). After all handwritten documents were digitally scanned, the gray-scale image was converted to a pure black and white (or binary) image by using a binarization algorithm. The method of binarization determines a threshold gray-scale value such that any value higher than the threshold is deemed to be white and any value lower is deemed to be black.

Paragraph and line images were acquired from each document image by segmentation. Word images were segmented from the line image, and each character image was segmented from the word image. We used a commercial image-manipulating tool (Adobe® Photoshop) to manually extract line, word, and character images. Examples of extracted paragraph, line, word, and character images are shown in FIG. 3. Optionally, each distinct line, word, or character is assigned a distinct shade/color.

Figure 4:
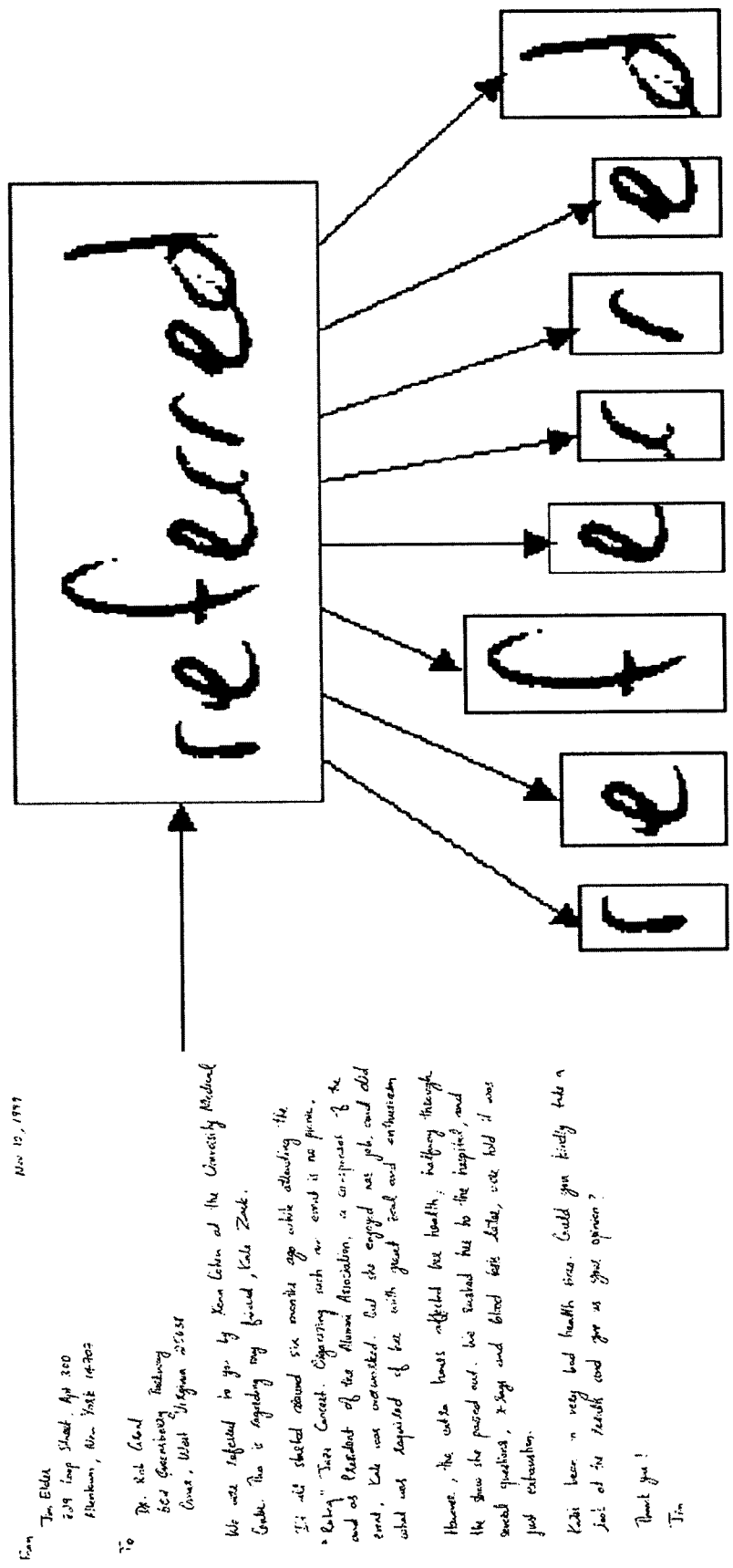
FIG. 4 provides examples of segmented word (see FIG. 3C) and character images (see FIG. 3D) wherein snippets of words and characters are extracted from, specifically, the handwritten word referred.

Segmentation of the eight characters of the word referred is illustrated in FIG. 4. These eight characters were used as sample allographs in some of the tests conducted for individuality. Thus, the shapes of these eight characters were used to determine the writer.

Features are quantitative measurements that can be obtained from a handwriting sample in order to obtain a meaningful characterization of the writing style.

These measurements can be obtained from the entire document or from each paragraph, word, or even a single character. In pattern classification terminology, measurements, or attributes, are called features. In order to quantify the process of matching documents, each sample is mapped onto a set of features that correspond to it, called a feature vector. For example, if measurements, $f_1, f_2, \ldots, f_d$, are obtained from a sample, then these measurements form a column vector $[f_1, f_2, \ldots f_d]^t$, which is a data point in d-dimensional space (12); note that the superscript t indicates vector transposition.

We distinguish between two types of features: conventional features and computational features. Conventional features are the handwriting attributes that are commonly used by the forensic document examination community. These features are obtained from the handwriting by visual and microscopic examination. Software tools such as FISH (Forensic Information System for Handwriting), developed in Germany, are used to narrow down the search. Computational features are features that have known software/hardware techniques for their extraction. The two types of features have some correspondence.

Conventional Features

Forensic document examiners use a host of qualitative and quantitative features in examining questioned documents. These features have been compiled into twenty-one discriminating elements of handwriting). Huber R A, Headrick A M. Handwriting Identification: Facts and Fundamentals. Boca Raton: CRC Press, 1999. A discriminating element is defined as "a relatively discrete element of writing or lettering that varies observably or measurably with its author and may, thereby, contribute reliably to distinguishing between the inscriptions of different persons, or to evidencing the sameness in those of common authors." The 21 features are: arrangement; class of allograph; connections; design of allographs (alphabets) and their construction; dimensions (vertical and horizontal); slant or slope; spacings, intraword and interword; abbreviations; baseline alignment; initial and terminal strokes; punctuation (presence, style, and location); embellishments; legibility or writing quality; line continuity; line quality; pen control; writing movement (arched, angular, interminable); natural variations or consistency; persistency; lateral expansion; and word proportions.

Computational Features

Computational features are those that can be determined algorithmically, e.g., by software operating on a scanned image of the handwriting. Computational features remove subjectivity from the process of feature extraction. While it could be argued that all conventional features could eventually be computational features—when the correct algorithms have been defined—the fact remains that most of the conventional features are not yet computable.

While some conventional features like embellishments and line quality are difficult to implement algorithmically, several of the other features are computable based on existing techniques for handwriting recognition. Srihari S N, Feature Extraction for Locating Address Blocks on Mail Pieces. In: Simon J C, ed. From Pixels to Features. Amsterdam: North Holland, 1989; 261-73; Srihari S N, Recognition of Handwritten and Machine-Printed Text for Postal Address Interpretation. Pattern Recognition Letters 1993; 14:291-303. Handwriting recognition differs from handwriting identification in that they are two opposite processes. The objective of handwriting recognition is to filter out individual variability from handwriting and recognize the message. The objective of handwriting identification is to capture the essence of the individuality, while essentially ignoring the content of the message. The two share many aspects of automated processing, such as determining lines, strokes, etc. For instance, handwriting recognition procedures routinely compute baseline angle and slant so that a correction can be applied prior to recognition. Govindaraju V, Shekhawat A, Srihari S N. Interpretation of handwritten addresses in US mail stream. In: Proceedings of the $2^{nd}$ Int Conf on Document Analysis and Recognition; 1993 Oct. 20-22; Tsukuba Science City, Japan: International Association for Pattern Recognition, 1993.

Computational features can be divided into macro- and micro-features, depending on whether they pertain globally to the entire handwritten sample, e.g., darkness, or are extracted locally, e.g., contour variations. Macro-features can be extracted at the document level (entire handwritten manuscript) or at the paragraph, line, word, and character levels. We used a set of eleven macro-features that are loosely related to the document examiner discriminating elements as shown in FIG. 5.

Micro-features are computed at the allograph, or character shape, level. They are analogous to the allograph-discriminating elements among document examiner features. The features that we used are those used in recognizing handwriting scanned from paper documents (called off-line recognition), which differ from those used in devices such as handheld PDAs (called on-line recognition). Features corresponding to gradient, structural, and concavity (GSC) attributes, which are used in automatic character recognition for interpreting handwritten postal addresses, were used as micro-features. Srikantan G, Lam S W, Srihari S N. Gradient-based contour encoding for character recognition. Pattern Recognition 1996; 29:1147-1160. Srikantan G, Lee D S, Favata J T. Comparison of normalization methods for character recognition. In: Proceedings of the $3^{rd}$ Int Conf on Document Analysis and Recognition; 1995 August 14-16; Montreal: International Association for Pattern Recognition, 1995.

Feature Extraction

Macro-Features

The macro-features can also be grouped into three broad categories: darkness features, contour features (connectivity and slope features), and averaged line-level features. Darkness features, such as entropy of gray-level values, gray-level threshold, and number of black pixels, are indicative of the pen pressure. The number of interior and exterior contours is indicative of writing movement. The number of horizontal, vertical, negative, and positive slope components is indicative of stroke formation. Brief descriptions of algorithms for computing the eleven macro-features follow (see Srihari S N, Cha S-H, Arora H, Lee S. Handwriting identification: research to study validity of individuality of handwriting & develop computer-assisted procedures for comparing handwriting. Buffalo (NY): University at Buffalo, State University of New York; 2001 TR No.: CEDAR-TR-01-1, for greater detail).

Measures of Pen Pressure

Gray-level distribution (measured by its entropy): Entropy is an information theoretic measure of disorder. The gray-scale histogram (frequency plot of the gray-values) of the scanned image is normalized and regarded as a probability distribution. The entropy of the probability distribution is calculated as $-\Sigma_i p_i \log p_i$, where $p_i$ is the probability of the $i^{th}$ gray value in the image. This gives an indication of the variation of gray-levels in the image. For example, an image where each gray-level is equally likely will have a very high entropy.

Gray-level threshold value: The scanned gray-scale image is converted into a pure black-and-white, or binary, image by using a thresholding algorithm. It maps the gray-level pixel values in the image that are below a particular threshold to pure black (foreground) and those above the threshold to pure white (background). The threshold value (the gray-scale value that partitions the foreground and background of the gray-level image) is determined using a gray-level histogram. Otsu N. A threshold selection method from gray-scale histograms. IEEE Trans System, Man, and Cybernetics 1979; 9:62-66. The value of the threshold is indicative of the pen-pressure, with higher values indicating lighter pressure.

Number of black pixels: This is a count of the number of foreground pixels in the thresholded image. The number of black pixels is indicative of the pen-pressure, thickness of strokes, and the size of writing.

Measures of Writing Movement

Figure 6:
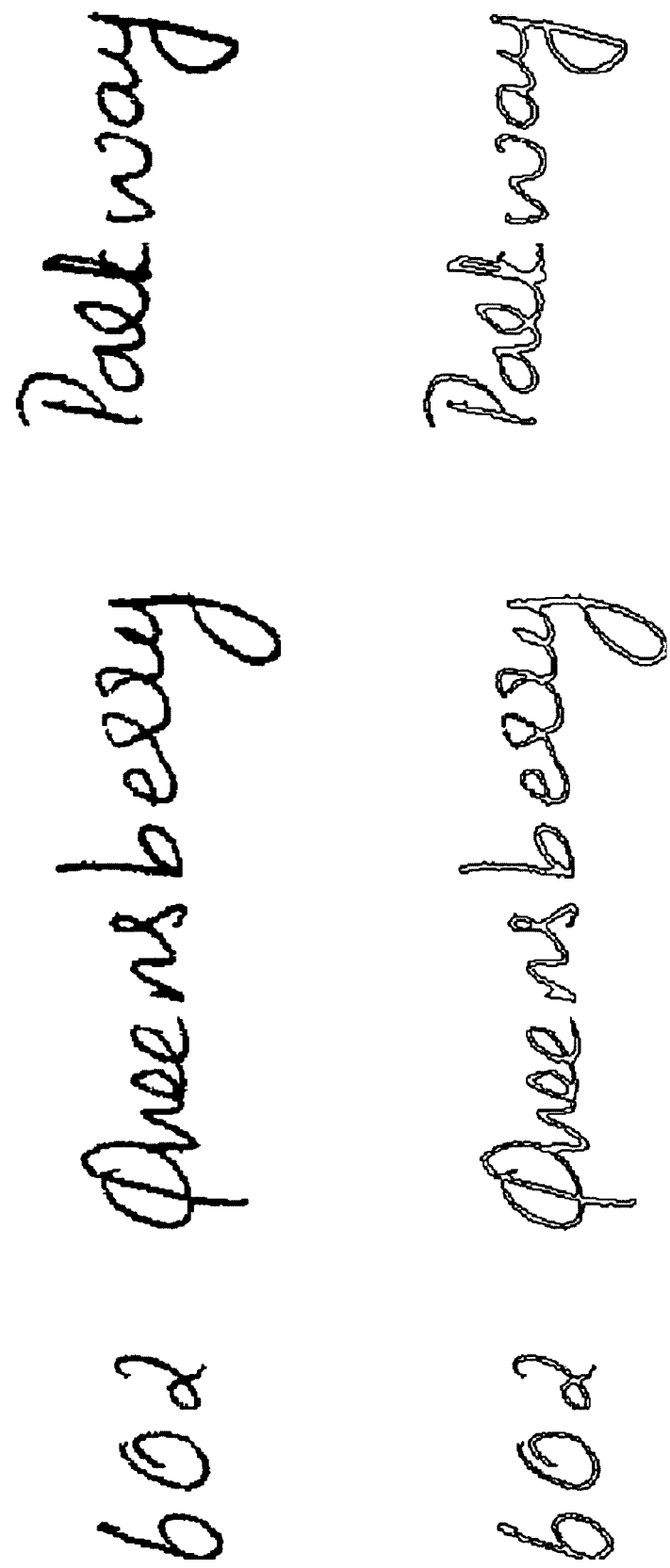
FIG. 6 shows the process of extraction of contours of handwriting wherein the thresholded image of a line of handwritten text is shown above the corresponding contour image.
Figure 7:
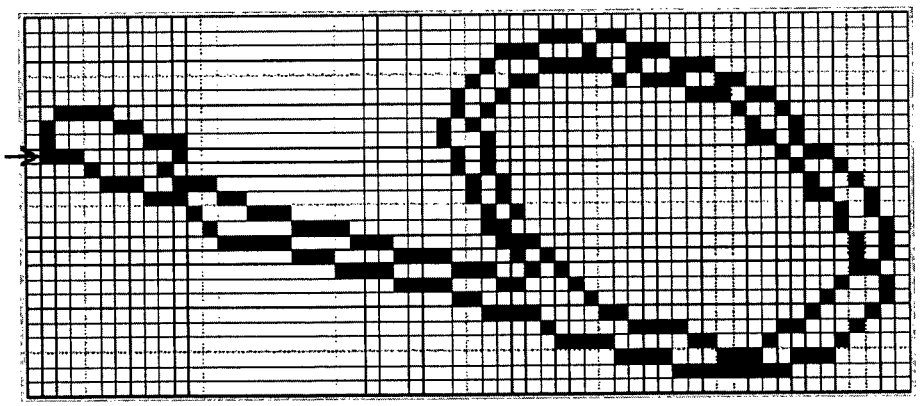
FIG. 7 shows the feature representation of a digitized numeral 6 (on left), and the chaincode of the number's exterior and interior contours (on right)

The thresholded black-and-white images are processed to determine the connected components in the image—each connected component can be thought of as a "blob." The outlines of the blobs, or contours, are stored and manipulated. A binary image of a line of text from the handwritten source document and the corresponding contour image are shown in FIG. 6. The outlines, or contours, are stored as chaincodes. Freeman H. On the encoding of arbitrary geometric configurations. IRE Trans Electronic Computers 1961; 18:312-324. Kim G, Govindaraju V. A lexicon-driven approach to handwritten word recognition for real-time applications. Trans on Pattern Analysis and Machine Intelligence 1997; 19:366-379. A chaincode is a series of integers in the range 0-7, each of which represents a direction of slope of the contour, e.g., 0 represents east, 1 represents north-east, 2 represents north, 3 represents north-west, etc. The chaincodes of the numeral 6 are in FIG. 7.

Figure 8A:
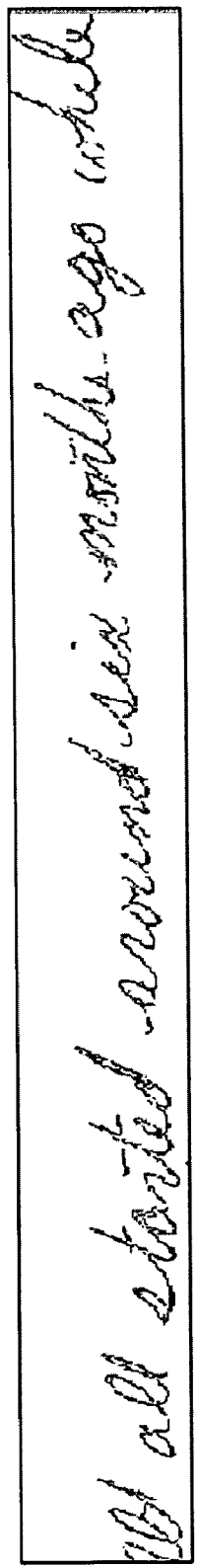
FIG. 8 provides an input example of two writing examples for which, a Macro-feature specifically, connectivity, operation was performed.
Figure 8B:
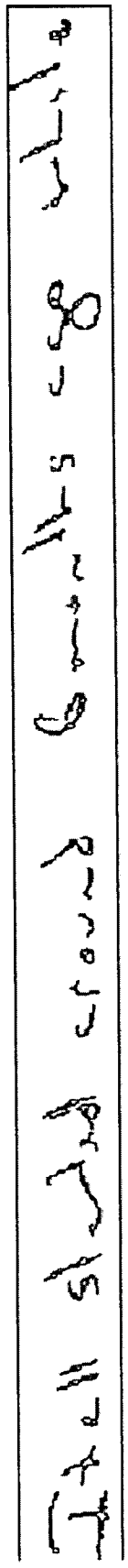

Two sets of features are extracted from the contour image as follows:

Contour connectivity features: The number of interior and exterior contours is extracted from the chaincode representation of the image. The average number of interior and exterior contours can be used as a measure of writing movement: cursive handwriting, for example, would have a greater number of interior contours and fewer exterior contours, while disconnected hand-printing would have a very large number of exterior contours. Examples of contour connectivity features for two samples from the database are shown in FIG. 8. The variables for sample 8A were determined to be: number of exterior contours=17, number of interior contours=49, while the 8B sample was number of exterior contours=34, number of interior contours=7. Note that while the figure shows the connectivity features extracted for a line, these features can be calculated for the entire document, paragraph, line, word, or character.

Measures of Stroke Formation

Contour slope features: Vertical, negative, positive, horizontal slope components are indicative of the nature of stroke formation. Flattish writing would have a greater number of horizontal slope components, while handwriting with a distinctive negative slope would have a large number of negative slope components. Contour slope features for two samples from the database are shown in FIG. 9, which shows the connectivity features extracted for the block of text. Variables include: normalized number of horizontal ($n_h$), positive ($n_p$), vertical ($n_v$), and negative ($n_n$) slope components features. For the two samples illustrated, the numbers were: (a) $n_h$=0.06, $n_v$=0.15, $n_n$=0.68, $n_p$=0.11; (b) $n_h$=0.04, $n_v$=0.14, $n_n$=0.72, $n_p$=0.10.

Slant and Proportion

The last two macro-features, slant and height, are extracted at the line level (and averaged over the entire document, if necessary):

Slant: Vertical and near-vertical lines are extracted from the chaincode. Global slant angle is the average of all the angles of these lines, weighted by their length in the vertical direction since the longer lines give a more accurate angle value than the shorter ones.

Height: The height is calculated (for each line in the document) by considering the distance between contiguous maxima and minima in the upper contour of the chaincode. It is then averaged over the entire document.

Feature vectors composed of the eleven macro-features for three writers $W_1$, $W_2$, and $W_3$ with corresponding samples $W_{11}$, $W_{12}$, $W_{13}$, $W_{21}$, $W_{22}$, $W_{23}$, and $W_{31}$, $W_{32}$, $W_{33}$ are shown in Table 3.

TABLE 3

Sample macro-features extracted from samples of three writers.

| Writer | Sample | F 1 | F 2 | F 3 | F 4 | F 5 | F 6 | F 7 | F 8 | F 9 | F 10 | F 11 |
|---|---|---|---|---|---|---|---|---|---|---|---|---|
| $W_1$ | $W_{1,1}$ | 0.50 | 188 | 184K | 15 | 14 | 0.31 | 0.13 | 0.28 | 0.28 | 8.8 | 25 |
|  | $W_{1,2}$ | 0.47 | 187 | 182K | 15 | 16 | 0.32 | 0.13 | 0.27 | 0.28 | 8.3 | 25 |
|  | $W_{1,3}$ | 0.52 | 186 | 181K | 16 | 15 | 0.33 | 0.12 | 0.26 | 0.20 | 10.4 | 23 |
| $W_2$ | $W_{2,1}$ | 0.54 | 198 | 205K | 21 | 23 | 0.20 | 0.12 | 0.43 | 0.25 | 6.5 | 30 |
|  | $W_{2,2}$ | 0.53 | 197 | 201K | 21 | 25 | 0.20 | 0.12 | 0.43 | 0.25 | 6.1 | 30 |
|  | $W_{2,3}$ | 0.57 | 197 | 200K | 21 | 22 | 0.20 | 0.12 | 0.42 | 0.26 | 7.7 | 30 |
| $W_3$ | $W_{3,1}$ | 0.82 | 191 | 373K | 7 | 20 | 0.29 | 0.10 | 0.29 | 0.32 | 17.2 | 27 |
|  | $W_{3,2}$ | 0.80 | 189 | 368K | 10 | 26 | 0.30 | 0.09 | 0.28 | 0.33 | 18.1 | 25 |
|  | $W_{3,3}$ | 0.85 | 191 | 390K | 10 | 26 | 0.31 | 0.10 | 0.29 | 0.30 | 14.0 | 29 |

$W_1$ is male, 65-84, right-handed, college-educated, white, US-educated; writer $W_2$ (sample 1 is shown in FIG. 2(b)) is female, 25-44, right-handed, college-educated, API, foreign-educated; and writer $W_3$ is female, 45-64, left-handed, college-educated, white, US-educated. For instance, sample $W_{11}$ had raw values as follows: entropy=0.5, threshold=195, # of black pixels=184,000, # of exterior contours=15, # of interior contours=14, # of horizontal slope components=0.31, # of negative slope components=0.13, # of vertical slope components=0.28, # of positive slope components=0.28, slant=8.8, and height=25.

Figures 10A, 10B:
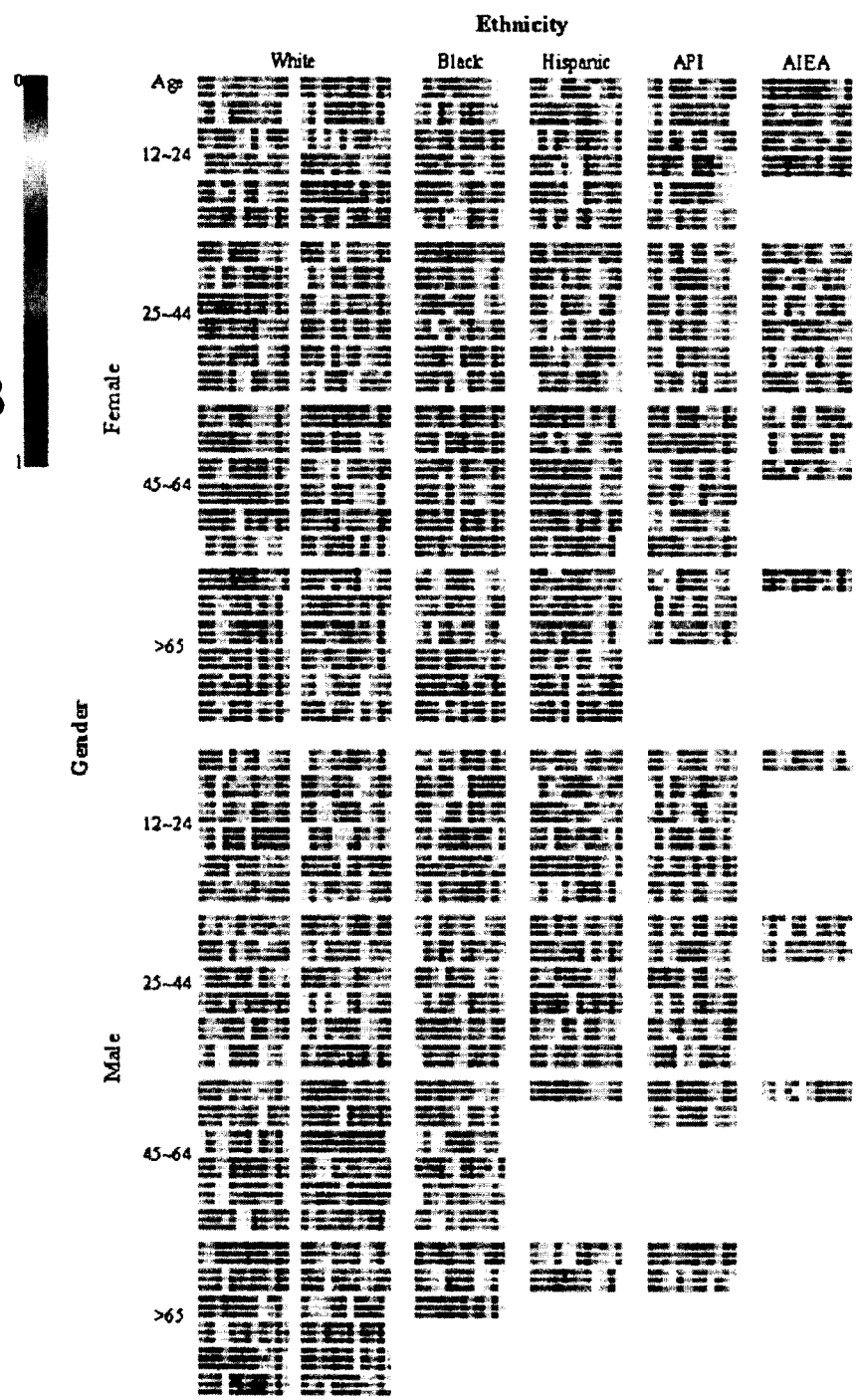
FIG. 10 shows a black and white composite of a handwriting feature map for 500 writers, each writer having three samples.

The variation of features (stratified across gender, age, and ethnicity) for approximately 300 writers (3 samples each) is shown in FIG. 10 by mapping the normalized feature values to color scale of eleven values. FIG. 10 (A) is a black and white representation of color scale for representing normalized feature values: 0 is on top, and 1 is at the bottom of the scale. FIG. 10 (B) is a feature map, where each horizontal bar represents eleven macro-features extracted from a single sample. There are three bars per writer corresponding to three exemplars. The color image can be seen at http://www.cedar.buffalo.edu/NIJ/colormap1.gif.

The white population has greater representation (two columns) than other ethnic groups (one column each) as an indication of a greater percentage of white people in the database (since it was based on proportional allocation). As indicated by the map, there is consistency within different samples of a writer and considerable variation between samples of different writers.

Paragraph- and Word-Level Features

Sub-images corresponding to paragraphs, words, and characters were extracted semi-automatically, and then the features were computed from the sub-images automatically. The feature sets were slightly modified for paragraphs and words as follows:

Macro-Features: Paragraph-Level

Paragraph-level features were extracted from the destination address block that appears in the source text. Macro-features 3 through 11 were extracted at the paragraph level. Two new features were extracted: height to width ratio (aspect ratio) and indentation (margin width).

Macro-Features: Word-Level

Macro-features 3 through 11 were extracted at the word level if the content of the words being compared is the same. Three new features are extracted: upper zone ratio, lower zone ratio, and length. The word-level features were extracted for the word referred in the source text.

The relationship between the feature sets at the document, paragraph, and word levels is shown in Table 4.

TABLE 4

Features extracted from handwritten document at three levels of coarseness: word, paragraph, and document.

| Features | Document | Paragraph | Word |
|---|---|---|---|
| Gray-level entropy | Y | | |
| Gray-level threshold | Y | | |
| No. of black pixels | Y | Y | Y |
| No. of interior & exterior contours | Y | Y | Y |
| No. of 4-directional slope components | Y | Y | Y |
| Average height | Y | Y | Y |
| Average slant | Y | Y | Y |
| Aspect ratio | | Y | |
| Margin Width | | Y | |
| Length | | | Y |
| Upper & lower zone ratio | | | Y |
| Centroid height & width ratio | | | |
| Spatial features | | | |
| GSC | | | |

Micro-Features

Figures 11A, 11B:
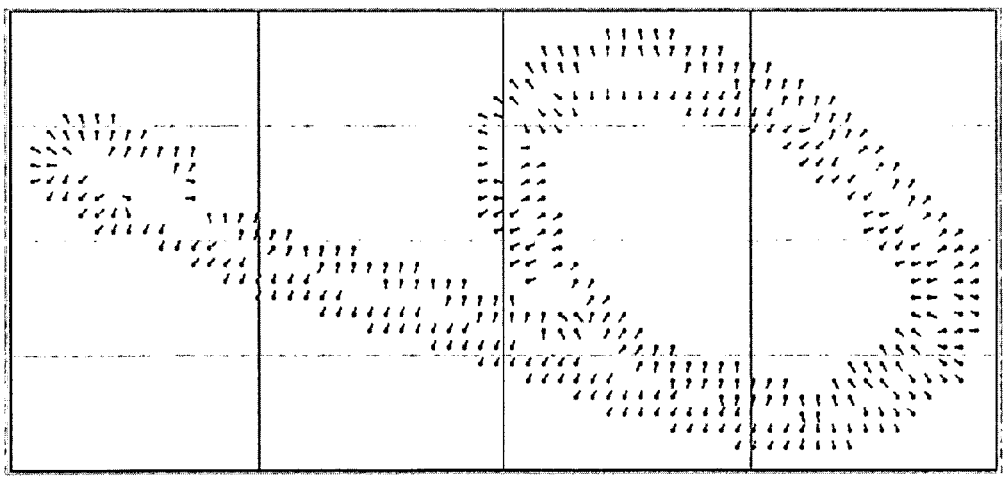
FIG. 11 shows some of the computational Micro-features of the digitized numeral 6 which include (A) gradient map, showing the directions of the image gradient at each pixel, and (B) gradient, structural, and concavity features (total 512 bits)

The micro-features consist of 512 binary (0 or 1 value) features corresponding to gradient (192 bits), structural (192 bits), and concavity (128 bits) features. Examples of micro-features of characters are shown in FIG. 11. The first gradient feature generator computes the gradient of the image by convolving it with a 3×3 Sobel operator (21, 22). The direction of the gradient at every edge is quantized to 12 directions. The structural feature generator takes the gradient map and looks in a neighborhood for certain combinations of gradient values. These combinations are used to compute eight distinct features that represent lines (strokes) and corners in the image. The concavity feature generator uses an eight-point star operator to find coarse concavities in four directions, holes, and large-scale strokes. The image feature maps are normalized with a 4×4 grid, and a feature vector is generated. These features were used at the character level in our study.

Statistical Analysis

Figure 12:
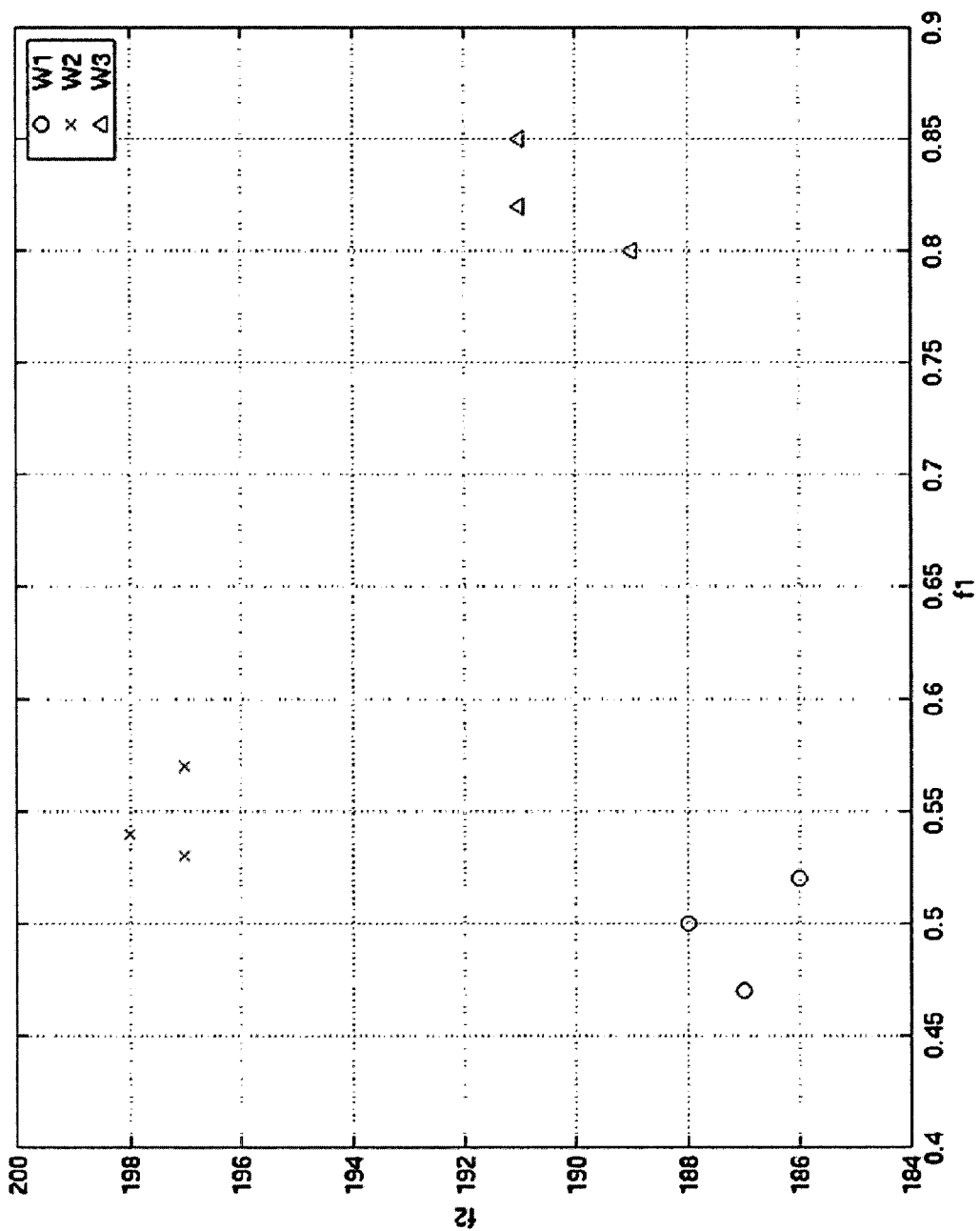
FIG. 12 is a graphical representation of the handwriting samples of three writers in two-dimensional feature space.

The analysis task is to use the handwriting samples were collected and features and the features extracted from the samples to establish the discriminative power of handwriting. One possible approach to doing this is as follows. Each handwriting sample may be viewed as a point in a multi-dimensional feature space. If, in feature space, all the samples of writer $W_1$ are close together and all the samples of writer $W_2$ are close together but samples of $W_1$ and $W_2$ are far apart, then we can say that $W_1$ and $W_2$ write differently and that samples of $W_1$ and $W_2$ belong to two different classes or clusters Duda R O, Hart P E. Pattern classification and scene analysis. NY: Wiley, 1973; Mirkin B. Mathematical classification and clustering. Dordrecht: Kluwer Academic Pub, 1996. This is illustrated for the three-writer data in Table 3 using the two-dimensional feature space, consisting of features F1 and F2 in FIG. 12.

In order to validate individuality among n writers, we would have to determine whether the samples form n distinct clusters, where samples of the same writer belong to the same cluster and samples of different writers belong to different clusters. A measure of distinctness of the clusters would be a measure of confidence of individual discriminability.

The task of determining the presence of distinct clusters can be approached by using the probability of correctly classifying samples of unknown writership as the criterion of clustering. In the identification model, given a handwriting sample x whose writer is unknown and samples of handwriting of n known writers, we would like to identify the writer of x among the n writers.

Figure 13A:
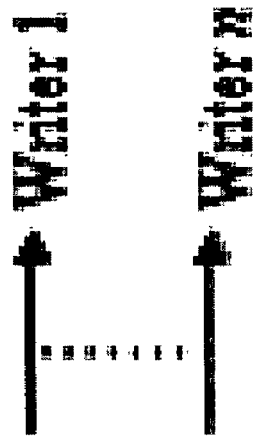
FIG. 13 represents the two models for establishing the individuality of handwriting wherein (A) represents the input and output from the identification model, and (B) represents the input and output of the verification model.
Figure 13B:
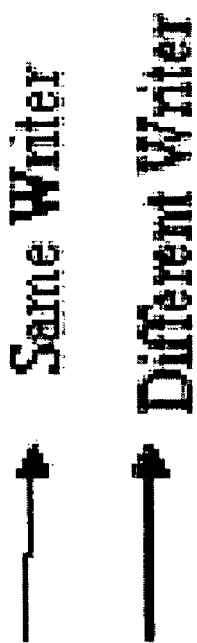

In the verification model, given two handwriting samples, $x_1$ and $x_2$, and samples of handwriting of n writers, we would like to determine whether $x_1$ and $x_2$ were written by the same person or by two different people among the n writers. Both models involve classification, with the identification model leading to an n-class problem (or a polychotomy of the feature space) and the verification model leading to a 2-class problem (or a dichotomy of the feature space) (see FIG. 13).

Figure 14:
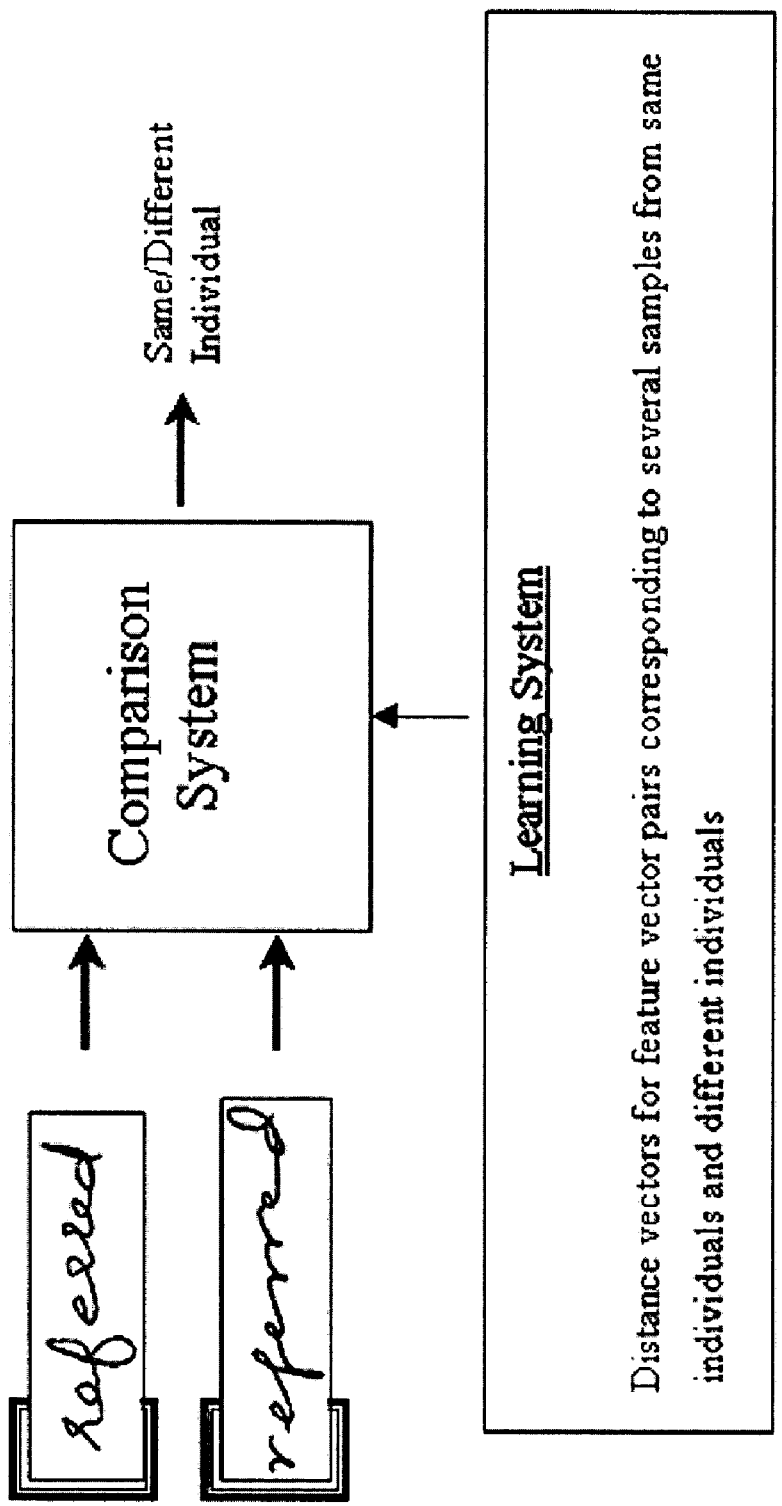
FIG. 14 represents the general algorithm for the verification model.

FIG. 14 shows that the verification model involves a learning system where distance vectors for feature vector pairs corresponding to several samples from same individuals and different individuals are input into the comparison system to determine if two samples are from the same or different individuals.

Each of these models can be regarded as tasks in machine learning. Mitchell TM. Machine learning. Boston: McGraw-Hill, 1997. Handwriting samples are used to learn the discrimination task. Once the task is learned, a set of samples is used to test the model for its accuracy. Both models will provide a probability of correct classification that we can use as a measure of confidence of the individuality hypothesis.

The question arises as to which model is better. The identification model has the advantage of being able to identify the writer directly. However, it is dependent on knowing all the writers in advance. The result with n writers does not generalize with n+1 writers. On the other hand, the verification model provides results that have statistical inferability. The two different classification approaches would provide a measure of cross-checking our results. Both models involve a method of measuring similarity, or nearness, or distance, between two samples. For macro-features, the distance between a pair of documents with feature vectors established based on their proximity to one another. We used the simplest learning algorithm based on storing all the samples. Classification is achieved by finding the closest match. This is known as the nearest neighbor rule, where the unknown input vector is classified by finding the most similar template in the prototype, or learning, set. Duda R O, Hart P E. Pattern classification and scene analysis. NY: Wiley, 1973. The prototype set consisted of all the documents written by each of n writers, except for a test document that is left out from the set. So the reference set has (3×n)−1 documents in it. The test document is assigned the class of the document nearest to it among the prototypes.

To evaluate identification accuracy, the following experiments were set up. A number of n writers were randomly selected from 1,000 writers; then one document written by one of n writers was selected as a query document, and the rest of (3×n)−1 documents was used as a reference set. This leave-one-method was performed 1,000 times for each n, and the accuracy is the number of correctly classified queries divided by 1,000.

This procedure was applied with the macro-features shown in Table 3 converted into normalized form obtained from the raw data by scaling the minimum and maximum values of each feature to 0 and 1, which are shown in Table 5.

TABLE 5

Normalized macro-feature data. Values are normalized to lie in (0, 1) interval.

| Writer | Sample | F 1 | F 2 | F 3 | F 4 | F 5 | F 6 | F 7 | F 8 | F 9 | F 10 | F 11 |
|---|---|---|---|---|---|---|---|---|---|---|---|---|
| $W_1$ | $W_{1,1}$ | 0.20 | 0.45 | 0.28 | 0.30 | 0.30 | 0.45 | 0.42 | 0.45 | 0.25 | 0.52 | 0.23 |
|  | $W_{1,2}$ | 0.19 | 0.46 | 0.28 | 0.37 | 0.37 | 0.47 | 0.41 | 0.43 | 0.25 | 0.53 | 0.23 |
|  | $W_{1,3}$ | 0.19 | 0.46 | 0.30 | 0.33 | 0.33 | 0.50 | 0.43 | 0.40 | 0.23 | 0.56 | 0.19 |
| $W_2$ | $W_{2,1}$ | 0.23 | 0.50 | 0.43 | 0.60 | 0.60 | 0.22 | 0.34 | 0.76 | 0.24 | 0.49 | 0.32 |
|  | $W_{2,2}$ | 0.22 | 0.48 | 0.43 | 0.67 | 0.67 | 0.23 | 0.33 | 0.75 | 0.24 | 0.49 | 0.32 |
|  | $W_{2,3}$ | 0.22 | 0.48 | 0.43 | 0.57 | 0.57 | 0.23 | 0.36 | 0.74 | 0.22 | 0.51 | 0.32 |
| $W_3$ | $W_{3,1}$ | 0.47 | 0.38 | 0.08 | 0.50 | 0.50 | 0.41 | 0.50 | 0.46 | 0.17 | 0.67 | 0.26 |
|  | $W_{3,2}$ | 0.46 | 0.34 | 0.15 | 0.70 | 0.70 | 0.43 | 0.52 | 0.44 | 0.14 | 0.69 | 0.23 |
|  | $W_{3,3}$ | 0.50 | 0.38 | 0.15 | 0.70 | 0.70 | 0.46 | 0.45 | 0.46 | 0.17 | 0.62 | 0.30 |

$A=[a_1, a_2, \ldots, a_d]^t$ and $B=[b_1, b_2, \ldots, b_d]^t$ is defined by the Euclidean distance $\sqrt{\sum_{i=1}^{d}(a_i-b_i)^2}$, where d is the number of attributes. For micro-features, the distance between two characters represented by binary feature vectors A and B is calculated as:

$$d(A, B) = A^t B + \frac{\overline{A}^t \overline{B}}{2}.$$

Identification Model

Writer identification is the task of determining the writer when there are n candidates. This classification task has to be learned from a set of handwriting samples provided by each of the candidates. Given a test sample of an unknown writer, the task is to determine whether it was written by any of the n writers and, if so, to identify the writer. The writer identification procedure uses the features extracted from the test image and from the labeled prototype images to determine the writer of the test document.

Learning Algorithm

The identification model can be regarded as an n-class classification problem where writership of the samples is Identification Accuracy Identification accuracy was measured against the number of writers considered in three separate sets of experiments using macro-features, micro-features, and their combinations.

Figure 15:
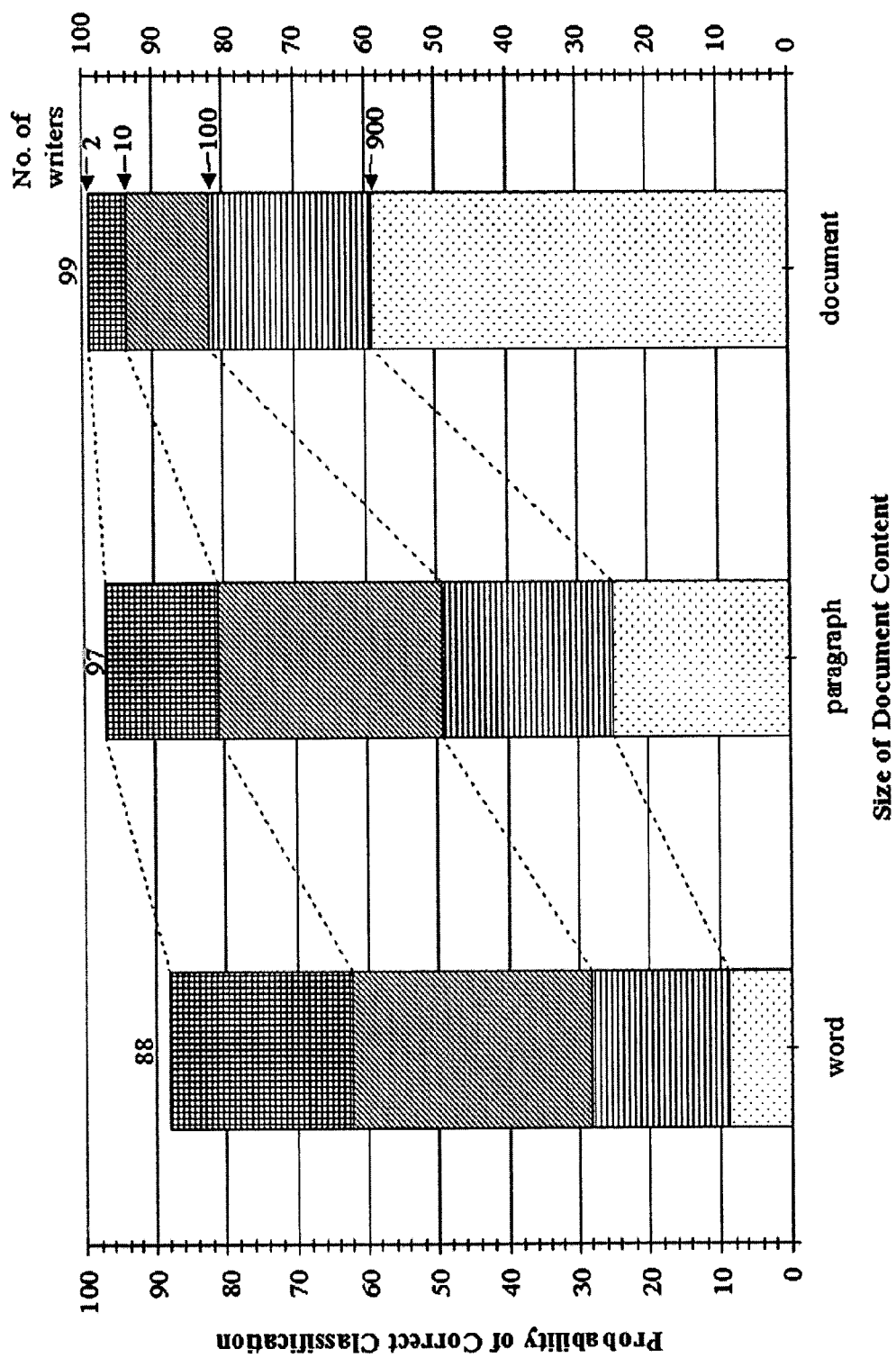
FIG. 15 is a graphical representation of writer identification accuracy using Macro-features shown as a function of the size of document content (document, paragraph, and word)

Macro-features: Parameterizing against document, paragraph, and word levels (FIG. 15). The word level corresponds to two words (Cohen and referred); the paragraph level corresponds to the address block (see FIG. 3 (a)), which consists of 11 words; the document level corresponds to the entire document image (see FIG. 2 (b)), which consists of 156 words. We observed that: (i) the larger the portion of the document image we consider, the higher the accuracy, and (ii) performance decreases as the number of writers increase.

Figure 16:
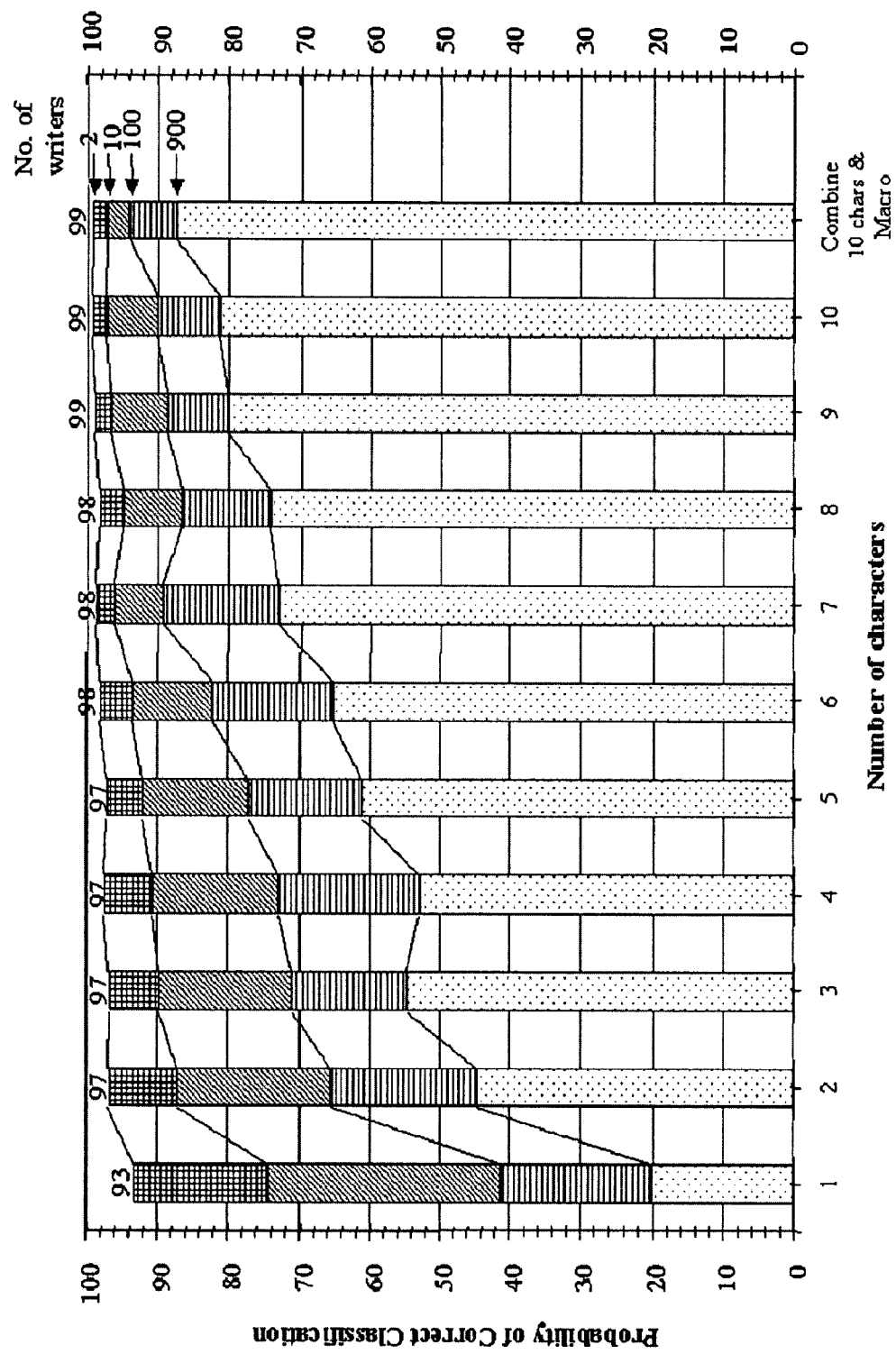
FIG. 16 is a graphical representation of writer identification accuracy using Micro-features shown as a function of the number of allograph shapes considered.

Micro-features: Accuracy also improves with the number of characters considered, as shown in FIG. 16. The number of writers here is 975. The characters were: r, e, f, e, r, r, e, d, b, h in increasing groupings considered (1 to 10). The last column shows the result of combining the micro-features of ten characters together with the macro-features of the entire document.

Using character-level features of all ten characters of the word referred as well as b and h (see FIG. 4), the correct writer was identified in 99% of the cases when all possible pairs of writers were considered. When there are five possible writers, the writer of the test document is correctly assigned with a 98% probability. We can expect the accuracy to improve when we consider: (i) more words in the document and (ii) more discriminatory features.

Combination: The micro-features are better than document-level features in that higher accuracy was obtained when more writers are considered. Combining the two sets of features yields a higher accuracy than either set alone.e combined them as follows. The macro-features were used as a filter that reduces the number of writers from 1,000 to 100. Micro-features were then used to identify the writer among the 100 choices. The result of this process is the right-most column in FIG. 15.

Verification Model

Figure 17:
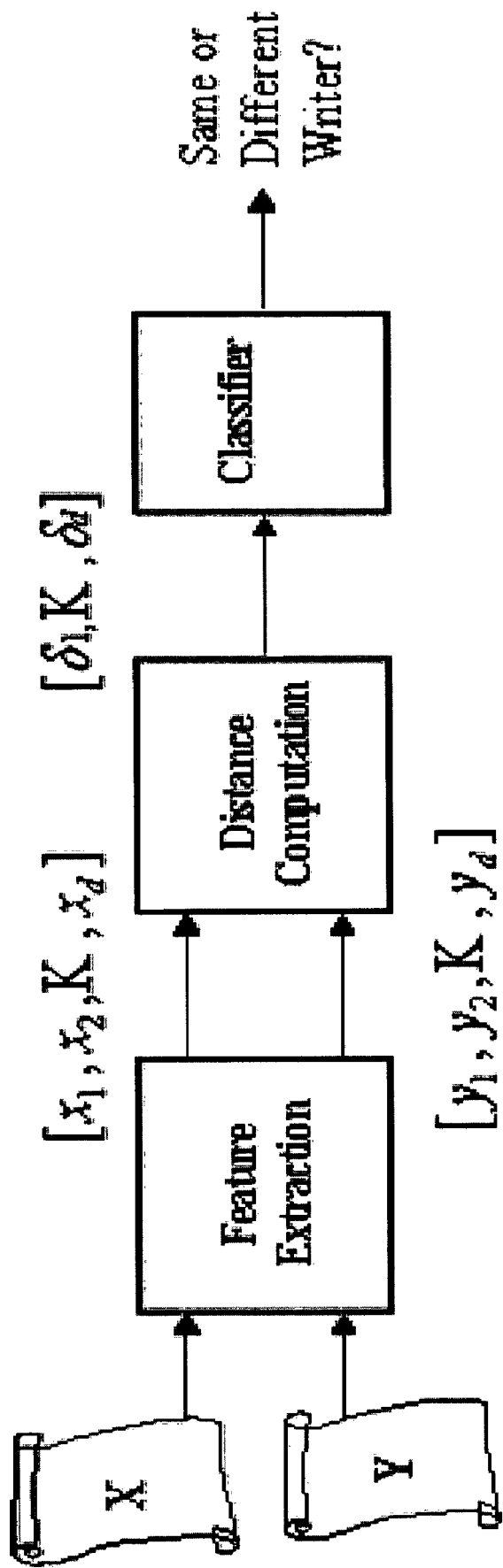
FIG. 17 is an example of process flow in the verification model.

Writer verification is the task of determining whether two samples X and Y were written by the same writer or by two different writers. This is a 2-class categorization problem that requires a dichotomy of the feature space. As shown in FIG. 17, in the verification model, feature vectors for each sample are computed as [x1, ..., xd] and [y1, ..., yd]. Their distances along each feature, [δ1, ..., δd], are used by a classifier to determine whether the distance vector is classified as within- or between-writer.

We use the fact that the within-writer distance (the distance between two samples written by the same writer) will be less than the between-writer distance (the distance between two samples written by two different writers). Hence, instead of considering features, we consider distances, thereby transforming the n-class problem in d-dimensional feature space to a 2-class problem of same or different writers in multi-dimensional distance space.

When there are n writers contributing three documents each, the number of within-class distances is $$n \cdot \binom{3}{2},$$

and the number of between-class distances is $$\binom{n}{2} \cdot 3 \cdot 3.$$

Figure 18:
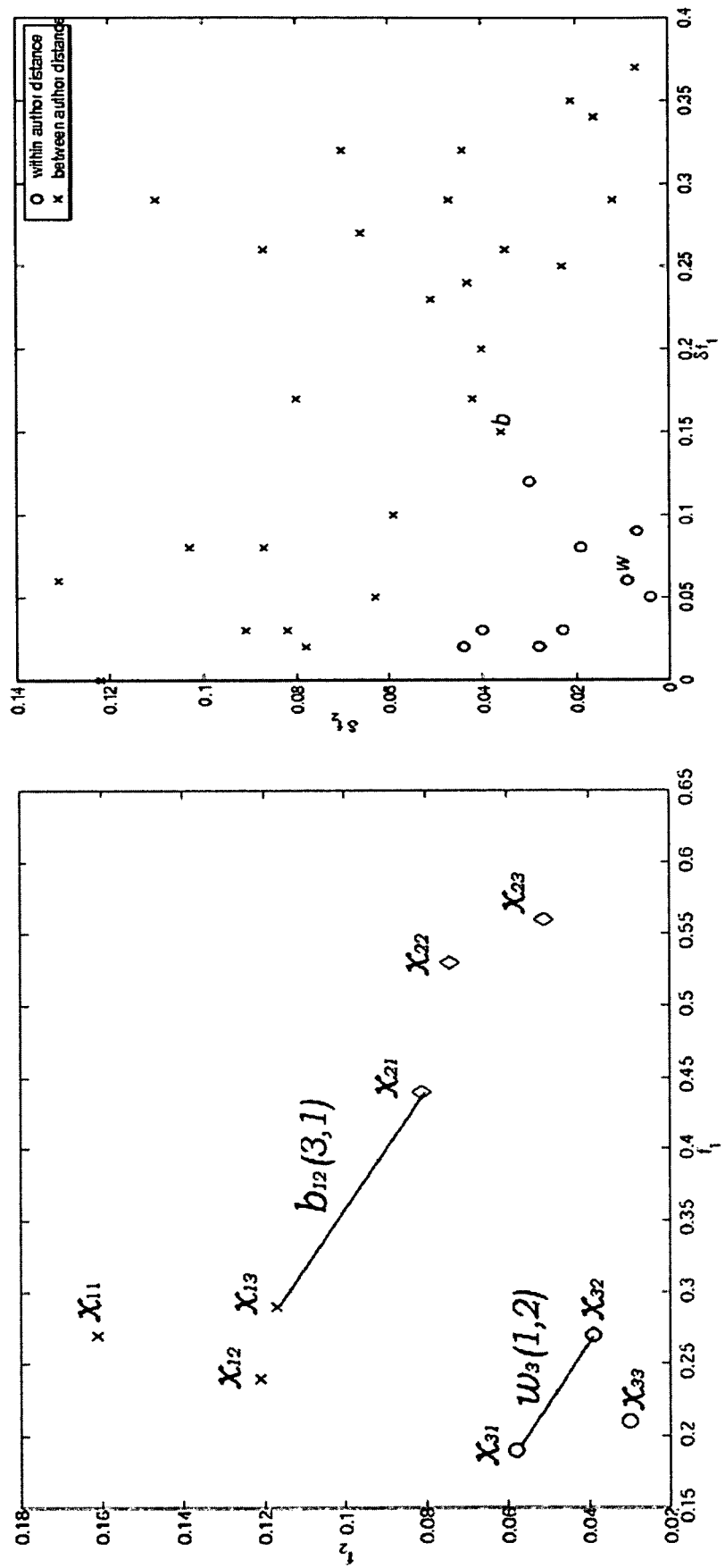
FIG. 18 is a graphical representation of the dichotomy model showing transformation from feature domain to feature-distance domain.

Assume three writers, $\{W_1, W_2, W_3\}$ and that each writer provides three samples. If we extract two features from each sample, then each sample is a point in two-dimensional feature space FIG. 18A shows feature space: two features are extracted from each of the three samples of handwriting provided by three writers. Handwriting samples of each writer cluster together. We then find the distance between each pair of samples, thereby transforming the 3×3=9 points in feature space to $$3 \cdot \binom{3}{2} = 9$$

within-writer distances and $$\binom{3}{2} \cdot 3 \cdot 3 = 27$$

between-writer distances in feature distance space.

FIG. 18B shows distance space: the distance between feature vectors is mapped onto feature-distance vectors in the feature-distance space. Within-writer and between-writer distances cluster together. The number of between-writer distances increases combinatorially with n, the number of writers. With n=1000, there are 3000 within-writer distances and 4,495,500 between-writer distances. We represented these distances as points in a d-dimensional distance-space, where each dimension represented the distance along a feature.

To generalize, let $x_{ij}$ denote the feature vector of the $j^{th}$ handwriting sample of the $i^{th}$ writer. Distances between samples of the same class are given by $w_i(j,k)=\delta(x_{ij},x_{ik})$, and the distances between samples of different classes are given by $b_{il}(j,k)=\delta(x_{ij},x_{lk})$, i≠l, where δ, the distance between feature vectors of two handwriting samples $X=[x_1, ..., x_d]$ and $Y=[y_1, ..., y_d]$, is given by the distance vector $\delta((X,Y)=[|x_1-y_1|,|x_2-y_3|, ..., |x_d-y_d|]$. At micro-feature level, the distance between two documents is computed quite differently. Assume that each document is represented by a set of k characters $(c_1, ..., c_k)$. For each character, the GSC feature generator extracts a 512-dimensional binary feature vector. Using the similarity measure given in eqn. (1), the distance is computed for each pair of k characters. Hence, the distance vector between sets of k characters is given by $\delta(X,Y)=[d(x_{c1},y_{c1}), ..., d(x_{ck},y_{ck})]$.

Most statistical experiments require the assumption that observed data be statistically independent. Distance data points are not statistically independent, since knowing two distances for a given person, the third distance is bounded by the triangle inequality for metrics. A solution is to choose randomly a smaller sample from a large sample. We partitioned 3000 within writer distance data into disjoint subsets of 500. Similarly, we randomly selected several subsets of 500 in size from the between-writer distance data set. These subsets are used for training, validating and testing purposes.

Figure 19:
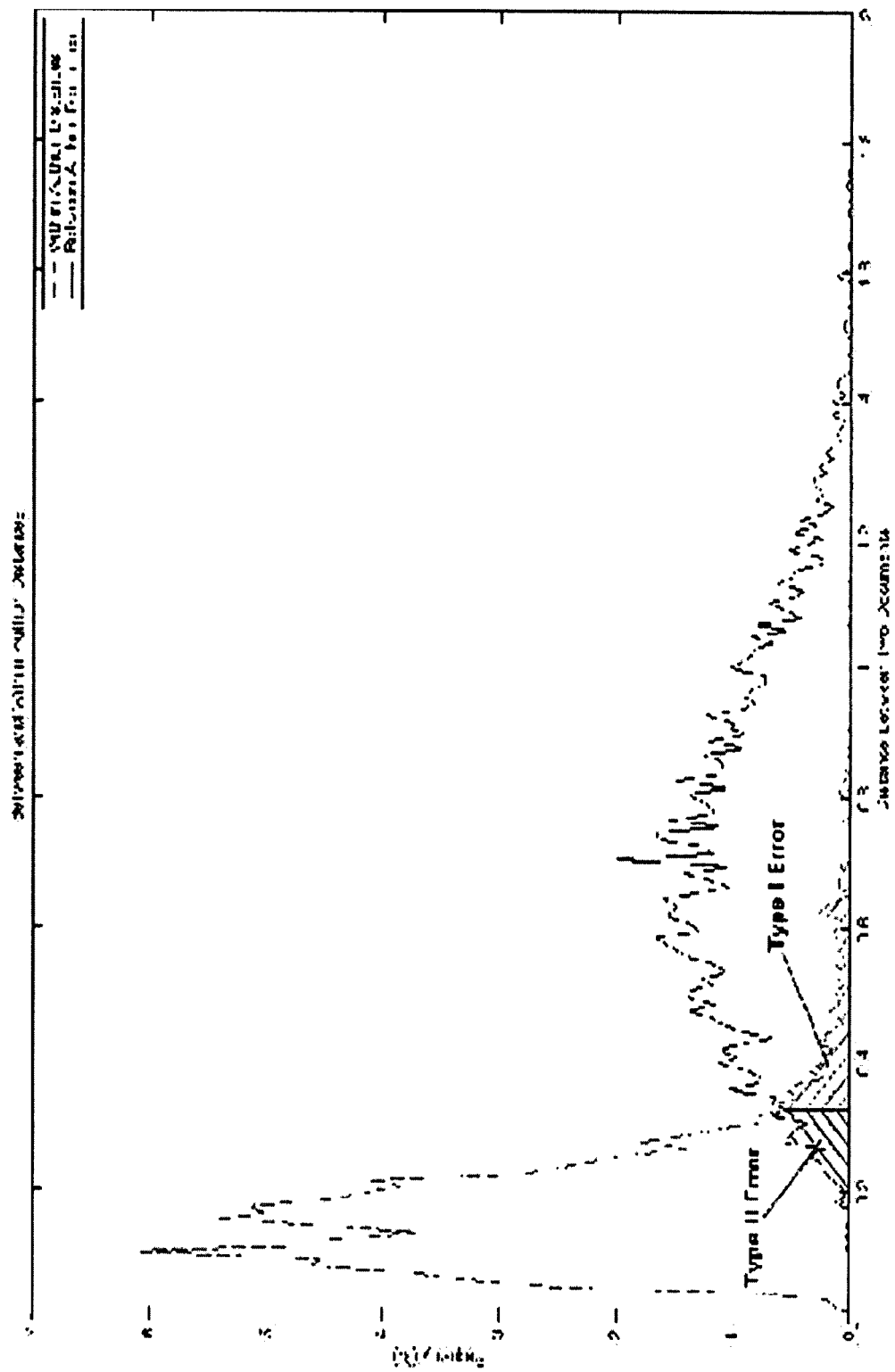
FIG. 19 is a graphical representation of the error probabilities in distance space for Type-I and Type-II errors for within- and between-writer distributions with only one measured feature.

The accuracy of performing the dichotomy by using a given set of features can be measured by the probability of misclassification: type-I error is defined as the probability of misclassifying two handwriting samples as written by two different writers when they actually were written by the same writer; type-II error is defined as the probability of misclassifying two handwriting samples as written by the same writer when they actually were written by two different writers. Our goal was to minimize the misclassification error. Type-I and type-II errors for the within- and between-writer distributions are illustrated in FIG. 19.

Learning Algorithm

Figure 20:
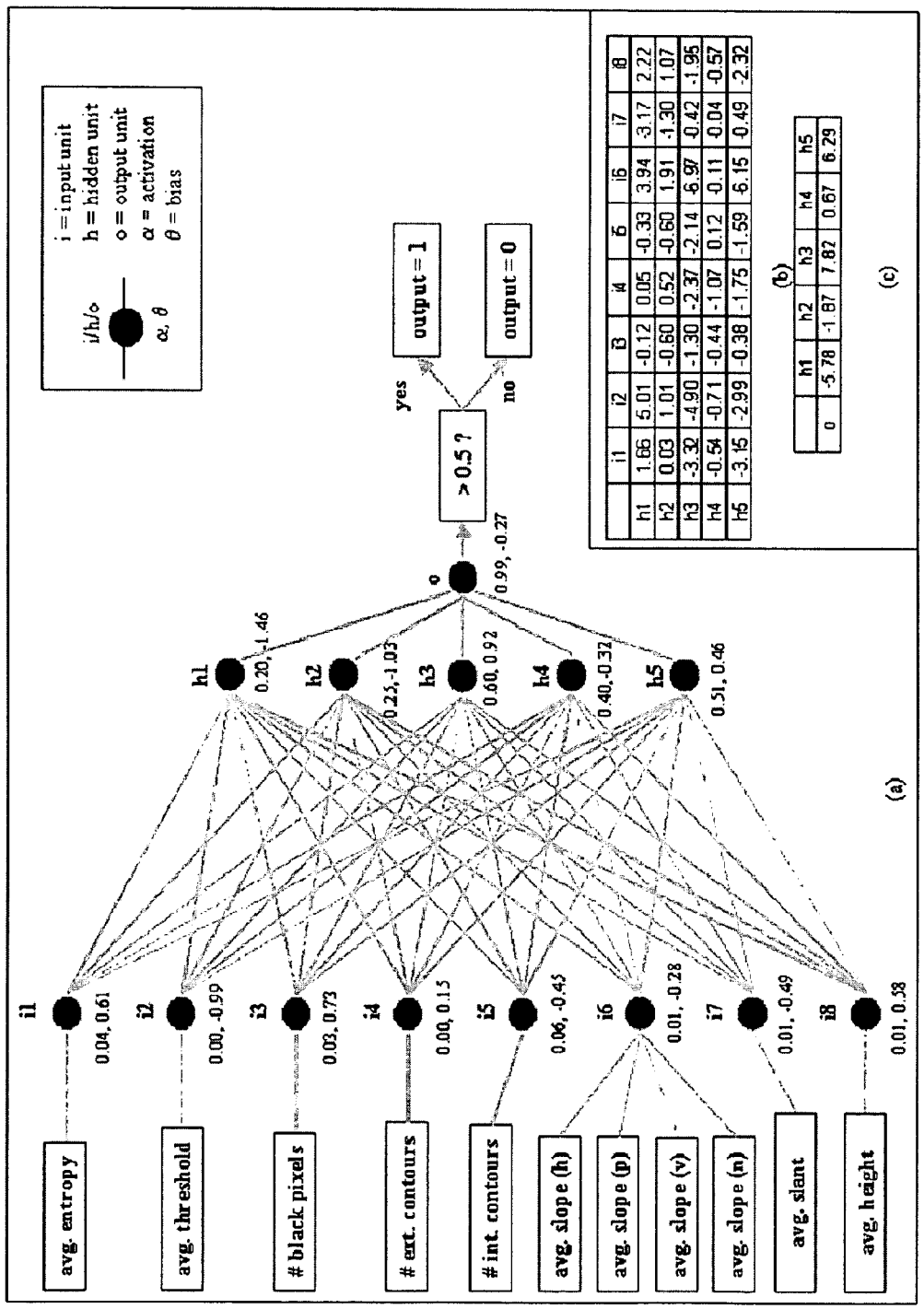
FIG. 20 is a graphical representation of the artificial neural network used to classify within- and between-writer distances.

There are several methods available for statistical classification. When the number of classes is few, which is true in the verification model since there are only two classes, a machine-learning technique that is accurate and yet easy to implement is based on artificial neural networks (ANNs). We used an ANN to classify the between- and within-writer distances while minimizing misclassification errors. ANNs have several desirable properties: (i) they are a sound statistical procedure, (ii) they are a practical software implementation of the Bayesian (optimal) procedure, (iii) they make no presumptions about the nature of the data (unlike other classifiers), and (iv) they let us tap into the full multivariate nature of the data and enable us to use a non-linear discrimination criterion. We used a 3-layered (FIG. 20) neural network: an input layer with eight units and a hidden layer with five units. This artificial neural network was used to classify within and between writer distances wherein FIG. 20A is fully connected, feed-forward, back-propagation, 8-5-1 neural network. The feature distance vector is presented at the input layer. The neural network then classifies it as a within- or between-writer distance. A 1 at the output implies different writers, and a 0 implies the same writer. The sigmoid function on each unit is defined by the activation (α) and bias (θ) values. FIG. 20B, shows weights on edges connecting input units to hidden units. FIG. 20C shows weights on edges connecting hidden units to output unit.

Verification Accuracy

Figure 21:
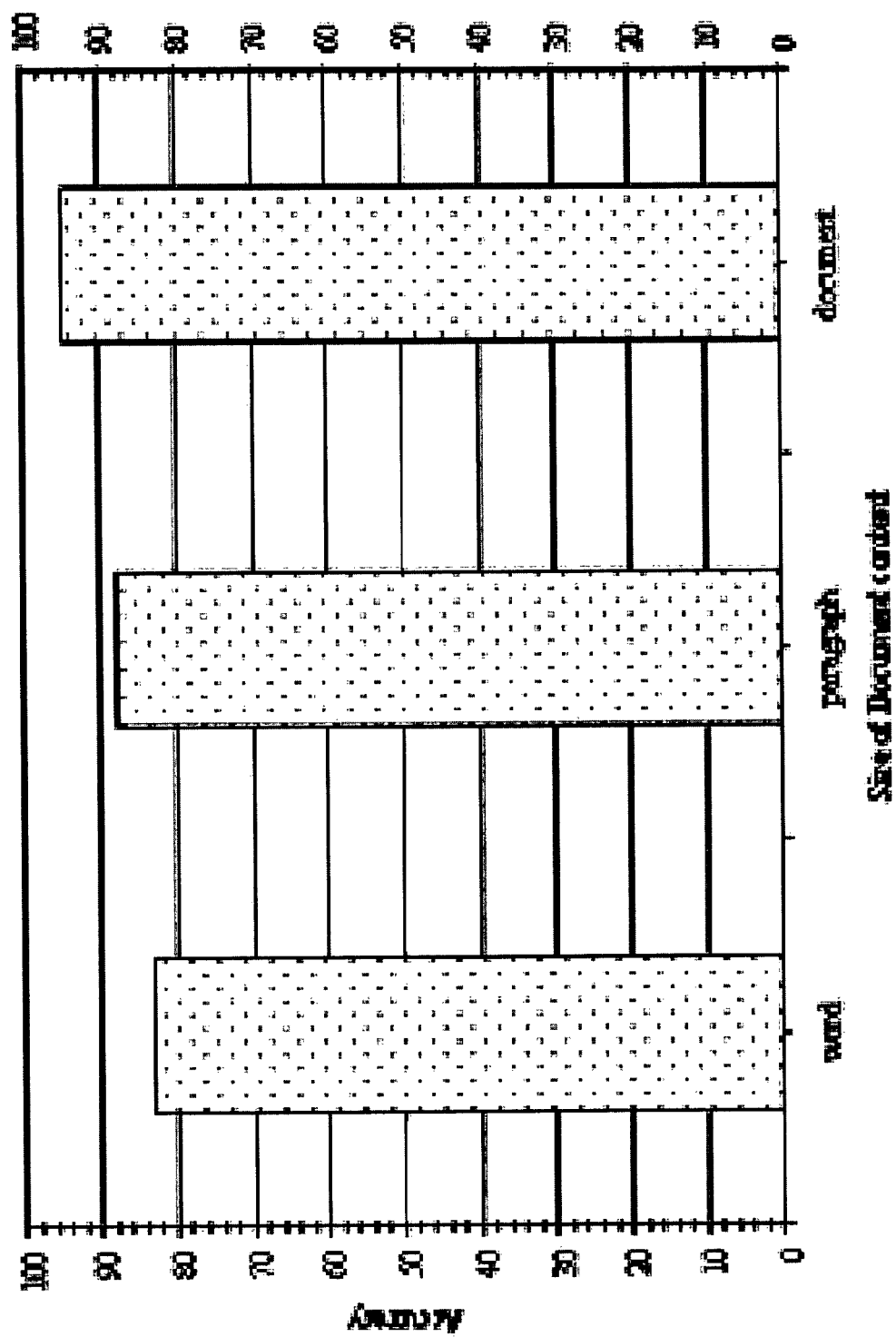
FIG. 21 is a graphical representation of verification analysis using Macro-features wherein performance is evaluated at the word (referred), paragraph (address block), and document levels.

Verification accuracy was determined with varying amounts of information available in the handwritten samples. The results, corresponding to the macro-features of the entire document, a paragraph (address block) and a word (referred), are shown in FIG. 21.

Figure 22:
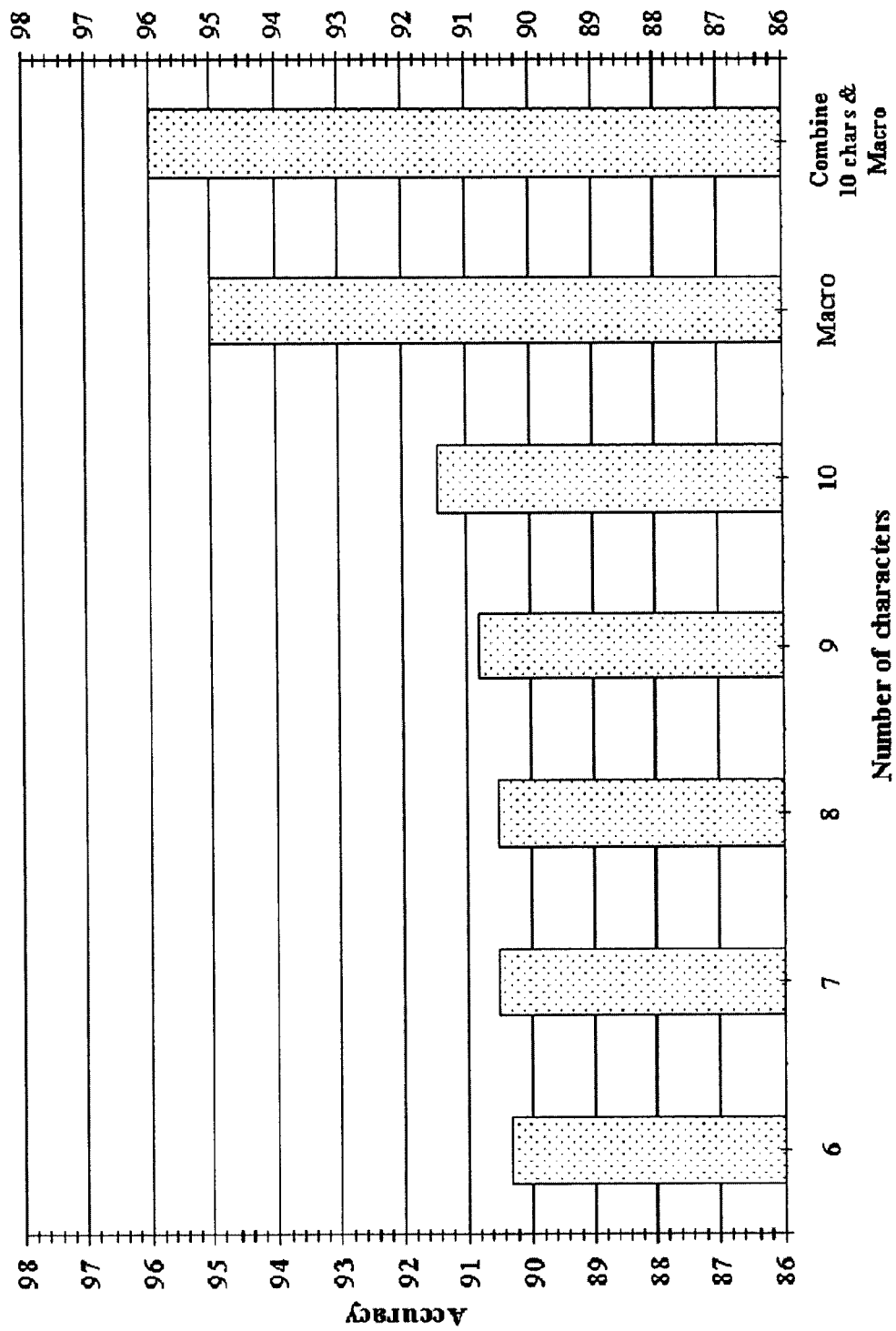
FIG. 22 is a graphical representation of verification analysis using Micro-features wherein performance is evaluated at the character level (r, e, f, e, r, r, e, d, b, h)

Micro-feature results with ten characters are shown in FIG. 22. The right-most column shows performance combining the micro-features of the characters with the macro-features of the entire document. Details of the methods used to perform the testing at the document, paragraph, word, and character levels are as follows:

(i) Document Level: In order to ensure independence in the data and to avoid testing on the training data, we divided the writers up into 4 groups of 250 each. Within- and between-writer distances were then computed within these groups. We used one group for training, one for validation, and one each for two test sets. We trained the ANN using 750 within-writer distances and 750 between-writer distances (of 250 individuals). We then tested it on two separate (previously unseen) test sets each with 750 within-writer distances and 750 between-writer distances. The training set classified 95% of the data correctly (with type-I error=6.3% and type-II error=3.8%). The two test sets classified 96% (with type-I error=4.5% and type-II error=3.6%) and 94% (with type-I error=7.5% and type-II error=4.4%) of the data correctly.

(ii) Paragraph Level: Using macro-features for the address block, we trained the ANN using 711 within-writer distances and 711 between-writer distances (of 237 individuals). We then tested it on two separate (previously unseen) test sets each with 711 within-writer distances and 711 between-writer distances. The training set classified 90% of the data correctly (with type-I error=11.8% and type-II error=7.5%). The two test sets classified 89% (with type-I error=14.2% and type-II error=7.6%) and 87% (with type-I error=16.9% and type-II error=9.6%) of the data correctly.

(iii) Word Level: Using macro-features for the word referred, we trained the ANN using 834 within-author distances and 836 between-writer distances. We then tested it on two separate (previously unseen) test sets each with 834 within-writer distances and 836 between-writer distances. The training set classified 82.3% of the data correctly (with type-I error=18% and type-II error=17.3%). The two test sets classified 83.1% (with type-I error=14.5% and type-II error=19.3%) and 82.7% (with type-I error=14.4% and type-II error=20.2%) of the data correctly.

(iv) Character Level: Based on micro-features of 10 characters r, e, f, e, r, r, e, d, b, h, we trained the ANN using 723 within-author distances and 723 between-writer distances (of 964 individuals). We then tested it on two separate (previously unseen) test sets each with 723 within-writer distances and 723 between-writer distances. The training set classified 91.2% of the data correctly (with type-I error=9.8% and type-II error=7.7%). The two test sets classified 91.1% (with type-I error=12.4% and type-II error=5.3%) and 91.8% (with type-I error=10.0% and type-II error=6.5%) of the data correctly. The same experiments with different number of characters were performed, and, as shown in FIG. 21, we observe that the higher accuracy is achieved with the higher number of characters we consider.

Comparison of the Two Models

The discriminative power of handwriting using the features extracted was established by using two different approaches, both based on classificatory models: (i) the approach of identifying the writer from a set of possible writers, and (ii) the approach of determining whether two documents were written by the same writer. Writer identification accuracy was close to 98% for two writers. In the verification approach, the features were mapped onto the feature distance domain, and the individuality problem was tackled as a 2-class problem of classifying within- and between-author distances. Verification accuracy was about 96%.

The verification model has a slightly lower accuracy, as can be expected due to its mapping into a space of distances before performing classification. It was seen that performance deteriorated with a decrease in document content for both models. The verification model cannot be parameterized corresponding to the number of writers considered, unlike the identification model. However, repeated application of the verification model, considering one writer at a time, will yield a method of identification. Such a use of the verification model will have a reject option built in.

The principal advantage of the verification model over the identification model is its statistical generality. The identification model is easy to set up for establishing individuality as long as a substantial number of instances for every class are observable. When the number of classes is too large, e.g., the US population, most parametric or non-parametric multiple classification techniques are of no use to validate the individuality of classes, and the problem is seemingly insurmountable.

In the verification model, one need not observe all classes, yet it allows for inferential classification of patterns. It is a method for measuring the reliability classification about the entire set of classes based on samples obtained from a small sample of classes.

Summary and Conclusion

A study was conducted for the purpose of establishing the individuality of handwriting. The work was motivated by US high court rulings that require expert testimony be backed by scientific methodology. Since handwriting had not been subjected to such a study, we decided to undertake this endeavor.

A database was built representing the handwriting of 1500 individuals from the general US population. The sample population was made representative of the US population by stratification and proportional allocation. The population was stratified across different genders, age groups and ethnicities. Each individual provided three handwritten samples, produced by copying-out a source document which was designed to capture many attributes of the English language: document structure; positional variations of alphabets, numerals, and punctuation; and interesting alphabet and numeral combinations. Features were extracted at a global level of the document, from the entire document, from a paragraph of the document, and from a word of the document. Finer features were extracted at the character level from each sample.

Individual discriminability was established by using a machine-learning approach where some samples are used to learn writer characteristics, and other samples are used to test the learned models. Based on a few macro-features that capture global attributes from a handwritten document and micro-features at the character level from a few characters, we were able to establish with a 98% confidence that the writer can be identified. Taking an approach that the results are statistically inferable over the entire population of the US, we were able to validate handwriting individuality with a 96% confidence. By considering finer features, we should be able to make this conclusion with a near-100% confidence.

An assumption here is that we have a representative sample of handwriting. For instance, it would not be possible to establish the individuality of handwriting based on a single stroke of handwriting.

Our work has employed handwriting features similar to, but not exactly the same as, those used by document analysts in the field. However, the objective analysis that was done should provide the basis for the conclusion of individuality when the human analyst is measuring the finer features by hand.

There are many important extensions of the work that could be done. Some of these are to study the handwriting of similarly trained individuals, to study temporal variations of handwriting over periods of time, etc.

Thus, it is seen that the objects of the invention are efficiently obtained, although modifications and changes to the invention may be readily imagined by those having ordinary skill in the art, and these changes and modifications are intended to be within the scope of the claims.

CEDAR-FOX

In one embodiment, the present invention comprises the CEDAR-FOX Document Examination System (CEDAR-FOX) as a method and apparatus for forensic document examination. CEDAR-FOX provides a computer based image processing application that validates the hypothesis that handwriting is individual. More particularly, the method and apparatus can match handwriting in scanned documents. By using a set of metrics, the present invention can determine whether two documents are written by the same individual or by two different individuals. The software of the present invention allows a user to select either the entire document or a specific region of a document to obtain comparisons of Macro Features, Micro Features, and combinations thereof. Word gap comparison and comparison with Palmer Metrics are also available. The method and apparatus also provides user interfaces for handling such items as underline removal, background removal, printing, etc.

The following items are minimum system requirements for a computer implementing the method of the present invention: Pentium class processor (P4 or higher recommended), Windows NT, 2000 or XP, 128MB of RAM, 30MB of available hard disk space and a CD-ROM drive. Variations, permutations, and combinations of processors, operating systems, hard disk space and storage media known to those of skill in the art are intended to be within the spirit and scope of the invention as claimed.

Input images to the system should be grayscale with 256 levels of gray (8 bits per pixel) scanned at 300DPI. The files (handwriting samples) should be stored in PNG (Portable Network Graphics) format. It is contemplated that the software may be modified to allow for variations relating to scanning resolution and file format for storage. The CEDAR-FOX application may be installed from a CD onto the hard disk of a computer. It is anticipated that the application may be run from a CD, DVD or other portable storage medium. The application may also be installed on a server for multi-user access via workstations or accessible via the Web.

The CEDAR-FOX software is started by selecting the CEDAR-FOX button as found from the scroll menu from the Programs. Alternatively, double-clicking the CEDAR-FOX shortcut icon on the Windows Desktop can start the program.

Figure 23:
FIG. 23 is a screen capture of an initial menu bar which appears when a user starts CEDAR-FOX.

After initiating the software of the present invention, there are two different scenarios for the comparison of two documents. In one scenario, the two documents to be compared are already scanned and saved on the hard disk of a computer. In the other scenario, it may be necessary to scan one or both documents to be compared. As shown in FIG. 23, when CEDAR-FOX starts up and before opening any document or if it is necessary to scan a new document for comparison, the initial menu bar has the four following options: File; View; Window; and Help.

Figure 24A:
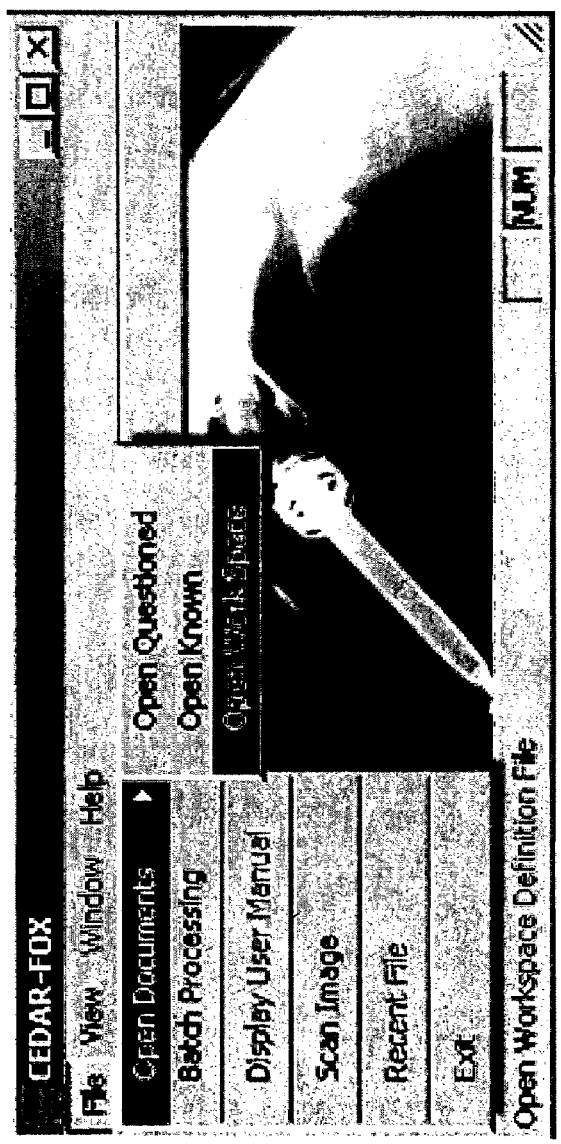

FIG. 24A shows the File Menu of the initial menu bar with five options: Open Documents (described below); Batch Processing; Scan Image (described below); Recent File; and Exit. The Recent File option allows rapid retrieval of recently accessed files while the Exit option shuts down software execution.

Figure 25A:
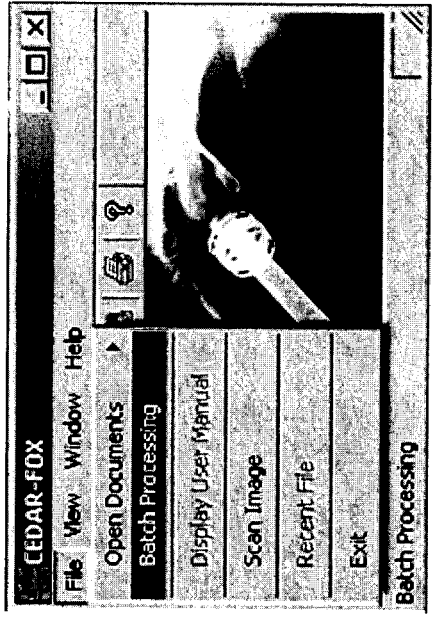
Figure 25B:
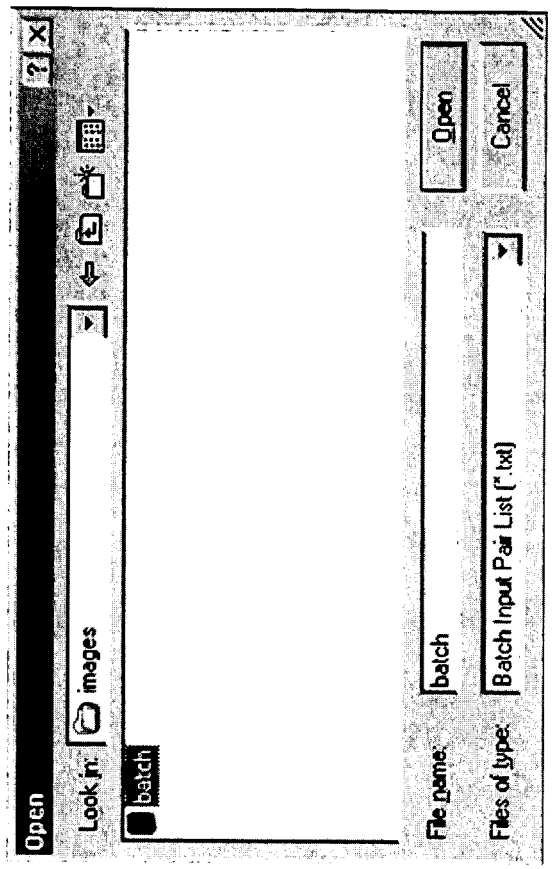
FIG. 25B shows the dialog that appears for opening a batch file and FIG. 25C indicates that batch processing was successful.
Figure 25C:
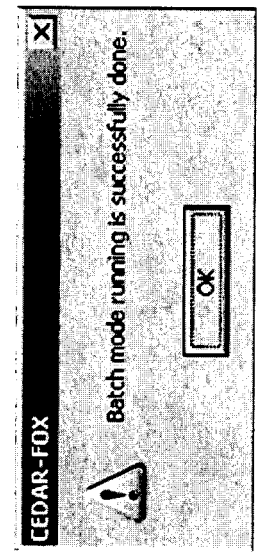

As shown in FIG. 25A, the Batch Processing mode can be accessed using the File Menu of the initial menu bar and selecting Batch Processing. This option prompts the user to input a batch file, for example batch.txt, containing pairs of filenames to be compared using the CEDAR-FOX system. Care should be taken to see that this batch file is placed in the same directory as the one containing the documents to be compared (see FIG. 25B). After all the file pairs have been processed (FIG. 25C), the results are automatically stored in another file with the same name but an extension .out, i.e., as batch.txt.out in the present example.

The View Menu of the initial menu bar has four options: Toolbar; Status Bar; Use Adaptive Threshold (see below); and Select Similarity Metric (see below). The Toolbar and Status Bar allow the user to customize the appearance of the graphical user interface.

The Window Menu of the initial menu bar has three options: Cascade; Tile Horizontal; and Tile Vertical. The Menu allows the user to arrange the View of the image windows. They may be tiled, or cascaded as desired. The user may also select the window of interest here. Note that menu selections change as the user changes focus or selection of image windows. Thus, it is important that the user select the proper file/image prior to performing image operations such as thresholding and Region of Interest (ROI) definition.

The Help Menu of the initial menu bar has three options: Display User Manual; About CEDAR-FOX; and Show Supported Characters. This menu contains information about the ownership rights of the CEDAR-FOX system and the release information. It also provides help to the user of the system and indicates the type of characters that may be analyzed such as upper and lower case letters of the English alphabet and Arabic numerals. Additional supported characters anticipated by, but not limited to, the present invention, include non-English alphabet characters, non-Arabic numerals, and symbols.

Figure 26:
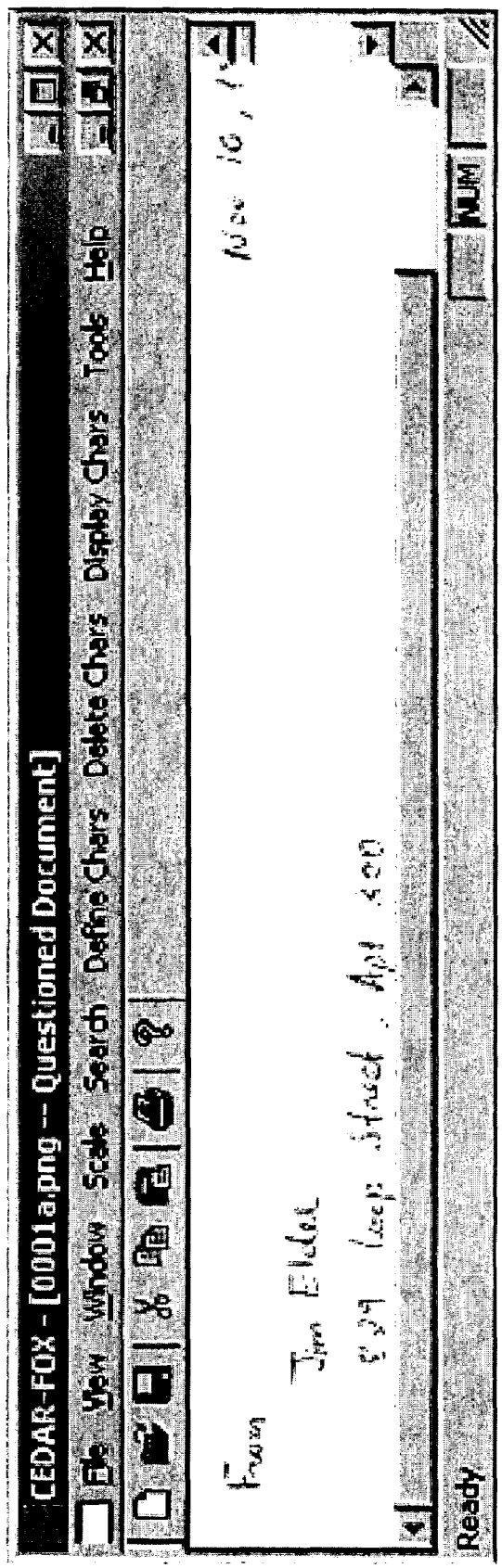
FIG. 26 is a screen capture of a detailed menu bar which appears when a user has opened at least one document using the File menu of FIG. 24B.

Upon the opening of at least one document (FIGS. 24A and 24B), the previous initial menu bar becomes a detailed menu bar with ten options as shown in FIG. 26: File; View, Window; Scale; Search; Define Chars; Delete Chars; Display Chars; Tools; and Help. The Window and Help Menus have identical features as these menus in the initial menu bar.

Figure 27:
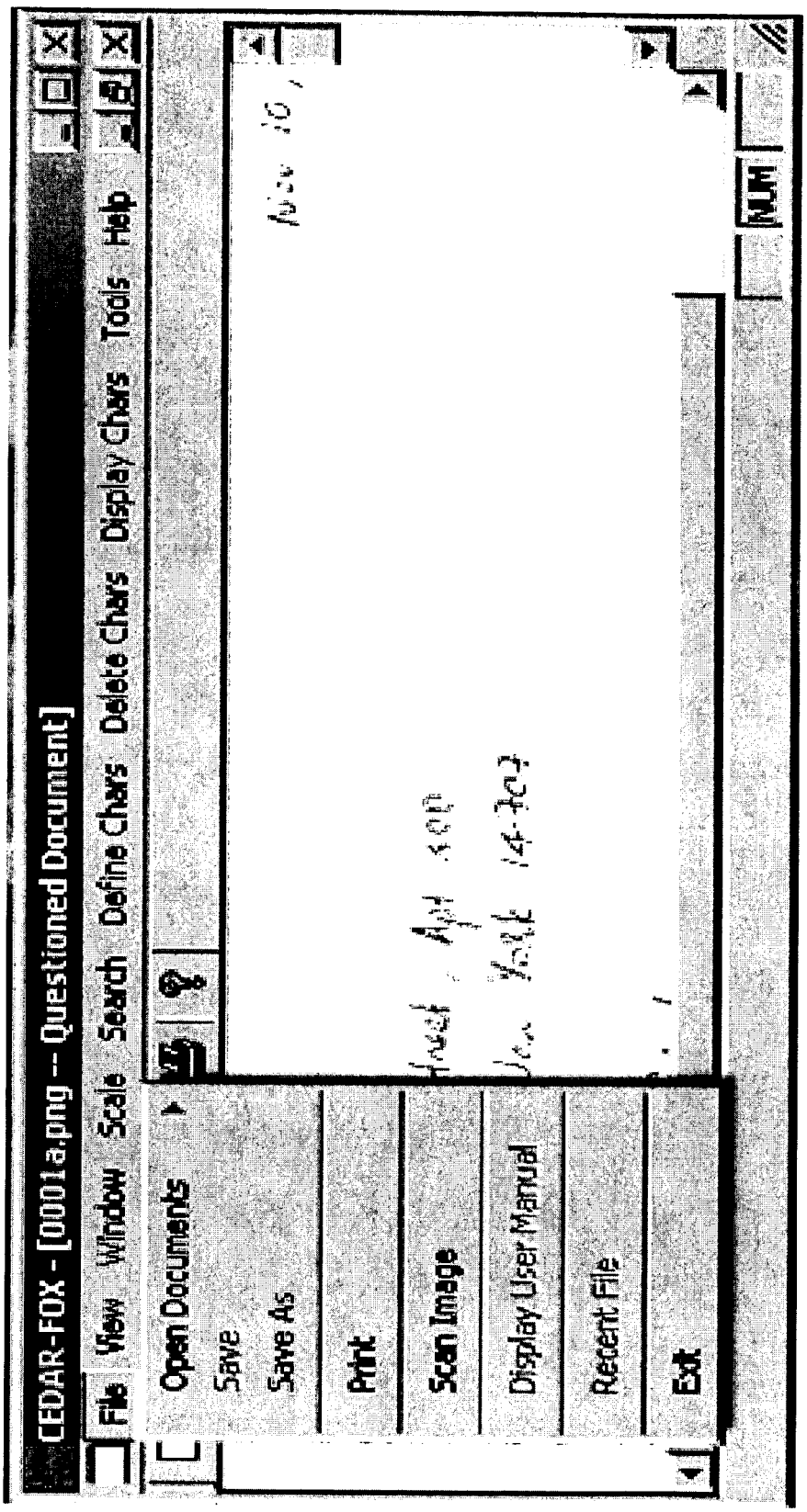
FIG. 27 is a screen capture of a File menu of a detailed menu bar.

As shown in FIG. 27, the File Menu of the detailed menu bar has eight options: Open Documents; Save; Save As; Print; Scan Image; Display User Manual; Recent File; and Exit.

The Open Documents Menu of FIG. 24A under the File Menu of the initial and detailed menu bars has three options for opening a file: Open Questioned; Open Known; and Open Workspace. In order to open an existing questioned document (the scanned copy of a document), the user may select the File>Open>Open Questioned menu option. Similarly to open an existing known document, the user may select the File>Open>Open Known menu option.

Figure 24B:
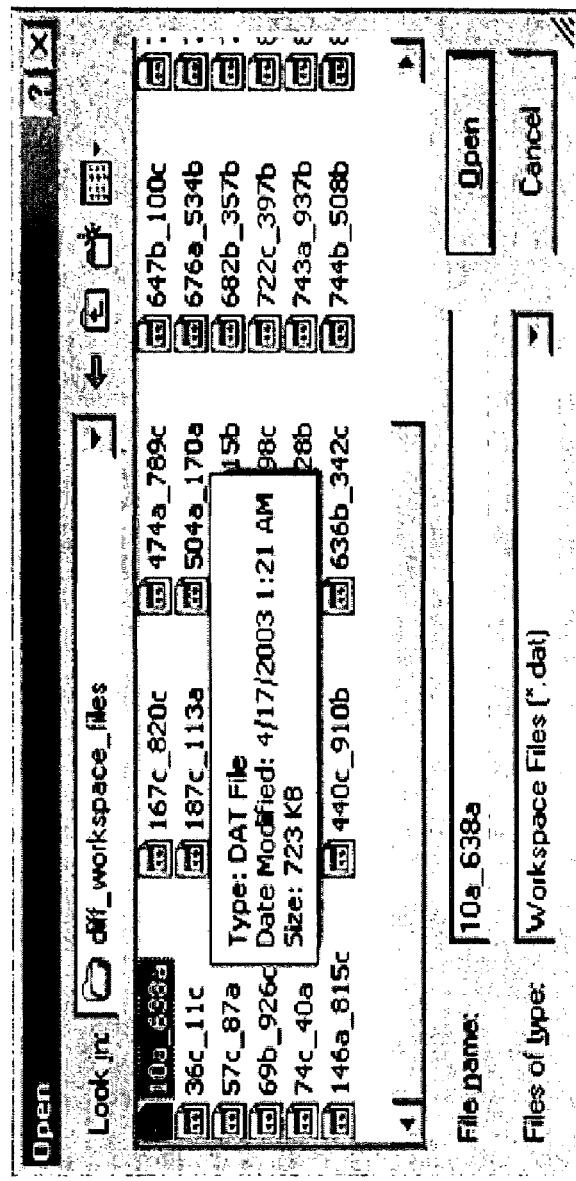
FIG. 24B is a screen capture of the dialog that appears when a user opens a workspace under the Open Documents menu.

To open a previously saved workspace definitions file (a .dat file—see the "Save and Save As" section below explaining workspace definitions files), the user selects the File>Open>Open Workspace menu option. As shown in FIG. 24B, this will display a file open browse dialog that allows the user to select a file the user wishes to open. The user chooses a file and clicks OK to accept the choice; the image will then be displayed in a new window. A second document image file, to be used for comparison with the first document, can now be opened in the same manner. Only two files can be opened at one time. These files can be tiled for easy viewing (see "Window Menu" section). Once an image is open, there are multiple options for image processing and feature display. Document comparison can only be achieved with two images opened.

Figure 28A:
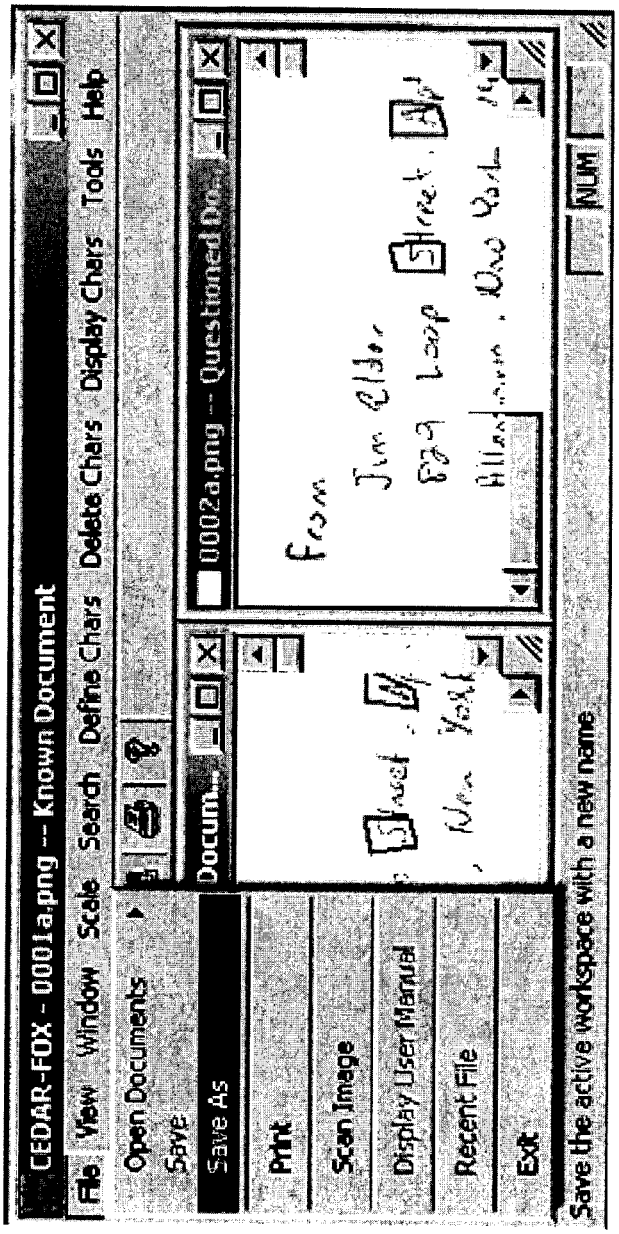
Figure 28B:
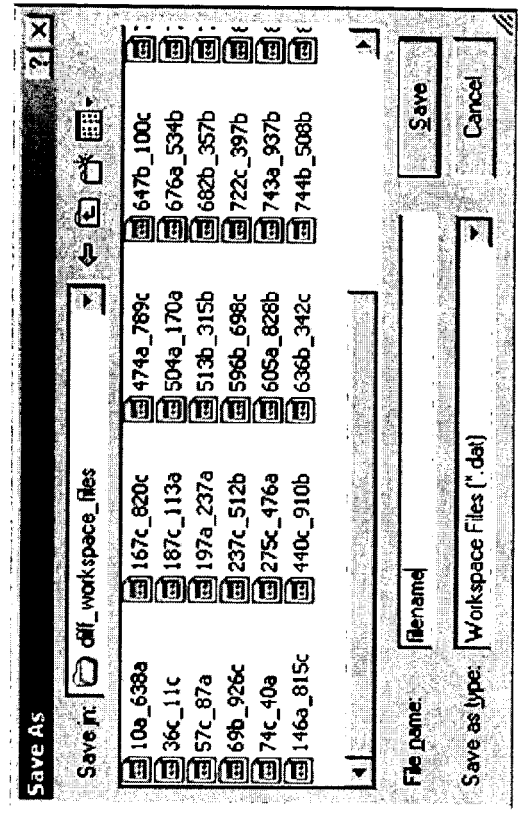
FIG. 28B is a screen capture of the dialog that appears when a user saves a file under the Save As option.

The Save and Save As Menus (FIG. 28A) under the File Menu of the detailed menu bar allows storage of workspace definitions. A current work session may be saved in a workspace definitions file that allows the user to resume a comparison session at a later time. The workspace definitions file contains the file names of the images used, the defined characters, and the regions of interest that the user has entered. To save a session for the first time, the user uses the File>Save As selection. This will start a file save dialog as shown in FIG. 28B. The user browses to the desired directory and enters the name of a new .dat file. If the user is updating a previously saved workspace definition file, the user may save the new changes by using the File>Save option.

The Print Menu under the File Menu of the detailed menu bar prints the document in the currently active upfront window. This option prompts the user to select the printer to which the printing job should be submitted.

The Scan Image option under the File Menu of the detailed menu bar allows the user to create images using CEDAR-FOX without leaving the program via a Twain compatible device, the most popular being a flatbed scanner although other options may include digital cameras or other type of image input devices. Scan Image will start a file save dialog with a title 'Save As'. Browse to the desired directory and enter the name of a new filename in the format of PNG, then click the 'Save' button. The next dialog will show all the Twain device(s) installed in the computer being used. Select a desired Twain device and then click 'Select'. This will start a scanning session.

The images must be scanned in 8-bit gray scale (in other words, 256 shades of gray) and the resolution should be set to 300 dot-per-inches (DPI). Color images cannot be processed. For more details on scanner setup and Twain interface, please refer to the scanner user manual.

Figure 29:
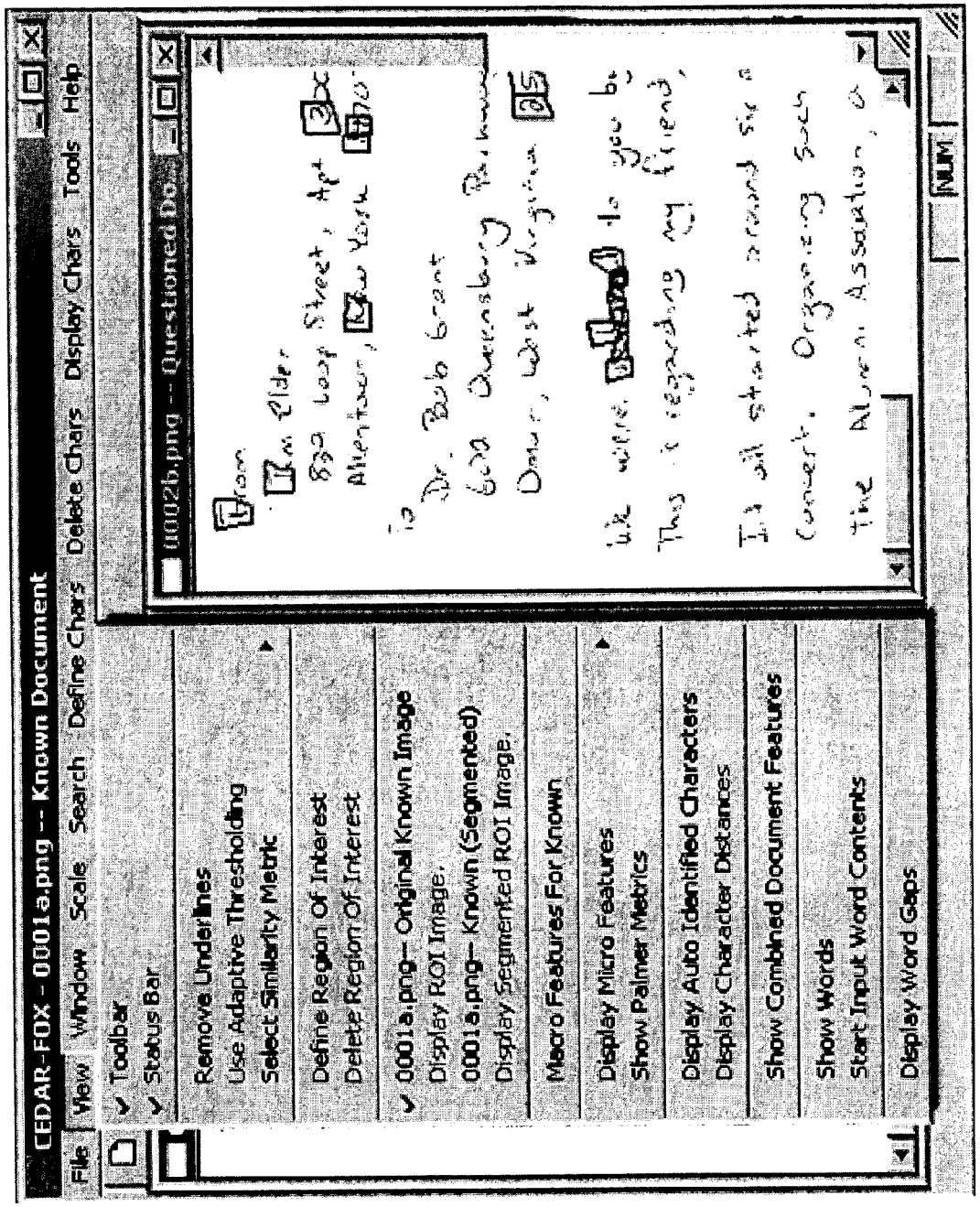
FIG. 29 is a screen capture of a View menu of a detailed menu bar.

As shown in FIG. 29, the View Menu of the detailed menu bar shows the results of the comparison of the two documents as well as several other image processing options. Whenever a file is opened, its Macro Features are automatically computed and loaded by the program. The View Menu has twenty options: Toolbar; Status Bar; Remove Underlines; Use Adaptive/Known Thresholding; Select Similarity Metric; Define Region of Interest; Delete Region of Interest; An Original Known Image; Display ROI Image; A Known (Segmented) image; Display Segmented ROI Image; Macro Features For Known/Questioned; Display Macro Features; Show Palmer Metrics; Display Auto Identified Characters; Display Character Distances; Show Combined Document Features; Show Words; Start Input Word Contents; and Display Word Gaps. Toolbar and Status were described above.

The Remove Underlines option under the View Menu of the detailed menu bar allows the user to remove all underlines in a scanned document.

The Use Adaptive/Normal Thresholding option under the View Menu of the detailed menu bar toggles the binarization method used to process a document. In some cases, poor quality documents may be better thresholded with the Adaptive option. To return to the default thresholding, the user may choose View>Use Normal Thresholding.

The Select Similarity Metric option under the View Menu of the detailed menu bar changes the algorithm used to compute feature distances. The algorithmic choices are either Sokal-Michener or Correlation similarities.

Figure 30A:
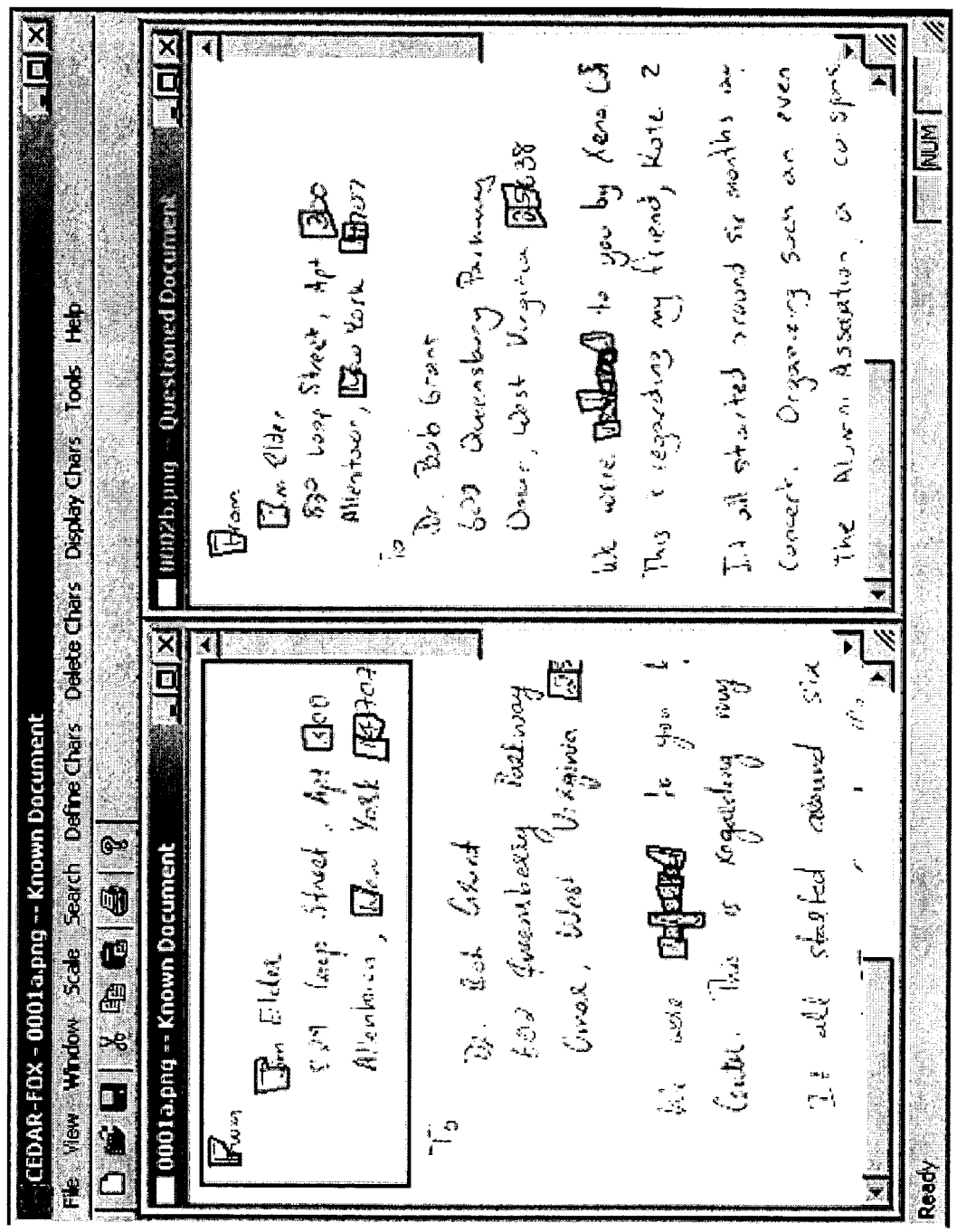
FIG. 30A is a screen capture of a user defining a region of interest while 30B shows the resulting screen capture once the user has completed the definition wherein features are computed for the sub-region and used for comparison.
Figure 30B:
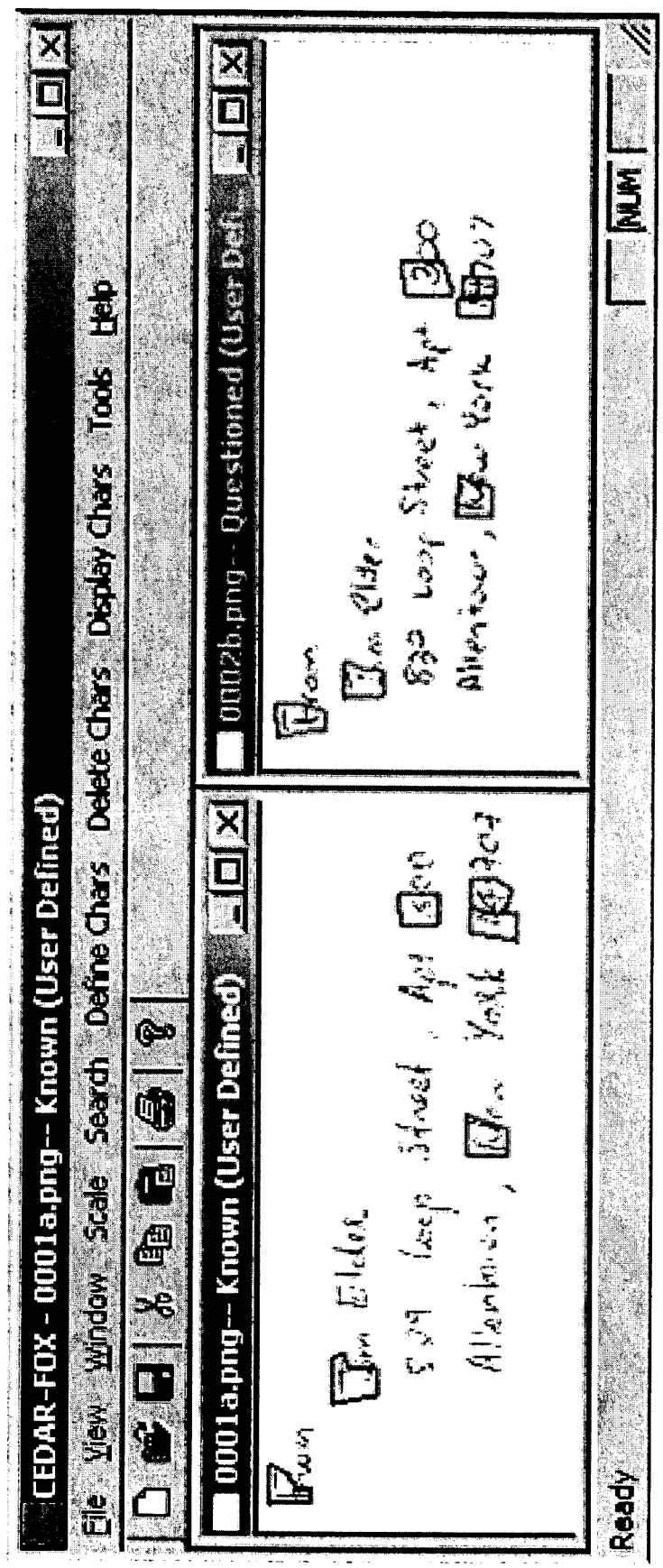

The Define and Delete Region of Interest options under the View Menu of the detailed menu bar may be used to select a sub-portion of a document image for comparison. First the user select this option using View>Define Region Of Interest. Using a mouse, the user left clicks a corner of the region in the image. This will start drawing a rectangle that will define the region. The mouse is then positioned to the diagonal corner of the region and left clicked again to complete the region as in FIG. 30A. Note that right clicking will cancel the operation allowing the user to restart the definition. Once the user has completed the definition, features are computed for the sub-region and used for comparison (FIG. 30B). The user may discard the region definition by selecting View>Delete Region Of Interest. Features will then be recomputed using the entire document.

Under the View Menu of the detailed menu bar, there are several options for image display. There are menu options under the View menu for display of the original image (grayscale), the region of interest image (ROI) if defined, the segmented and thresholded image, and the segmented and thresholded ROI image if defined. The user may choose the image to be viewed using these options.

Figure 31:
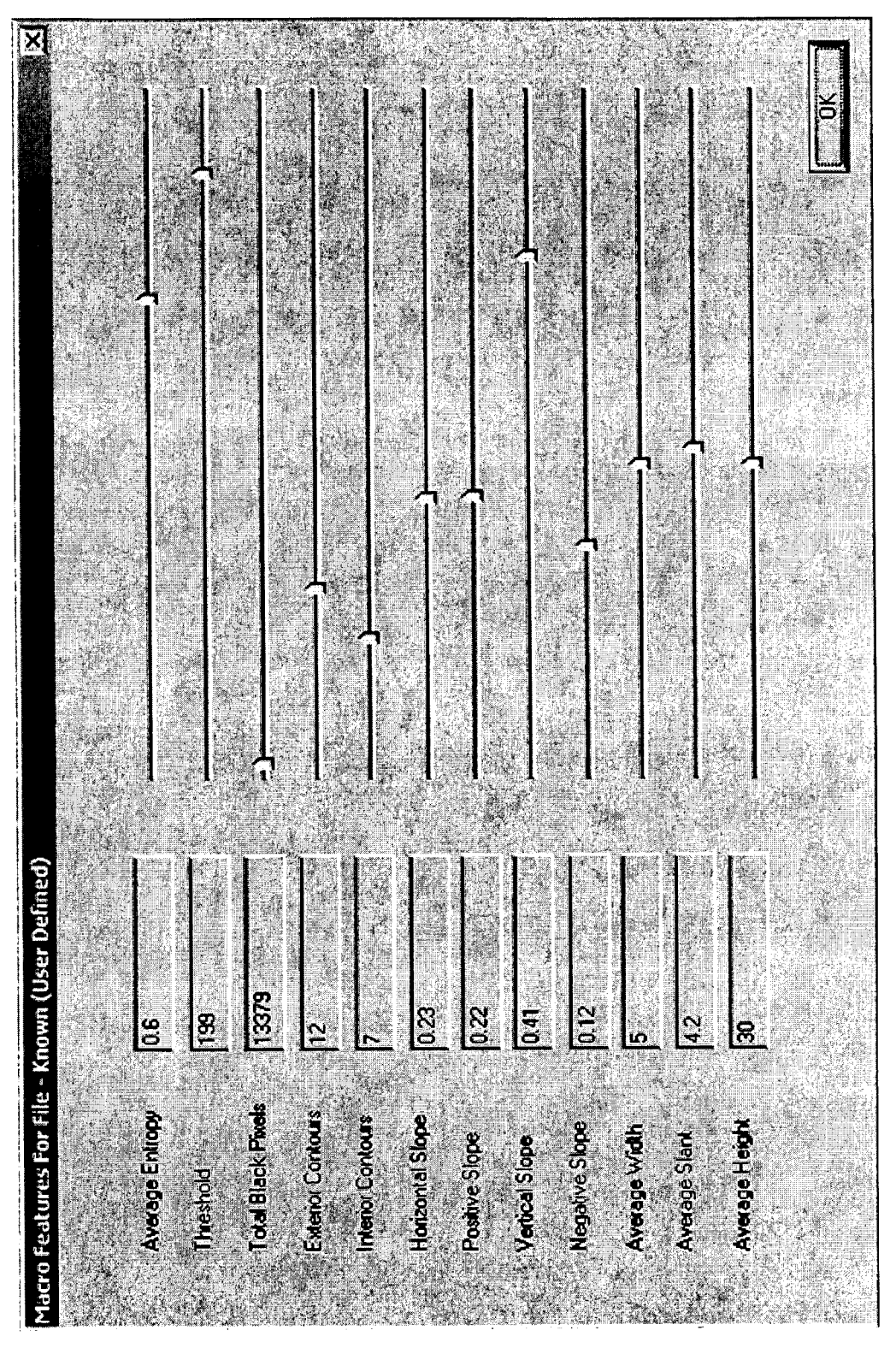

The Macro Features For Known/Questioned option under the View Menu of the detailed menu bar may be used to view the Macro Features for the upfront active window. If the user changes the focus to the questioned document, the user can view its macro features using View>Macro Features For Questioned. To view the macro features for the known document, first bring the known document into focus and then use View>Macro Features For Known. As shown in FIG. 31, the Macro Features for both Known and Questioned samples consists of the following: Entropy; Binarization Threshold; Total Black Pixels; Exterior Contours; Interior Contours; Horizontal Slope; Vertical Slope; Positive Slope; Negative Slope; Average Stroke Width; Average Character Height; and Average Slant.

Figure 32:
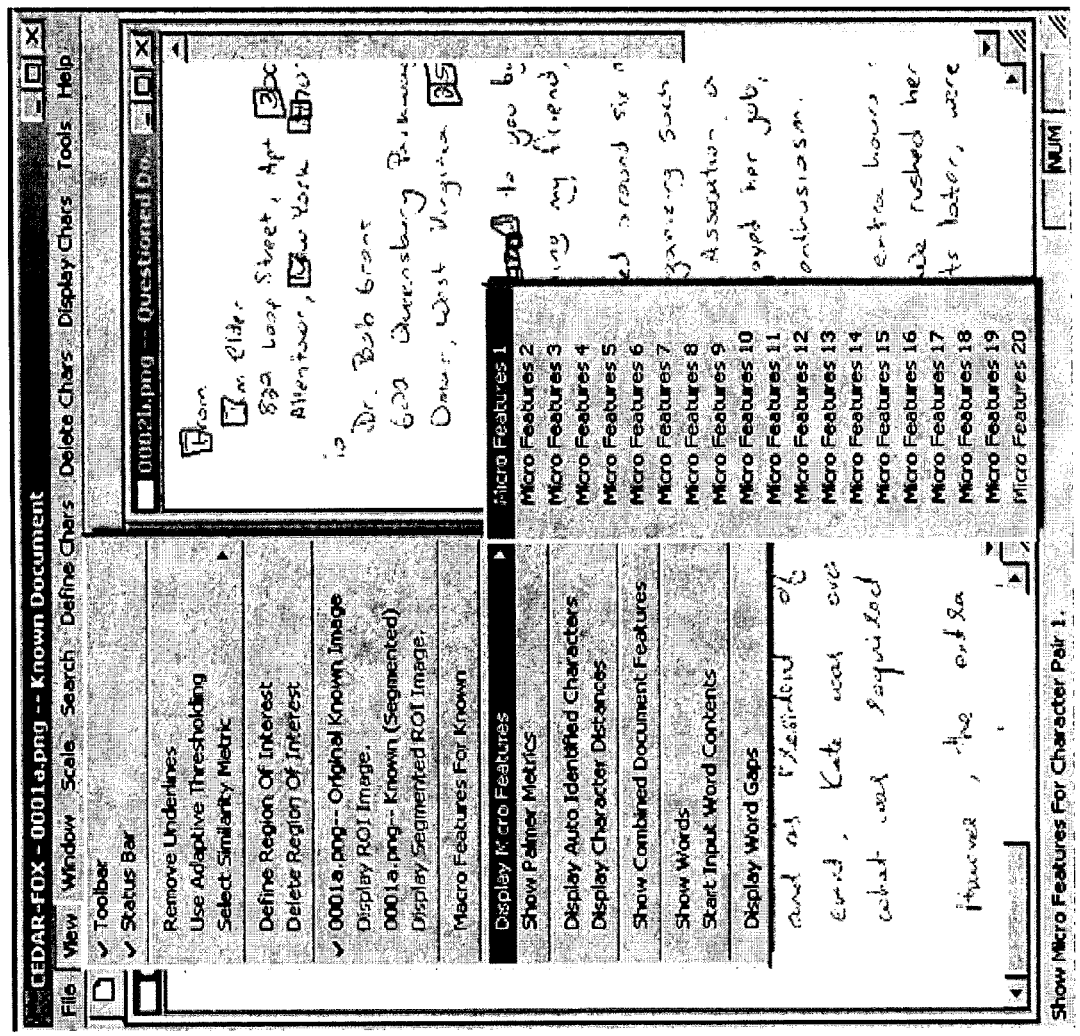
FIG. 32 is a screen capture of a Display Micro Features menu under the File menu of FIG. 27 showing a choice of up to twenty Micro features for display.
Figure 33:
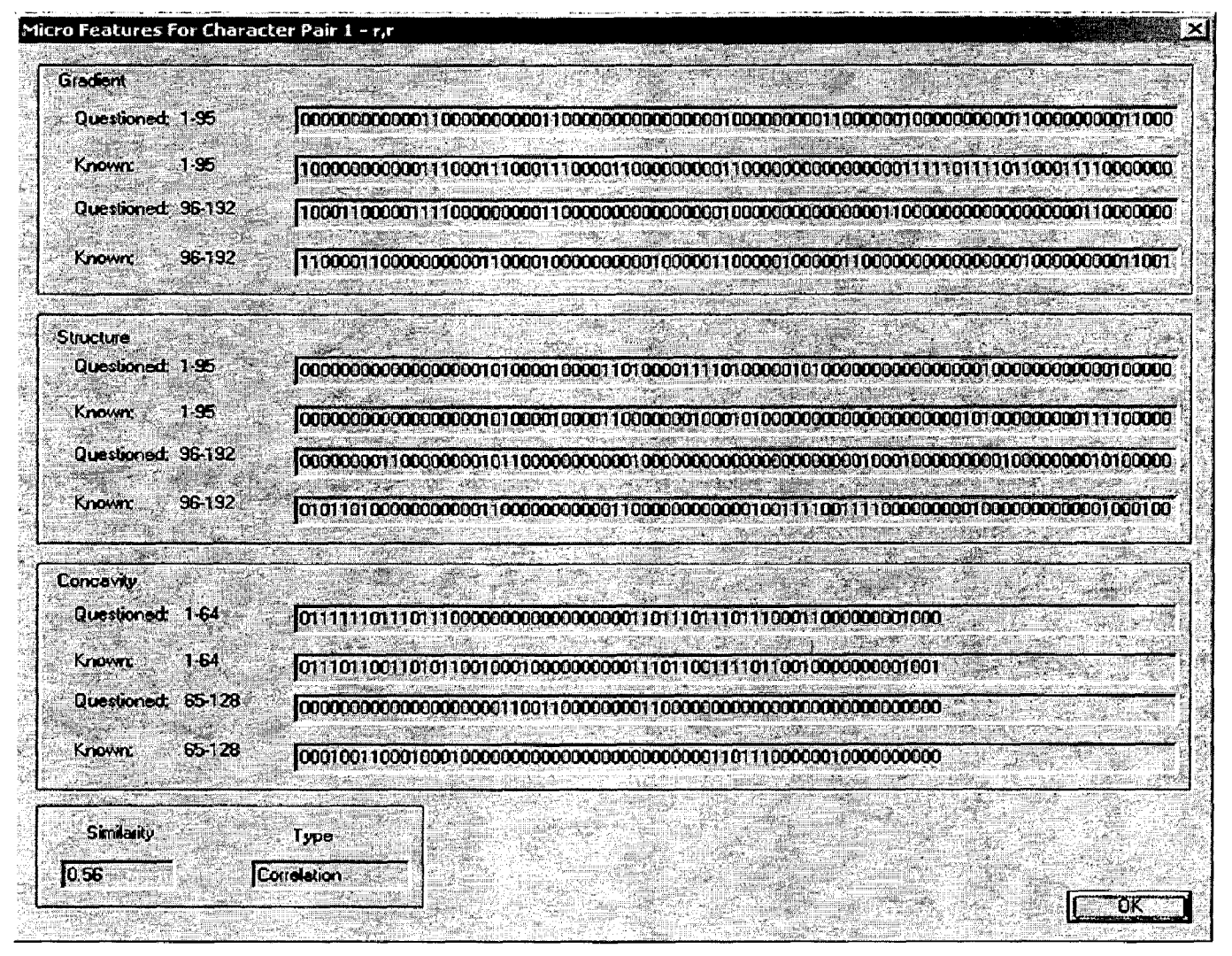

The Display Micro Features option under the View Menu of the detailed menu bar allows the user to toggle between Micro Features. The Micro Features are based on the characters selected (see Define Chars), and can be displayed using the option View>Display Micro Features. This displays the Micro Features for each character pair. Micro Features may be determined for several characters. The user may choose the character whose features he/she wants to display (FIG. 32), and a dialog will appear showing the vectors and similarity for the defined character pair (FIG. 33). Character level features or Micro Features, consist of per character metrics measuring gradient, structural, and concavity features of each individual character. These three together form the so-called GSC features.

Figures 34A, 34B:
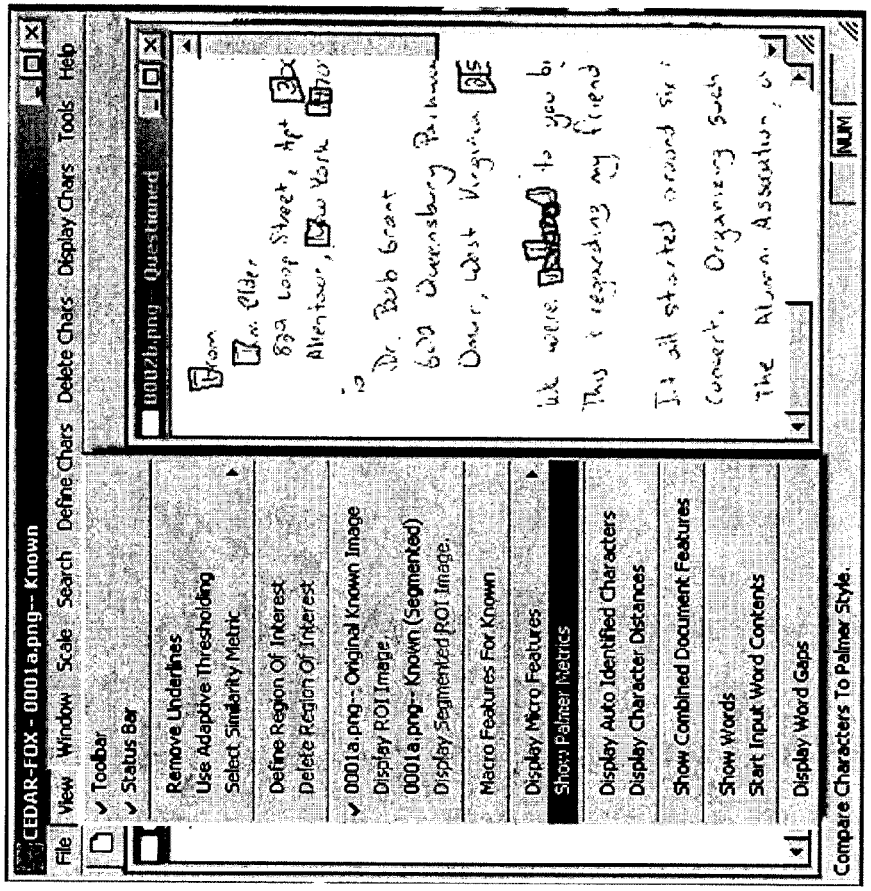
FIG. 34A is a screen capture of ideal Palmer fonts while 34B shows a user choosing to Show Palmer Metrics.
Figure 35:
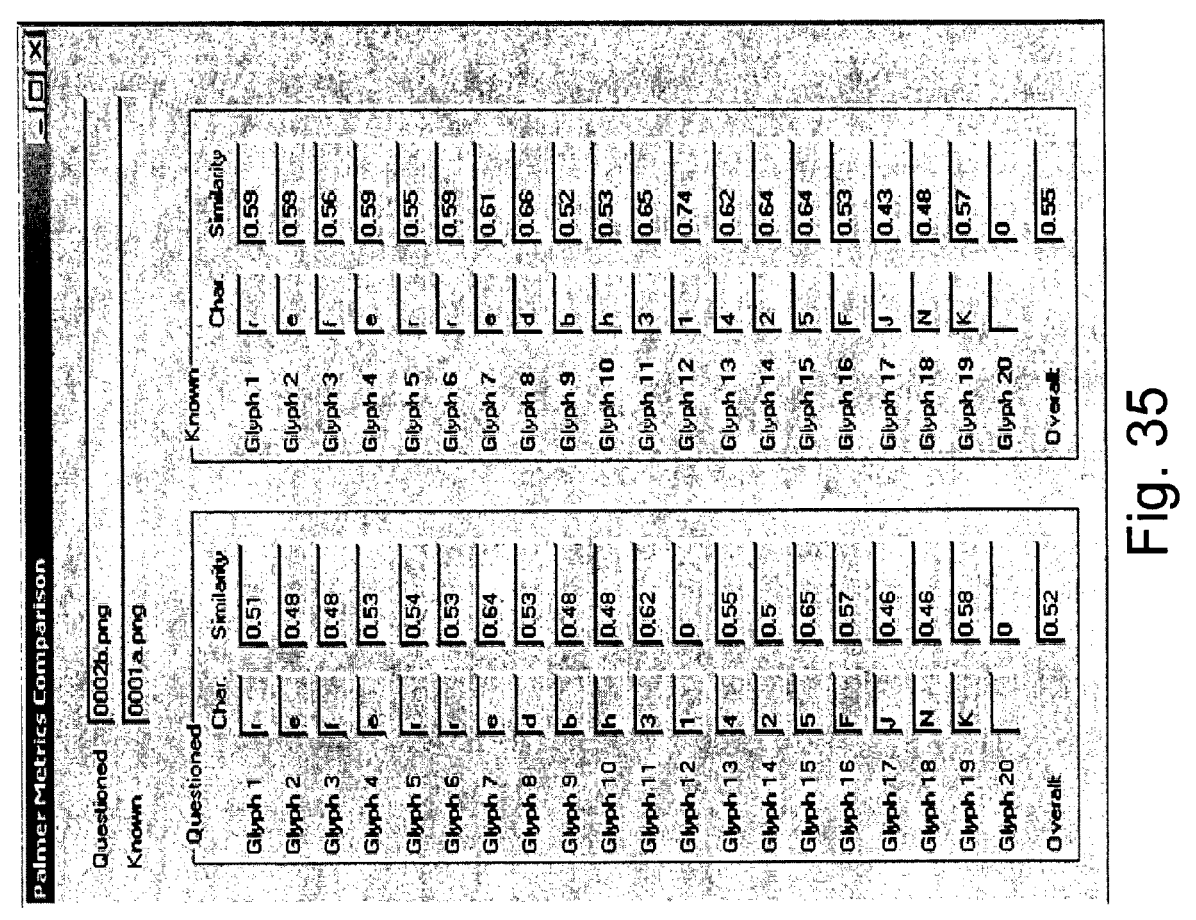

The Show Palmer Metrics option of FIG. 34B under the View Menu of the detailed menu bar provides a character level distance metric between the defined characters within a document and the equivalent character in the Palmer font Style. The View>Show Palmer Metrics option shows the micro-feature correlation similarity (FIG. 35) with the Palmer Fonts, which are shown in FIG. 34A.

Figure 36:
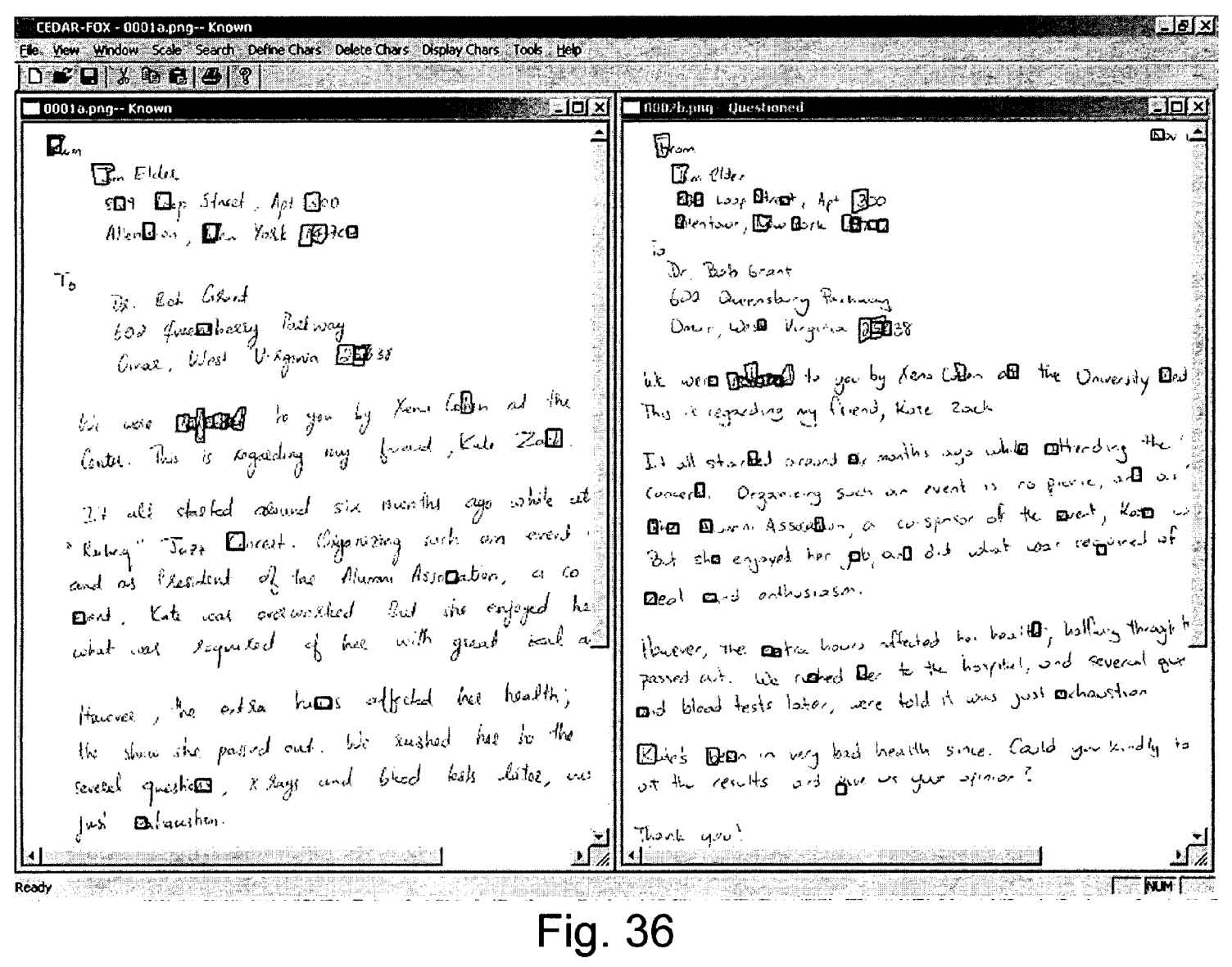

The Display Auto Identified Characters option under the View Menu of the detailed menu bar shows the automatically identified characters of the document in the currently active window (see FIG. 36).

Figure 37:
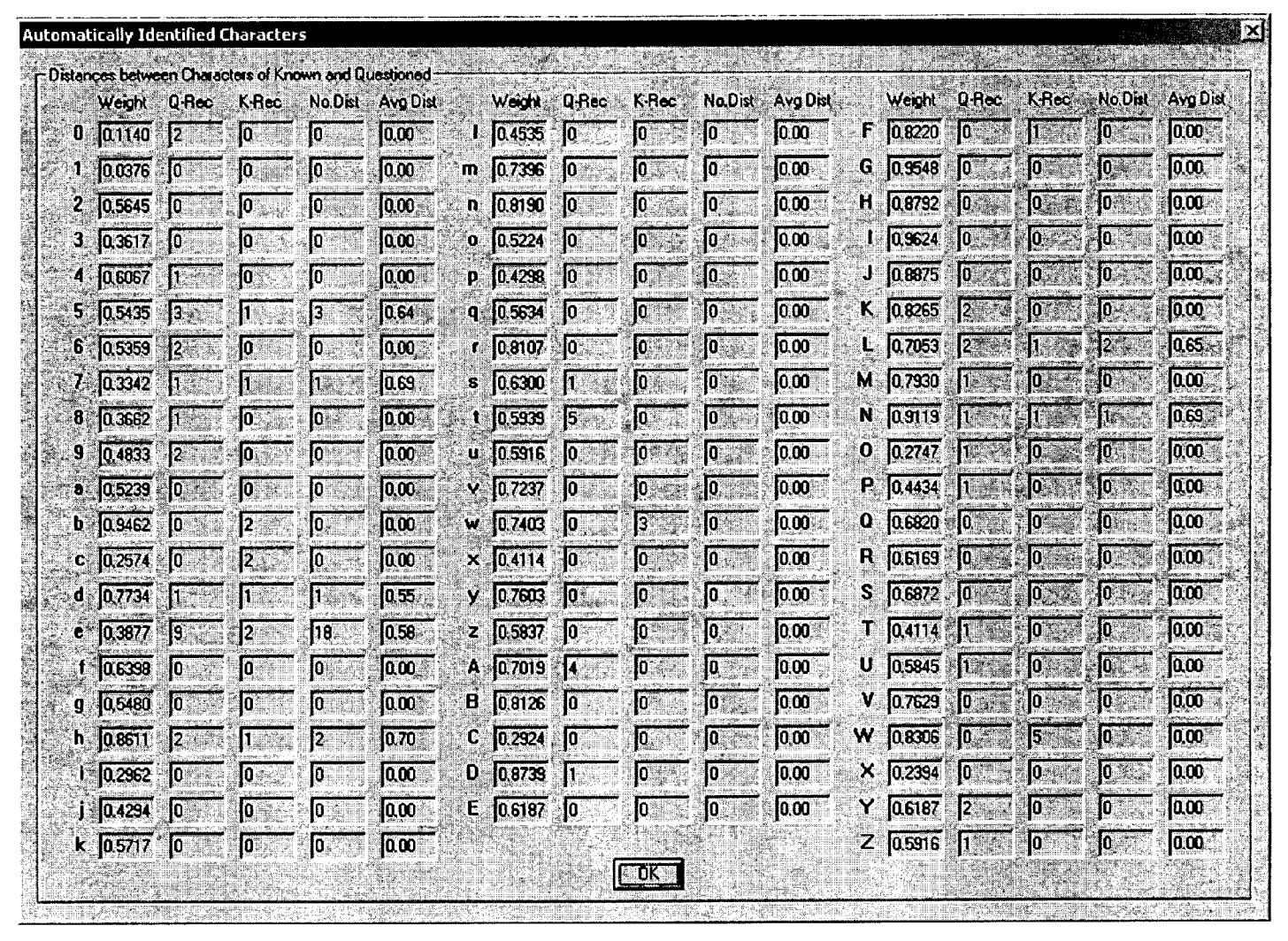

The Display Character Distances option under the View Menu of the detailed menu bar displays the distances between the automatically identified characters of the document in the currently active window (see FIG. 37).

The Show Combined Document Features (Document Metrics) option under the View Menu of the detailed menu bar allows the user to view the result of applying both Macro and Micro Features simultaneously on the two documents along with a similarity metric. These windows provide a snapshot of the document comparison process as it evolves. In the Document Features window of FIG. 38, the current state of the document comparison process is shown. This dialog lists the file names, the characters that are defined, macro features for the documents, automatically identified characters comparison results and the Same Author/Different Author determination. Individual characters, automatically identified characters and macro features may be included or removed from the comparison process via the use of checkboxes in the dialog. By default, all features are enabled (checked) and used in the comparison process. The overall result for the "Same Writer?" will be displayed as "yes" or "no". Associated with each feature is a confidence value that indicates how sure this system is about its conclusion (Log Likelihood Ratio).

Figure 38:
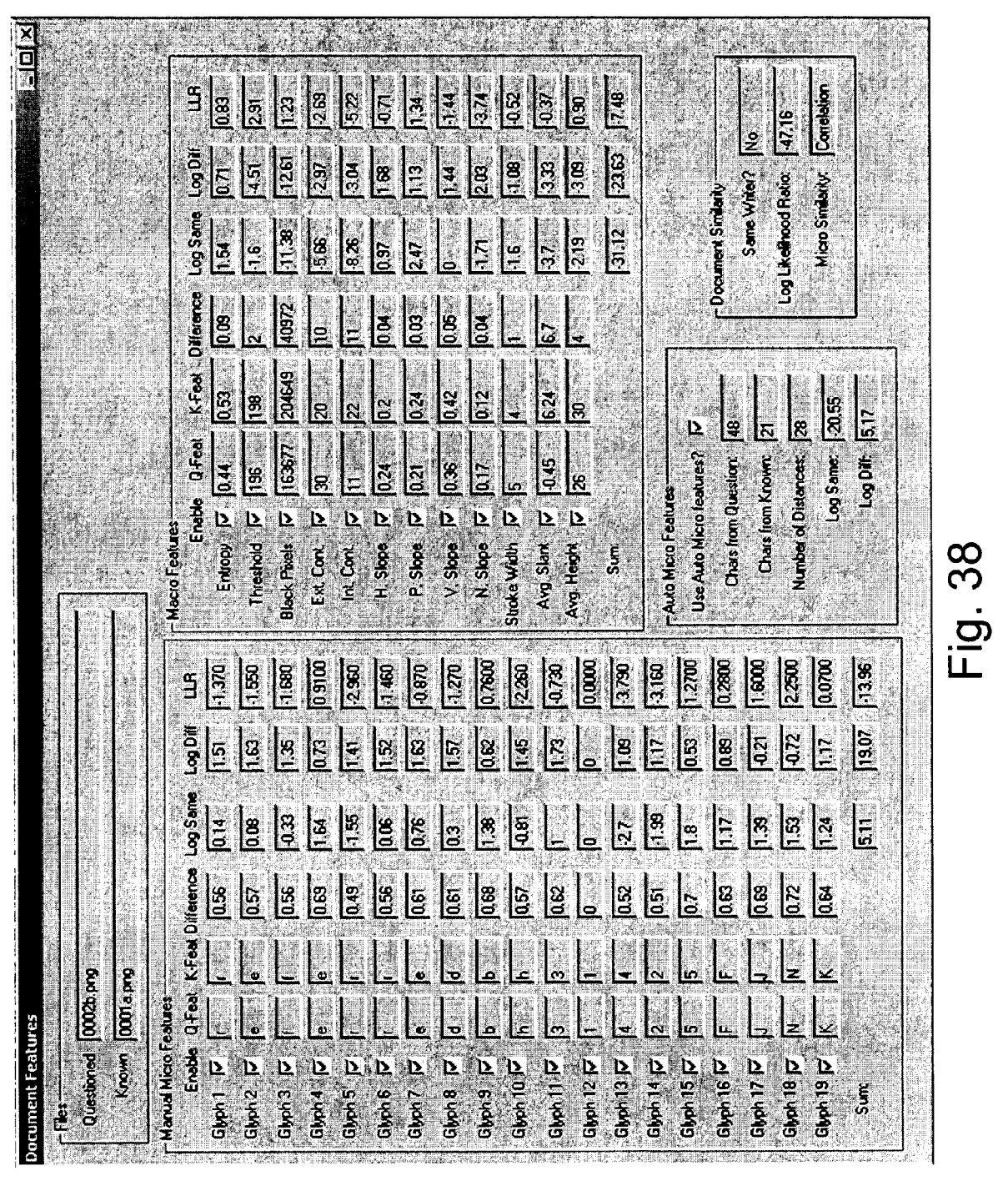

The screen shot of FIG. 38 displays the combined document features for two documents taken from different writers, and shows that the Log Likelihood Ratio (LLR) is negative. The negative sign indicates that the two documents belong to different writers. To generalize, when the LLR is positive, the two documents belong to the same writer. A negative LLR indicates that the two documents belong to different writers and a LLR of 0 indicates that the result is unknown.

Figure 39:
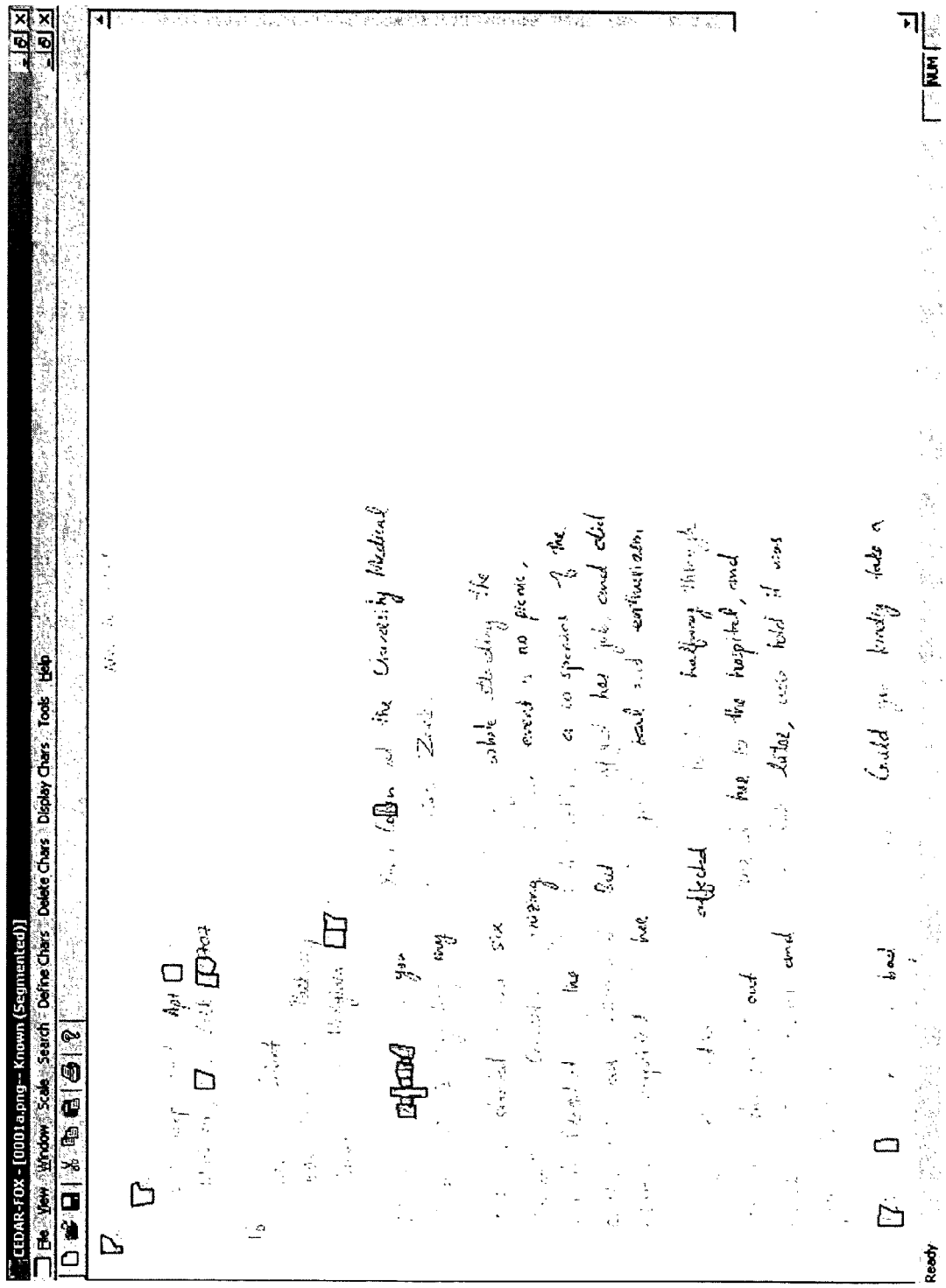
FIG. 39 is a screen capture of the results when a user chooses the Show Words option under the View menu of the detailed menu bar of FIG. 29.
Figure 40:
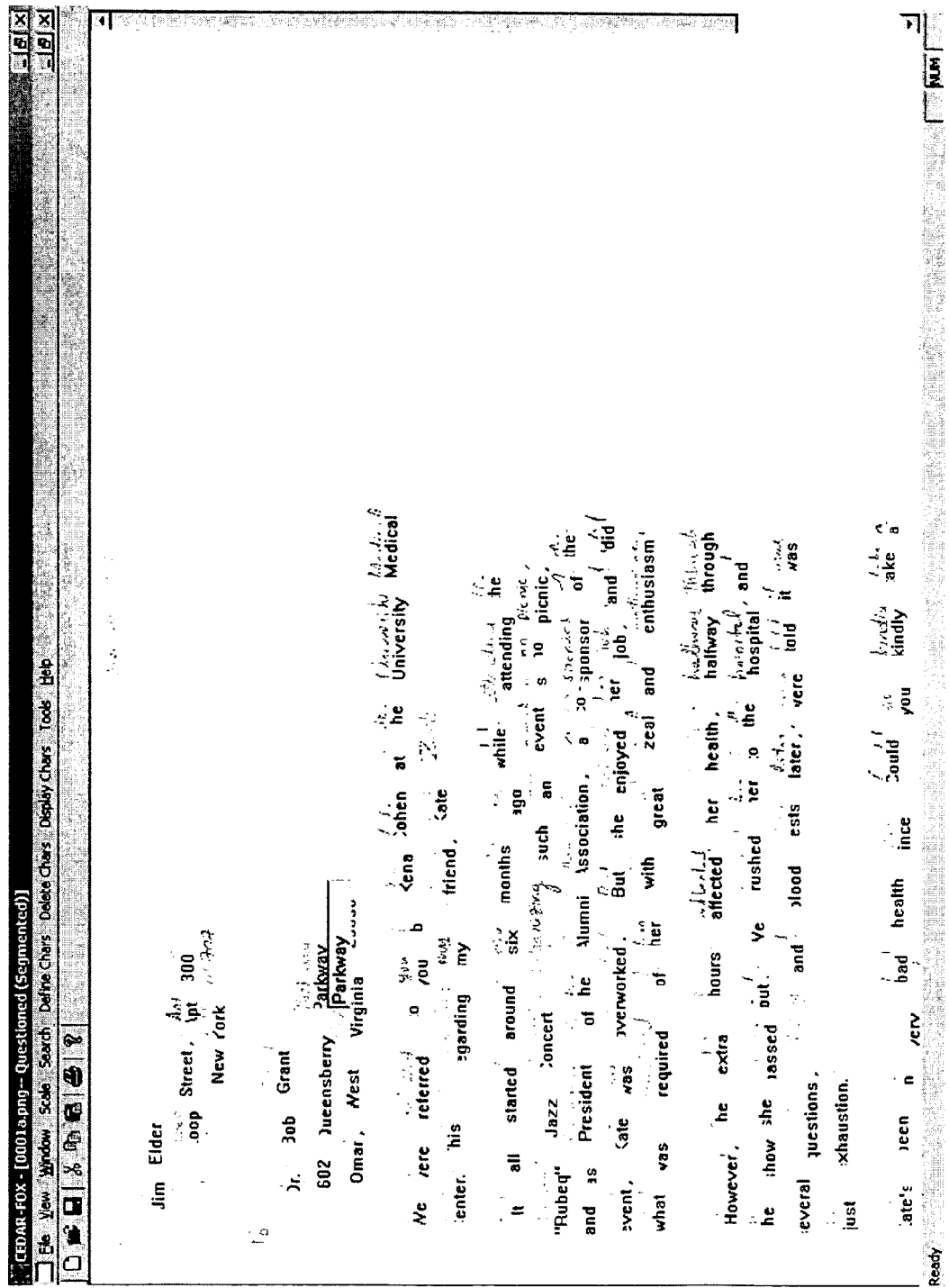
FIG. 40 is a screen capture of the dialog which opens when a user chooses the Start Input Word Contents under the View menu of the detailed menu bar of FIG. 29.

The Show Words option under the View Menu of the detailed menu bar marks all the words obtained as the output of the word segmentation algorithm (see FIG. 39) in different colors on the screen. As with any option, the results may be printed in grayscale. The Start Input Word Contents option under the View Menu of the detailed menu bar is incorporated to help in character segmentation. The text of the document is input manually in the corresponding text boxes provided by this option to form a transcript for each word. Selection of this option allows the user to input word contents in a document. The option creates a text box below the first word in the document. As shown in FIG. 40, the user can then type in the contents of that particular word manually in the text box. To insert a space within the text box, the user may use shift+spacebar. To go to the next word the user may use spacebar. To go back and forth to a particular word the user may use ctrl+left arrow key and ctrl+right arrow keys respectively. To move up and down to different words the user may use just the up and down arrow keys. These word contents are input as though the user is typing a text document. Before using this feature, the user may use the View>Show Words feature first so that the adjacent words appear in different colors. This helps in distinguishing the adjacent words and thereby eliminating the chances of committing mistakes in typing the word contents for making the word transcripts. All such transcripts are then used for the character segmentation algorithm to get better results for Micro features at the character level.

The Display Word Gaps option under the View Menu of the detailed menu bar is used to view the word gap range in pixels for the two documents currently open. Clicking View>Display Word Gaps displays the ranges in an increment of 0.16 inches from 0 to 1.67. Variations, permutations and combinations as to range and increments are intended to be within the spirit and scope of the invention as claimed.

The Scale Menu of the detailed menu bar allows the user to enlarge or reduce the view of the image file or return it to normal magnification. It allows magnification of the document up to 400 percent. This is particularly useful when defining characters or inputting word contents.

Figure 41A:
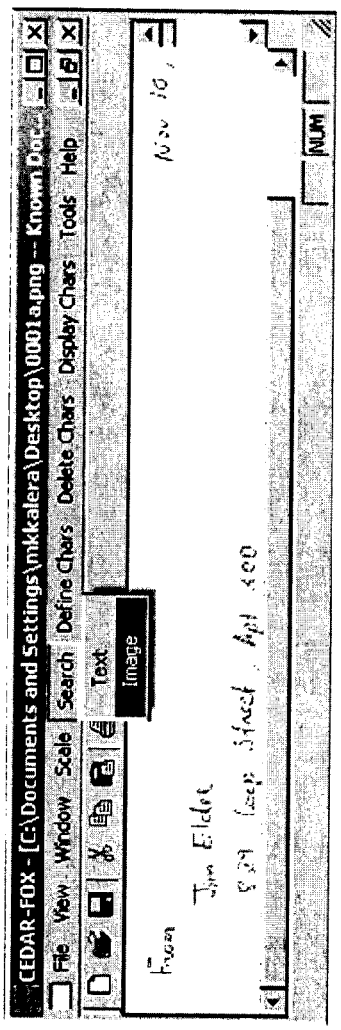
FIG. 41A is a screen capture of a Search menu under the detailed menu bar showing the Text and Image options, while 41B shows the dialog that appears when a user wishes to search for a word image.
Figure 41B:
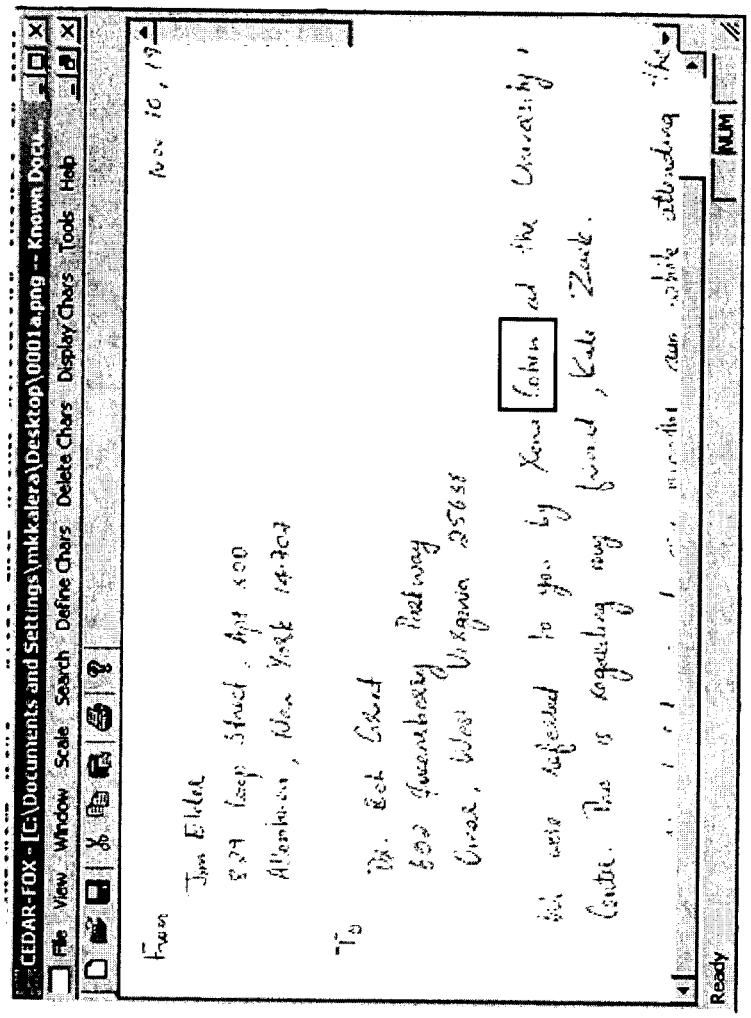
Figure 42B:
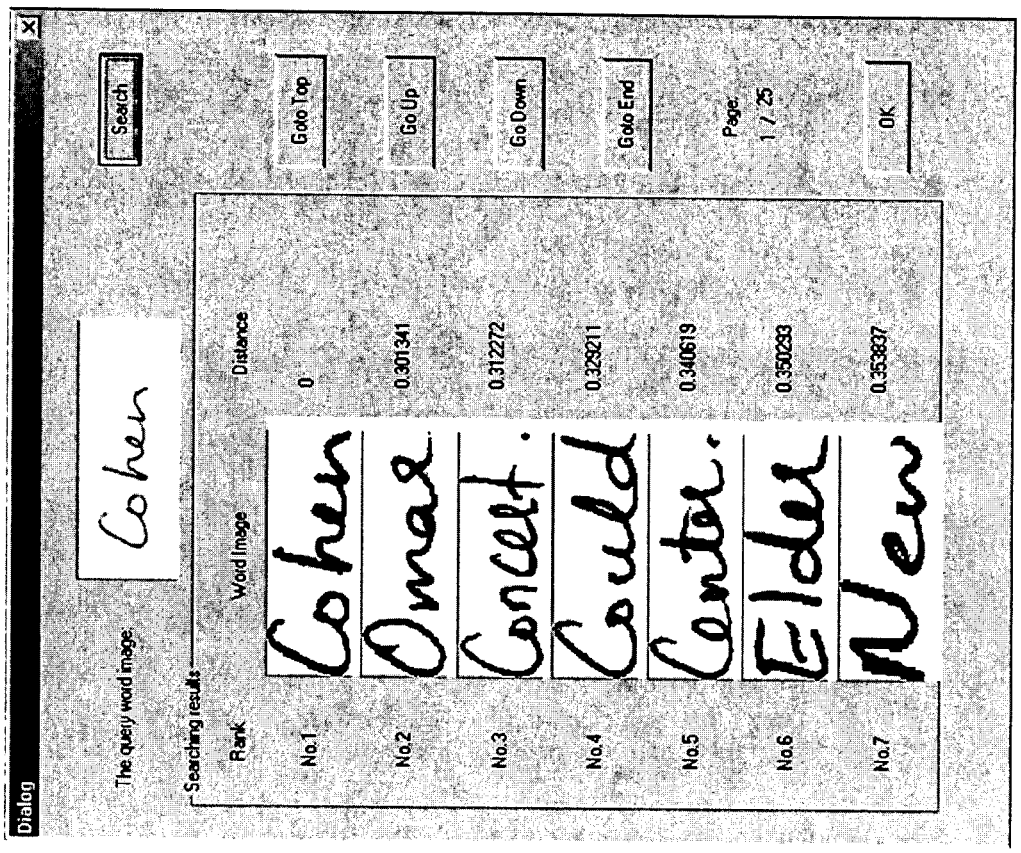
FIG. 42A is a screen capture of an intermediate step wherein the user has chosen a word image for searching as in FIG. 41, while 42B shows the results of a search for the word image in a document.
Figure 42A:
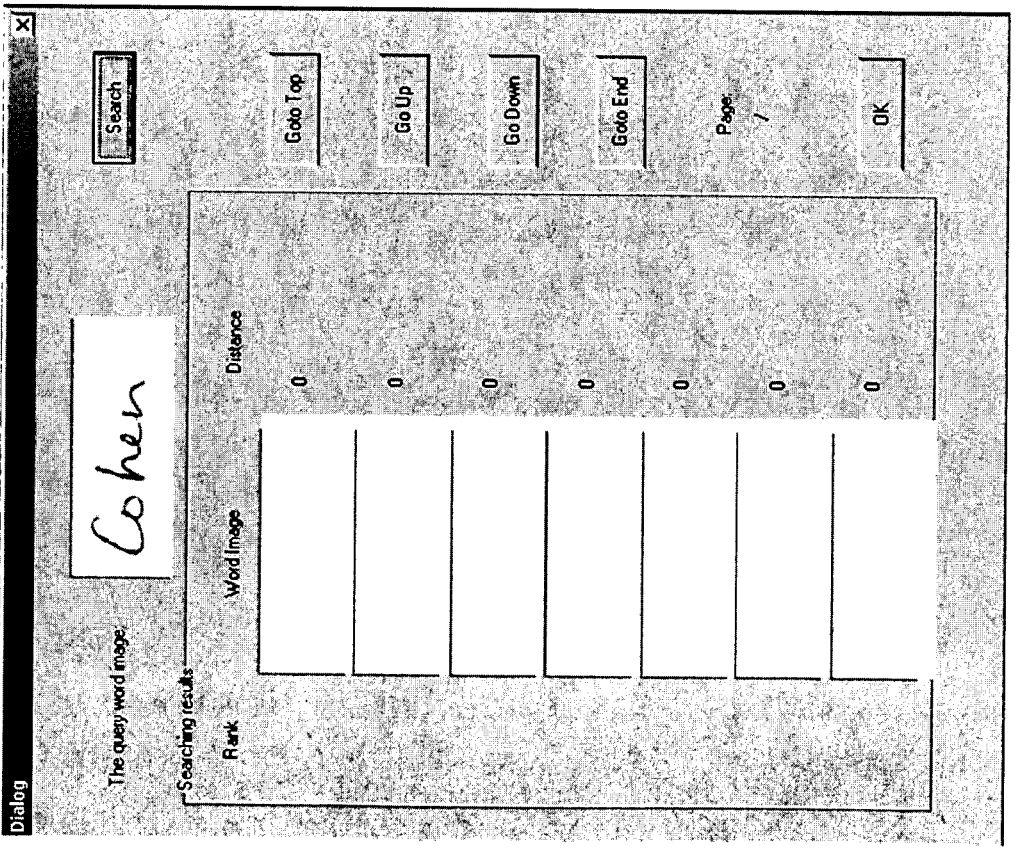

The Search Menu of the detailed menu bar is shown in FIG. 41A. Here the user can search a particular word using two methods, namely, search text or search image. For example, the user may search for word images use the option Search>Image. Using the mouse, the user then left clicks a corner of the word image to be searched for in the document. This will start drawing a rectangle that will define the word image. The user then positions the mouse to the diagonal corner of the image and left clicks again to complete the word image as shown in FIG. 41B. This displays another dialog box as in FIG. 42A, which contains the word image to be searched at the top and several other fields. To begin searching for the word image, the user clicks on the Search button on the right hand side. As shown in FIG. 42B, the word images that are found to be closest to the required word image appear in the results section of the search dialog box with their corresponding ranks and distances to the required word image. The user can browse through all the images thus found using the buttons on the right hand side.

Figure 43:
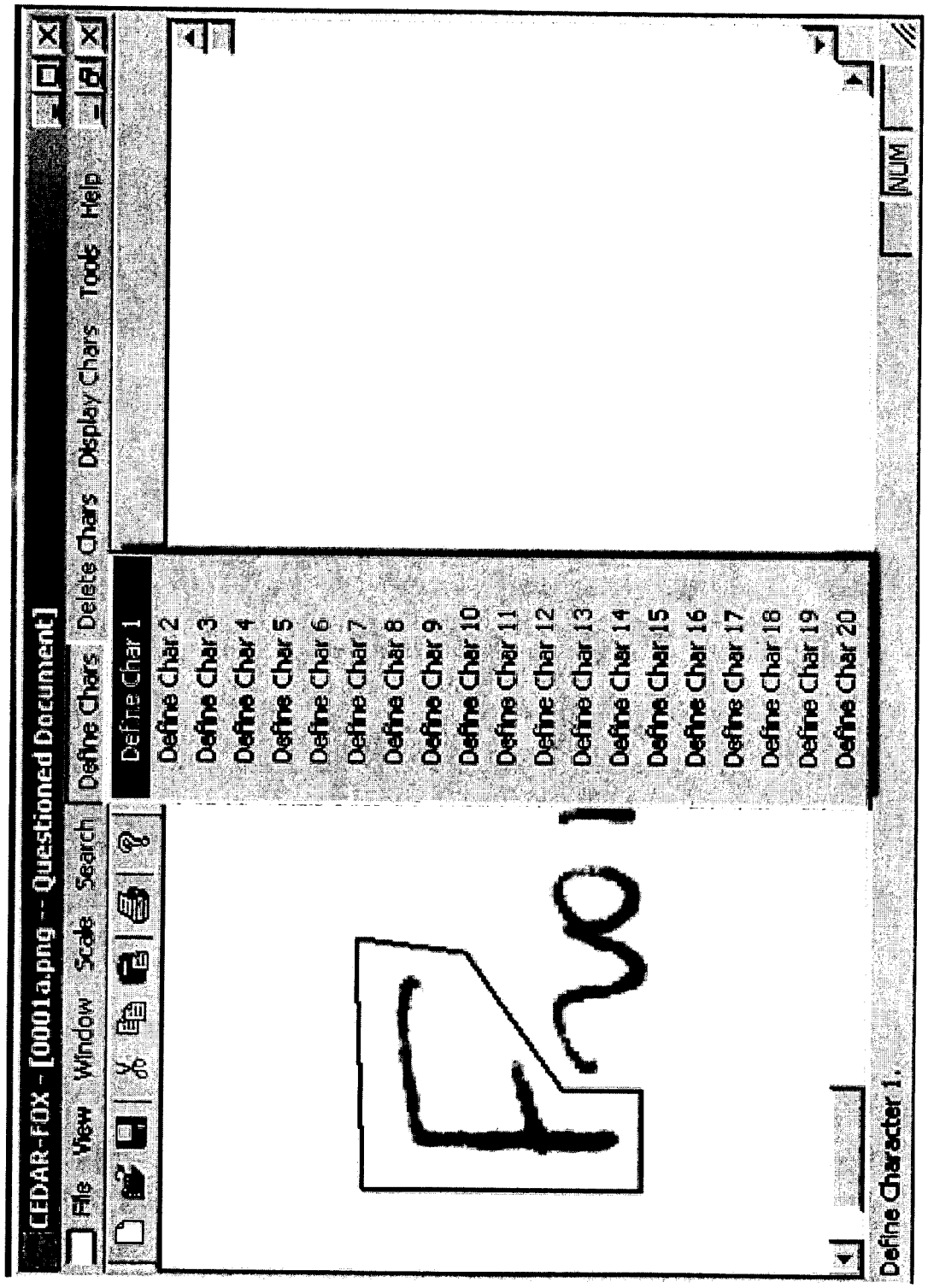
FIG. 43 is a screen capture of a character that has been defined as character 1 using the Define Chars menu under the detailed menu bar.
Figure 44:
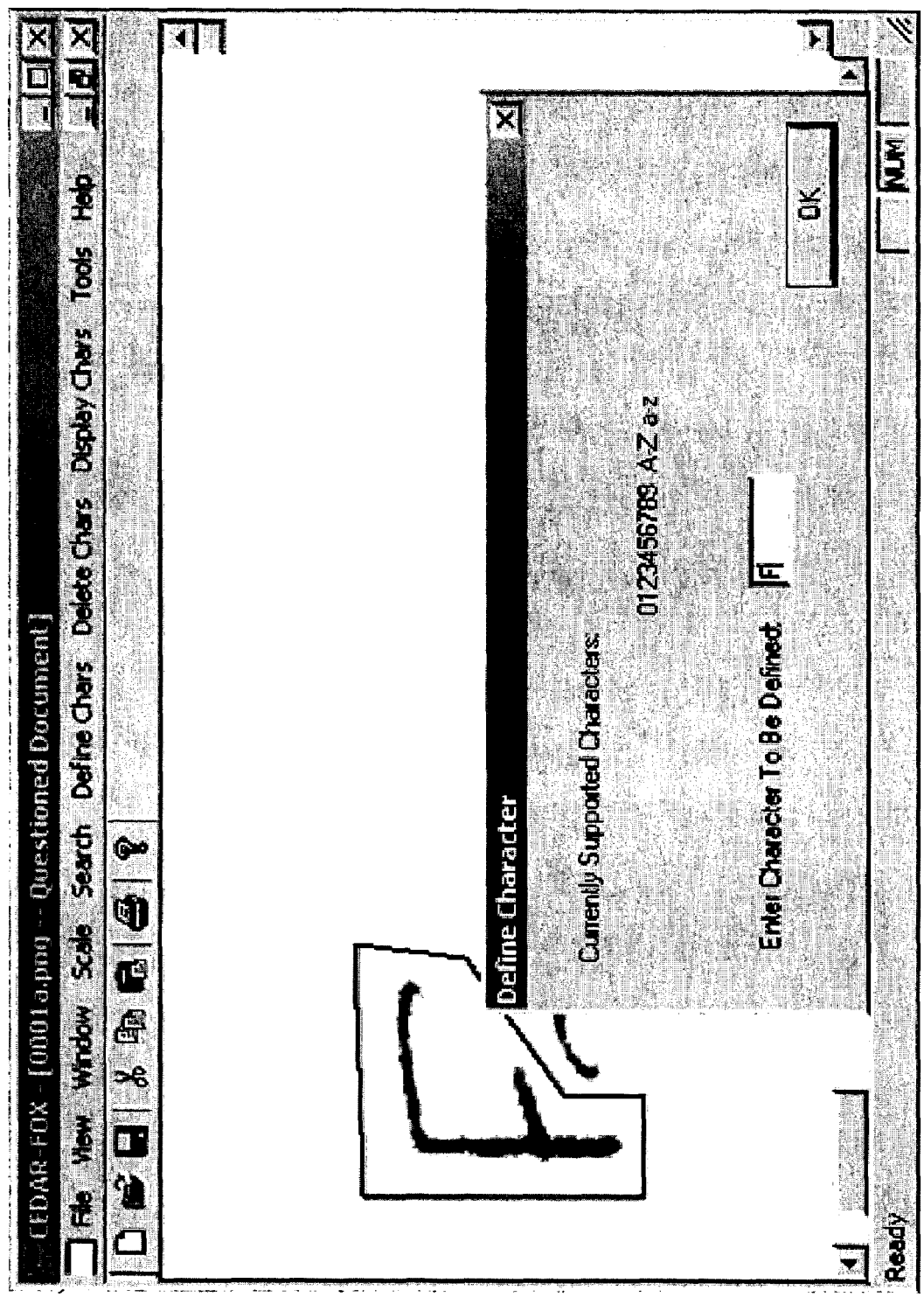
FIG. 44 is a screen capture of a user entering the value for a character to be defined which has been defined as in FIG. 43.
Figure 45:
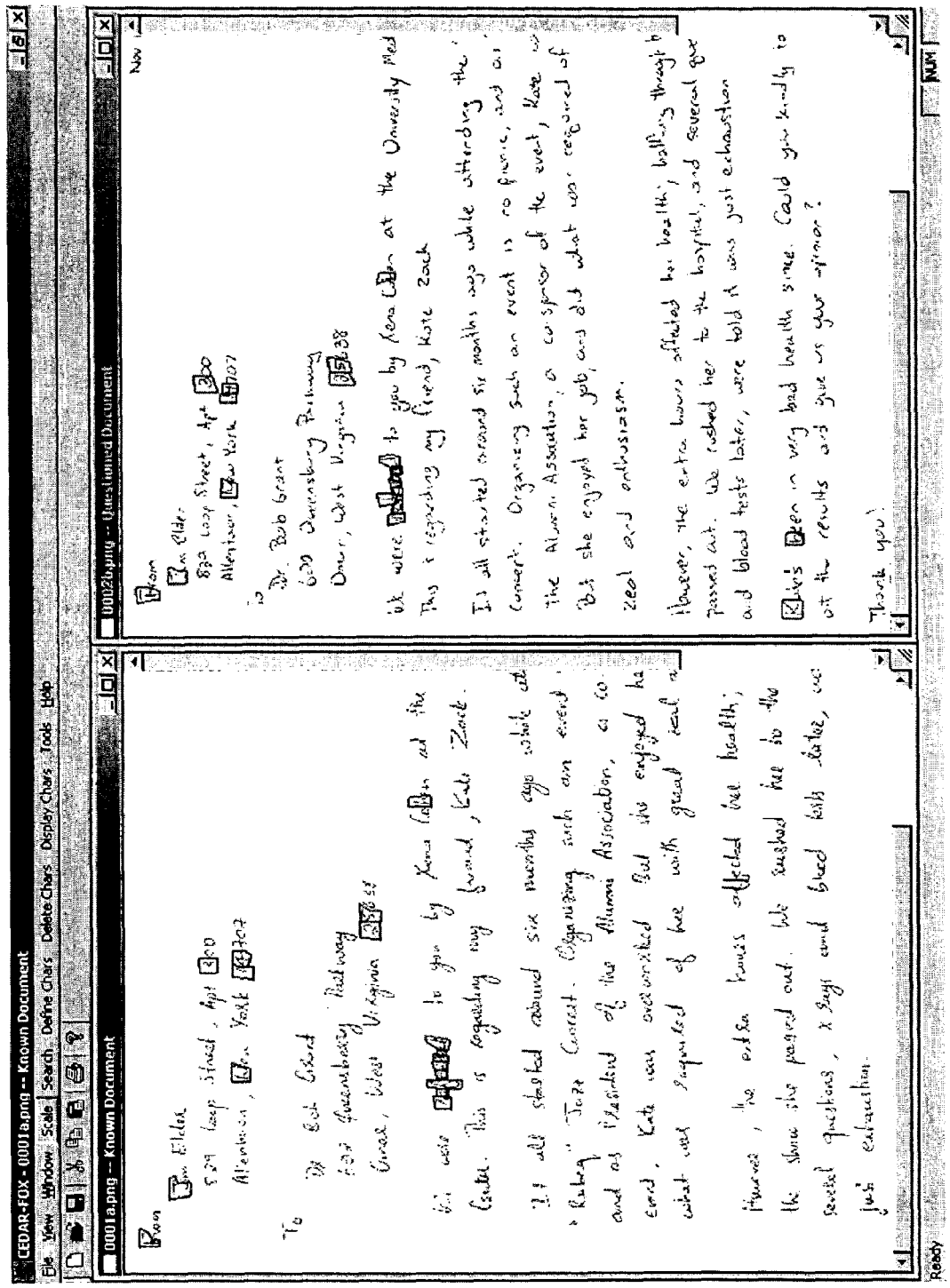
FIG. 45 is a screen capture of the results within two documents when several characters has been defined using the menus and dialogs of FIGS. 43 and 44.

The Define Characters Menu of the detailed menu bar allows the user to identify individual characters. This requires that the user define a bounding region for the character of interest. This is done by drawing multiple line segments around the component. A left click of the mouse starts the process, subsequent left clicks will add a new line segment to that point. A right click at any time will clear the definition. Drawing a segment that touches the start segment will close the definition. Once this is done, the user defines the character by selecting a choice from the Define Character menu, for example, Define Chars>Define Char 1 as in FIG. 43. As shown in FIG. 44, the user then enters the value for the character in the dialog. It is recommended that the user define the companion character in the other document to ensure consistency as shown in the screen capture of FIG. 45. The user repeats this process for each pair of characters that he/she wishes to define. Up to 20 characters can be defined from each file in the embodiment shown. However the invention contemplates changes (increases and decreases) in the number of characters that may be defined, and subsequently deleted and/or displayed.

Figure 46:
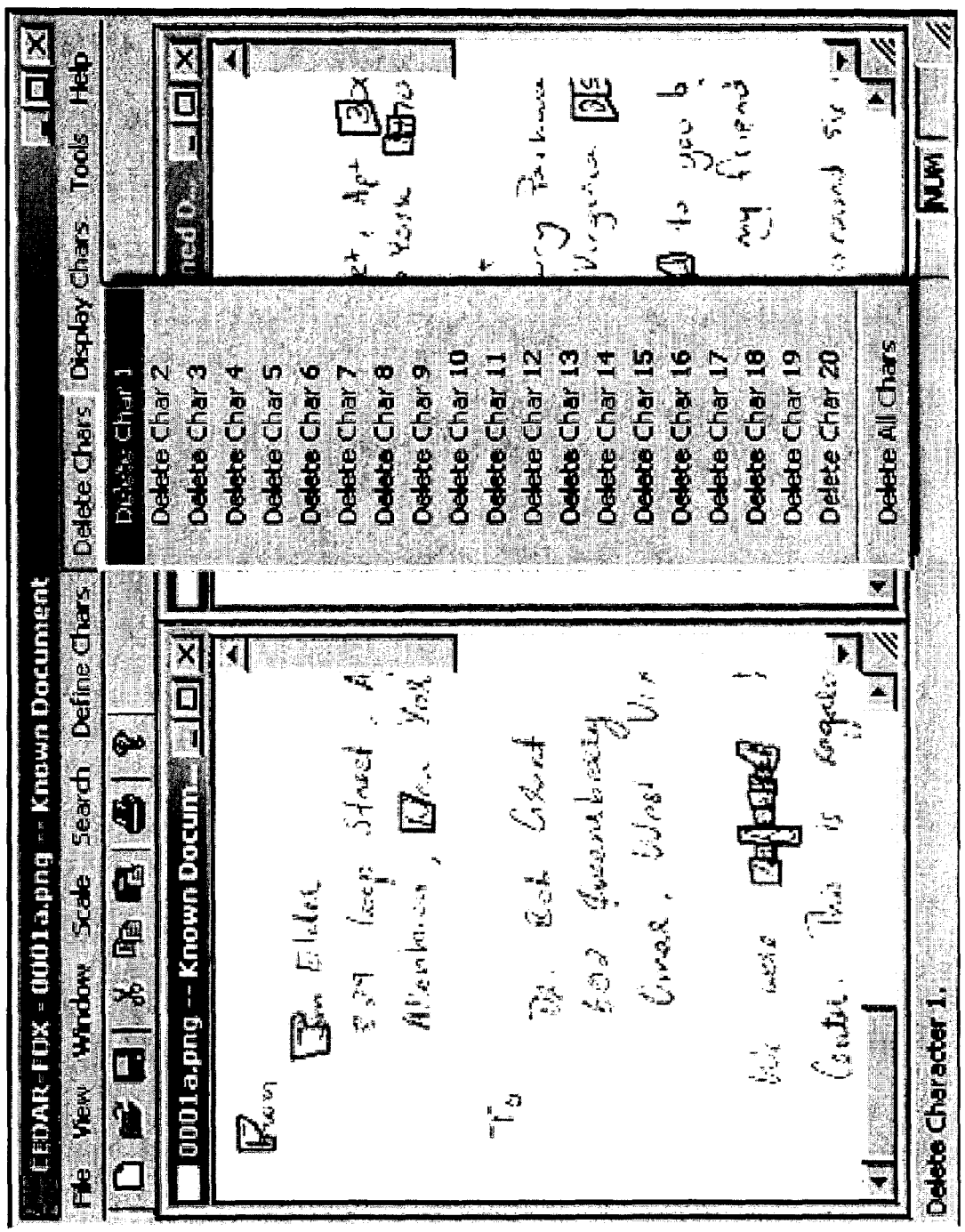
FIG. 46 is a screen capture of a Delete Chars menu showing a choice of up to twenty character pairs for deletion.

The Delete Characters Menu of the detailed menu bar allows the user to remove individual defined characters. For example to delete the first defined character use as shown in FIG. 46, the user chooses Delete Chars>Delete Char 1.

Figure 47A:
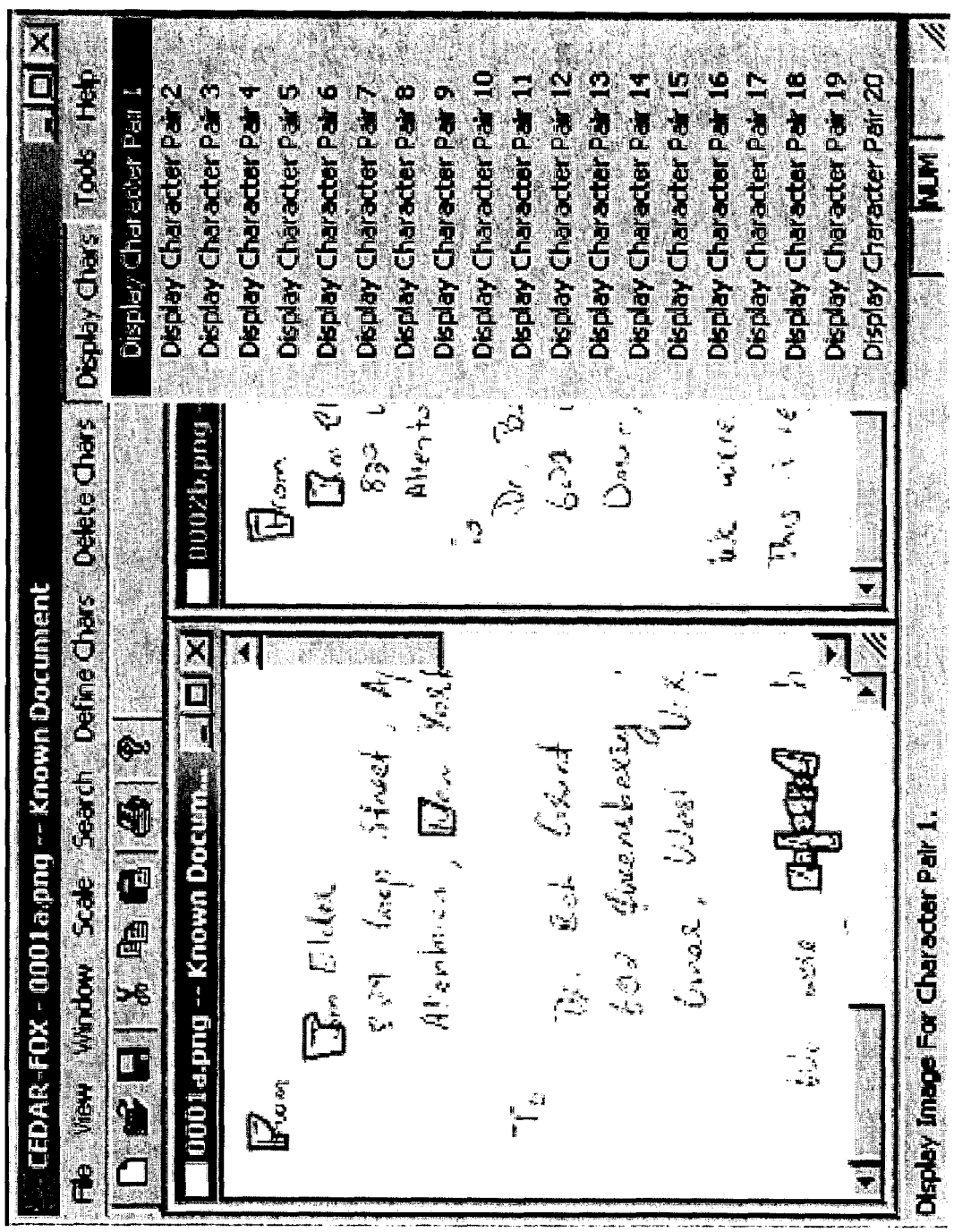
FIG. 47A is a screen capture of a Display Chars menu showing a choice of up to twenty character pairs for display and FIG. 47B shows the resulting screen when a user chooses a character pair for display.
Figure 47B:
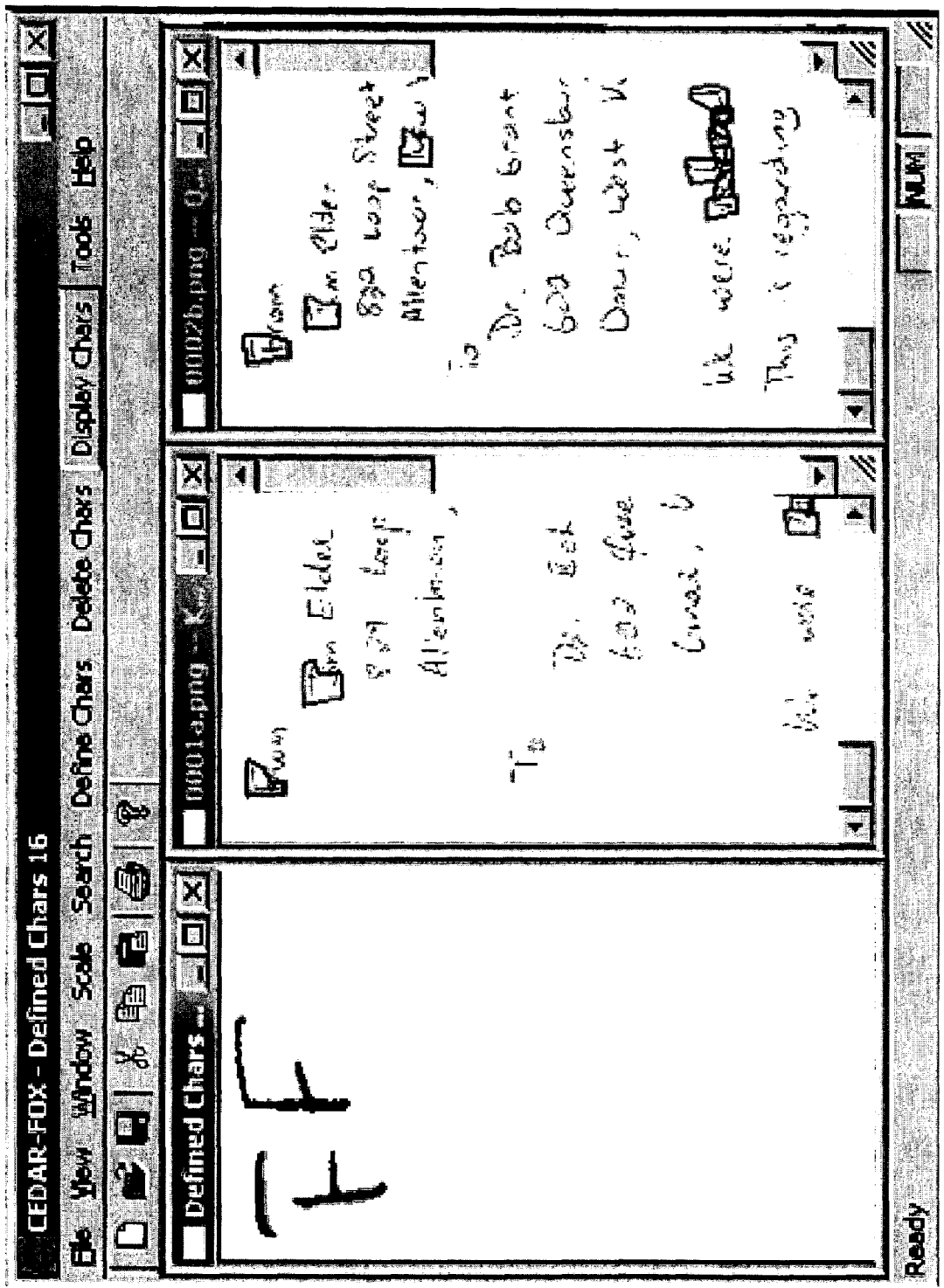

The Display Characters Menu of the detailed menu bar allows the user to view the different character pairs one each at a time. For example, to view character pair 1 as shown in FIG. 47, the user chooses Display Chars>Display Character Pair 1. FIG. 47B shows the character pairs and the location of the character pairs in the documents.

Figure 48A:
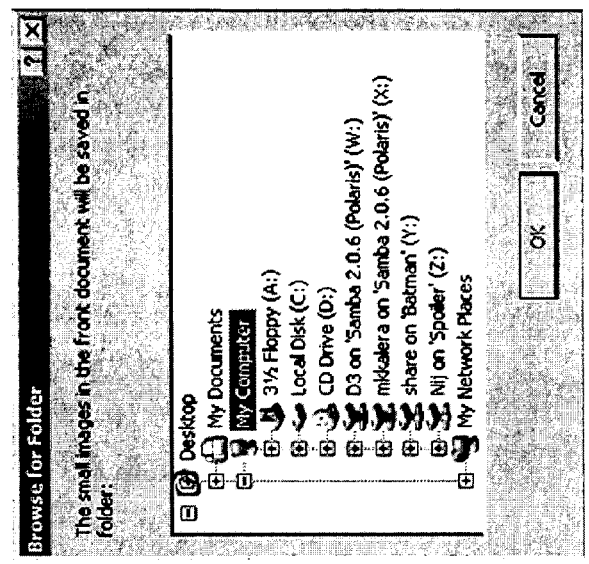
FIGS. 48A and 48B are screen captures of a Tools menu for saving defined character images and the dialog box that appears for saving these images.
Figure 48B:
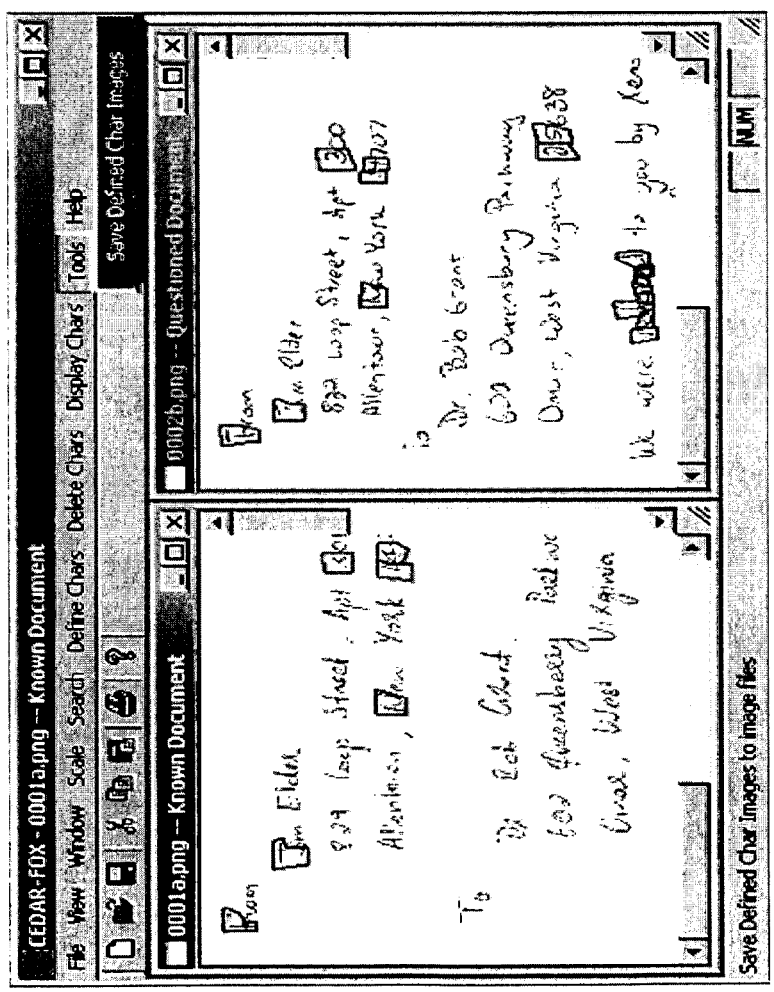

As shown in FIG. 48A, the Tools Menu of the detailed menu bar has the option to Save Defined Char Images. This allows the user to save all the defined characters in separate image files as in FIG. 48B.

As indicated above, present invention can be embodied in the form of an apparatus with means for the implementing the method, computer-implemented processes and apparatuses for practicing those processes. The present invention can also be embodied in the form of computer program code embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted as a propagated computer data or other signal over some transmission or propagation medium, such as over electrical wiring or cabling, through fiber optics, or via electromagnetic radiation, or otherwise embodied in a carrier wave, wherein, when the computer program code is loaded into and executed by a computer, the computer becomes an apparatus for practicing the invention. When implemented on a future general-purpose microprocessor sufficient to carry out the present invention, the computer program code segments configure the microprocessor to create specific logic circuits to carry out the desired process.

Thus it is seen that the objects of the invention are efficiently obtained, although changes and modifications to the invention should be readily apparent to those having ordinary skill in the art, which changes are considered to be within the scope of the invention as claimed. Variations, permutations, and combinations on such embodiments are also intended to be within the spirit and scope of the invention as claimed.

What is claimed is:

1. A computer based method for determining whether biometric samples are from a same source, comprising the steps of: comparing a first biometric sample with a second biometric sample with a general purpose computer, wherein said first and second biometric samples form at least one cluster of at least one vector based on feature similarities between said first and second biometric samples; and, determining by means of said general purpose computer whether said first and second biometric samples are from said same source, wherein the first biometric sample and the second biometric sample are handwriting samples and said at least one cluster is a composite based on a model for measuring the distance between a first binary feature vector and a second binary feature vector and wherein the accuracy of said model is measured by calculations involving features selected from the group consisting of micro-features, macro-features and a combination of micro- and macro-features.

2. The computer based method of claim 1, wherein the first binary feature and the second binary feature are selected from the group consisting of a conventional feature and a computational feature.

3. The computer based method of claim 1, wherein the first binary feature and the second binary feature are a conventional feature selected from the group consisting of arrangement, class of allograph, connection, design of allographs (alphabets) and their construction, vertical dimension, horizontal dimension, slant, slope, intraword spacing, interword spacing, abbreviation, baseline alignment, initial stroke, terminal stroke, presence of punctuation, style of punctuation, location of punctuation, embellishment, legibility, writing quality, line continuity, line quality, pen control, arched writing movement, angular writing movement, interminable writing movement, natural variation, natural consistency, persistency, lateral expansion, and word proportions.

4. The computer based method of claim 1, wherein the first binary feature and the second binary feature are a computational feature selected from the group consisting of a micro-feature and a macro-feature.

5. The computer based method of claim 4, wherein the computational feature is a micro-feature selected from the group consisting of gradient, structural and concavity attributes.

6. The computer based method of claim 4, wherein the computational feature is a micro-feature of a character level parameter.

7. The computer based method of claim 4, wherein the computational feature is a macro-feature selected from the group consisting of entropy of gray values, gray level binarization threshold, black pixels, interior contours, exterior contours, vertical slope, horizontal slope, negative slope, positive slope, stroke width, height and slant.

8. The computer based method of claim 4, wherein the computational feature is a macro-feature selected from the group consisting of a document parameter, a paragraph parameter, and a word level parameter.

* * * * *